(12) United States Patent
Mikami et al.

(10) Patent No.: US 12,047,540 B2
(45) Date of Patent: Jul. 23, 2024

(54) INSPECTION APPARATUS, METHOD, AND STORAGE MEDIUM, THAT CORRECT REFERENCE IMAGE AND INSPECT PRINTED MATERIAL BASED ON THE CORRECTED REFERENCE IMAGE

(71) Applicant: CANON KABUSHIKI KAISHA, Tokyo (JP)

(72) Inventors: Ryo Mikami, Tokyo (JP); Kenichirou Haruta, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/183,269

(22) Filed: Mar. 14, 2023

(65) Prior Publication Data

US 2023/0308571 A1 Sep. 28, 2023

(30) Foreign Application Priority Data

Mar. 23, 2022 (JP) .................................. 2022-047351
Jun. 9, 2022 (JP) .................................. 2022-093821
Dec. 26, 2022 (JP) .................................. 2022-208803

(51) Int. Cl.
*H04N 1/00* (2006.01)

(52) U.S. Cl.
CPC ..... *H04N 1/00819* (2013.01); *H04N 1/00087* (2013.01); *H04N 1/00092* (2013.01)

(58) Field of Classification Search
None
See application file for complete search history.

(56) References Cited

U.S. PATENT DOCUMENTS

| | | | |
|---|---|---|---|
| 10,547,752 B2 | 1/2020 | Fukase | |
| 2014/0079292 A1* | 3/2014 | Kaneko | H04N 1/00068 382/112 |
| 2014/0079293 A1* | 3/2014 | Kitai | G06K 15/027 382/112 |
| 2016/0275664 A1* | 9/2016 | Kitai | G06T 7/0008 |
| 2017/0257495 A1* | 9/2017 | Kanaya | H04N 1/02815 |
| 2018/0268534 A1* | 9/2018 | Kaneko | G06T 7/001 |
| 2019/0132454 A1* | 5/2019 | Fukase | H04N 1/00045 |

(Continued)

FOREIGN PATENT DOCUMENTS

| | | |
|---|---|---|
| JP | 2019087792 A | 6/2019 |
| JP | 2021043032 A | 3/2021 |

*Primary Examiner* — Henok Shiferaw
(74) *Attorney, Agent, or Firm* — ROSSI, KIMMS & McDOWELL LLP

(57) ABSTRACT

An image-forming unit forms a referential image on a first sheet. A reading unit reads the referential image on the first sheet to generate referential read image data. A calibration unit calibrates input image data using calibration parameters derived based on the referential read image data. The image-forming unit forms a target image on a second sheet based on the calibrated data. The reading unit reads the target image on the second sheet to generate read image data for inspection. An inspection unit inspects quality of the target image based on comparison between the input image data and the read image data for inspection. The calibration parameters are derived based on the referential read image data to which flare correction has been applied. The inspection unit compares the input image data with the corrected read image data.

16 Claims, 31 Drawing Sheets

(56) References Cited

U.S. PATENT DOCUMENTS

| | | |
|---|---|---|
| 2021/0073966 A1 | 3/2021 | Teshima et al. |
| 2021/0258434 A1* | 8/2021 | Yasaki ............... H04N 1/00819 |
| 2023/0269333 A1* | 8/2023 | Kikumoto .......... H04N 1/00042 |
| | | 358/1.13 |
| 2023/0385582 A1* | 11/2023 | Sasaki ................ G06K 15/1872 |
| 2023/0401406 A1* | 12/2023 | Suzuki ............... G03G 15/5062 |

* cited by examiner

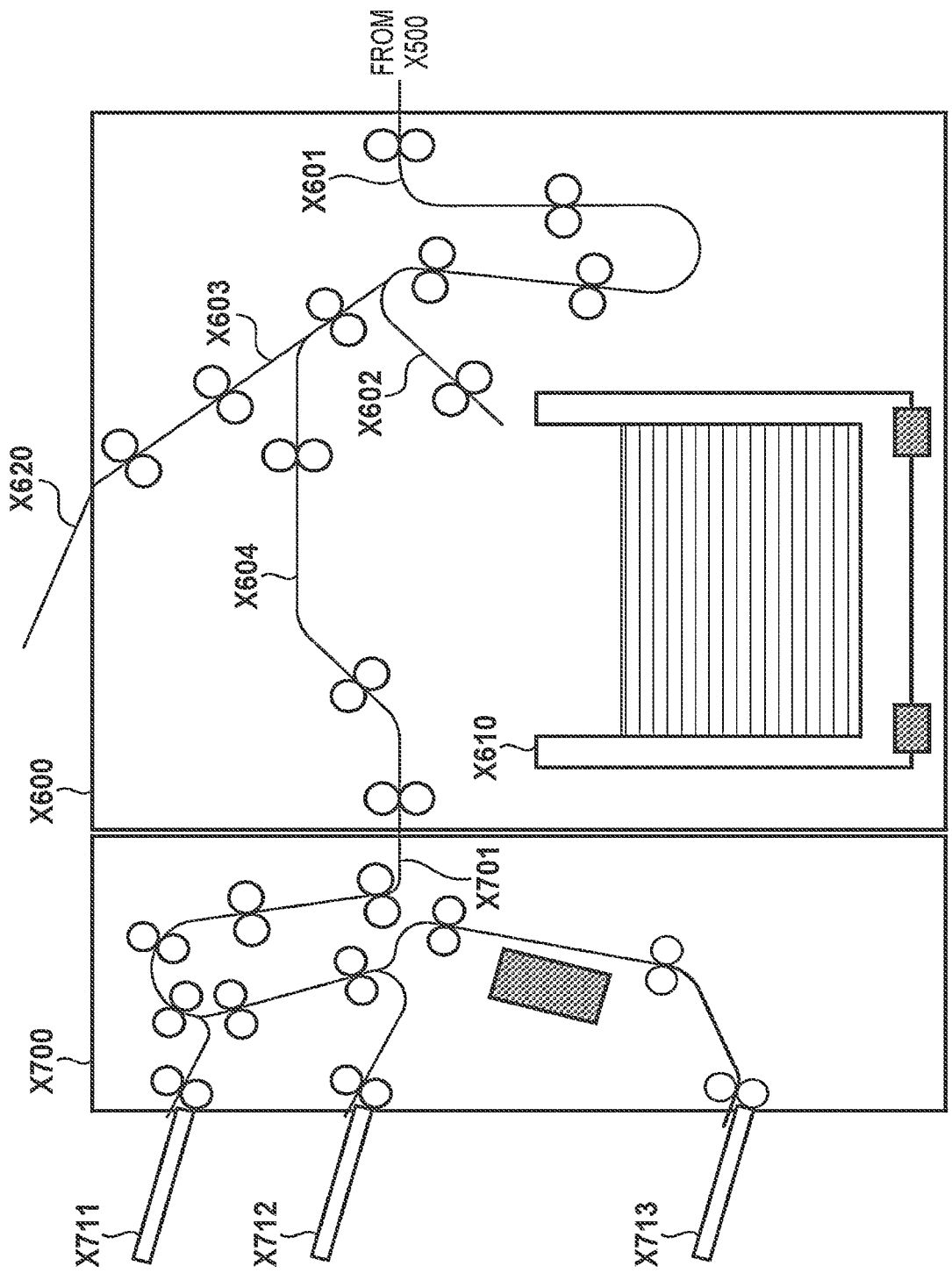

FIG. 7

| | m-11 | m-10 | m-9 | m-8 | m-7 | m-6 | m-5 | m-4 | m-3 | m-2 | m-1 | m | m+1 | ⋯ | m+9 | m+10 | m+11 |
|---|---|---|---|---|---|---|---|---|---|---|---|---|---|---|---|---|---|
| n-7 | 0.000 | 0.000 | 0.000 | 0.000 | 0.000 | 0.000 | 0.000 | 0.000 | 0.000 | 0.000 | 0.000 | 0.000 | 0.000 | ⋯ | 0.000 | 0.000 | 0.000 |
| n-6 | 0.000 | 0.000 | 0.001 | 0.001 | 0.002 | 0.002 | 0.002 | 0.003 | 0.003 | 0.003 | 0.004 | 0.100 | 0.004 | ⋯ | 0.001 | 0.000 | 0.000 |
| n-5 | 0.000 | 0.000 | 0.008 | 0.012 | 0.015 | 0.019 | 0.023 | 0.027 | 0.031 | 0.035 | 0.038 | 0.200 | 0.038 | ⋯ | 0.008 | 0.004 | 0.000 |
| n-4 | 0.000 | 0.004 | 0.038 | 0.058 | 0.077 | 0.096 | 0.115 | 0.134 | 0.154 | 0.173 | 0.192 | 0.400 | 0.192 | ⋯ | 0.038 | 0.019 | 0.000 |
| n-3 | 0.000 | 0.019 | 0.096 | 0.144 | 0.192 | 0.240 | 0.288 | 0.336 | 0.384 | 0.432 | 0.480 | 0.600 | 0.480 | ⋯ | 0.096 | 0.048 | 0.000 |
| n-2 | 0.000 | 0.048 | 0.160 | 0.240 | 0.320 | 0.400 | 0.480 | 0.560 | 0.640 | 0.720 | 0.800 | 0.800 | 0.800 | ⋯ | 0.160 | 0.080 | 0.000 |
| n-1 | 0.000 | 0.080 | 0.200 | 0.300 | 0.400 | 0.500 | 0.600 | 0.700 | 0.800 | 0.900 | 1.000 | 1.000 | 1.000 | ⋯ | 0.200 | 0.100 | 0.000 |
| n | 0.000 | 0.100 | 0.200 | 0.300 | 0.400 | 0.500 | 0.600 | 0.700 | 0.800 | 0.900 | 1.000 | ✕ | 1.000 | ⋯ | 0.200 | 0.100 | 0.000 |
| n+1 | 0.000 | 0.100 | 0.200 | 0.300 | 0.400 | 0.500 | 0.600 | 0.700 | 0.800 | 0.900 | 1.000 | 1.000 | 1.000 | ⋯ | 0.200 | 0.100 | 0.000 |
| n+2 | 0.000 | 0.080 | 0.160 | 0.240 | 0.320 | 0.400 | 0.480 | 0.560 | 0.640 | 0.720 | 0.800 | 0.800 | 0.800 | ⋯ | 0.160 | 0.080 | 0.000 |
| n+3 | 0.000 | 0.048 | 0.096 | 0.144 | 0.192 | 0.240 | 0.288 | 0.336 | 0.384 | 0.432 | 0.480 | 0.600 | 0.480 | ⋯ | 0.096 | 0.048 | 0.000 |
| n+4 | 0.000 | 0.019 | 0.038 | 0.058 | 0.077 | 0.096 | 0.115 | 0.134 | 0.154 | 0.173 | 0.192 | 0.400 | 0.192 | ⋯ | 0.038 | 0.019 | 0.000 |
| n+5 | 0.000 | 0.004 | 0.008 | 0.012 | 0.015 | 0.019 | 0.023 | 0.027 | 0.031 | 0.035 | 0.038 | 0.200 | 0.038 | ⋯ | 0.008 | 0.004 | 0.000 |
| n+6 | 0.000 | 0.000 | 0.001 | 0.001 | 0.002 | 0.002 | 0.002 | 0.003 | 0.003 | 0.003 | 0.004 | 0.100 | 0.004 | ⋯ | 0.001 | 0.000 | 0.000 |
| n+7 | 0.000 | 0.000 | 0.000 | 0.000 | 0.000 | 0.000 | 0.000 | 0.000 | 0.000 | 0.000 | 0.000 | 0.000 | 0.000 | ⋯ | 0.000 | 0.000 | 0.000 |

FIG. 10

| No. | RIP SIGNAL VALUE | | | CALIBRATED VALUE | | |
|---|---|---|---|---|---|---|
| | R | G | B | R | G | B |
| 1 | 255 | 255 | 255 | 250 | 250 | 250 |
| 2 | 255 | 255 | 254 | 250 | 250 | 250 |
| 3 | 255 | 255 | 253 | 250 | 250 | 250 |
| ⋮ | ⋮ | ⋮ | ⋮ | ⋮ | ⋮ | ⋮ |
| 8388607 | 128 | 128 | 129 | 126 | 126 | 126 |
| 8388608 | 128 | 128 | 128 | 126 | 126 | 126 |
| 8388609 | 128 | 128 | 127 | 126 | 126 | 125 |
| | | | | | | |
| 16777214 | 0 | 0 | 2 | 8 | 8 | 8 |
| 16777215 | 0 | 0 | 1 | 8 | 8 | 8 |
| 16777216 | 0 | 0 | 0 | 8 | 8 | 8 |

| | m-11 | m-10 | m-9 | m-8 | m-7 | m-6 | m-5 | m-4 | m-3 | m-2 | m-1 | m | m+1 | ~ | m+9 | m+10 | m+11 |
|---|---|---|---|---|---|---|---|---|---|---|---|---|---|---|---|---|---|
| n-7 | 0.000 | 0.000 | 0.000 | 0.000 | 0.000 | 0.000 | 0.000 | 0.000 | 0.000 | 0.000 | 0.000 | 0.000 | 0.000 | ~ | 0.000 | 0.000 | 0.000 |
| n-6 | 0.000 | 0.000 | 0.000 | 0.000 | 0.000 | 0.000 | 0.000 | 0.000 | 0.000 | 0.000 | 0.000 | 0.000 | 0.000 | ~ | 0.000 | 0.000 | 0.000 |
| n-5 | 0.000 | 0.000 | 0.000 | 0.000 | 0.001 | 0.002 | 0.003 | 0.004 | 0.005 | 0.006 | 0.008 | 0.010 | 0.008 | ~ | 0.000 | 0.000 | 0.000 |
| n-4 | 0.000 | 0.000 | 0.000 | 0.000 | 0.008 | 0.016 | 0.032 | 0.040 | 0.048 | 0.064 | 0.080 | 0.200 | 0.080 | ~ | 0.000 | 0.000 | 0.000 |
| n-3 | 0.000 | 0.000 | 0.000 | 0.000 | 0.040 | 0.080 | 0.160 | 0.200 | 0.240 | 0.320 | 0.400 | 0.500 | 0.400 | ~ | 0.000 | 0.000 | 0.000 |
| n-2 | 0.000 | 0.000 | 0.000 | 0.000 | 0.080 | 0.160 | 0.320 | 0.400 | 0.480 | 0.640 | 0.800 | 0.800 | 0.800 | ~ | 0.000 | 0.000 | 0.000 |
| n-1 | 0.000 | 0.000 | 0.000 | 0.000 | 0.100 | 0.200 | 0.400 | 0.500 | 0.600 | 0.800 | 1.000 | 1.000 | 1.000 | ~ | 0.000 | 0.000 | 0.000 |
| n | 0.000 | 0.000 | 0.000 | 0.000 | 0.100 | 0.200 | 0.400 | 0.500 | 0.600 | 0.800 | 1.000 | X | 1.000 | ~ | 0.000 | 0.000 | 0.000 |
| n+1 | 0.000 | 0.000 | 0.000 | 0.000 | 0.100 | 0.200 | 0.400 | 0.500 | 0.600 | 0.800 | 1.000 | 1.000 | 1.000 | ~ | 0.000 | 0.000 | 0.000 |
| n+2 | 0.000 | 0.000 | 0.000 | 0.000 | 0.080 | 0.160 | 0.320 | 0.400 | 0.480 | 0.640 | 0.800 | 0.800 | 0.800 | ~ | 0.000 | 0.000 | 0.000 |
| n+3 | 0.000 | 0.000 | 0.000 | 0.000 | 0.040 | 0.080 | 0.160 | 0.200 | 0.240 | 0.320 | 0.400 | 0.500 | 0.400 | ~ | 0.000 | 0.000 | 0.000 |
| n+4 | 0.000 | 0.000 | 0.000 | 0.000 | 0.008 | 0.016 | 0.032 | 0.040 | 0.048 | 0.064 | 0.080 | 0.200 | 0.080 | ~ | 0.000 | 0.000 | 0.000 |
| n+5 | 0.000 | 0.000 | 0.000 | 0.000 | 0.001 | 0.002 | 0.003 | 0.004 | 0.005 | 0.006 | 0.008 | 0.010 | 0.008 | ~ | 0.000 | 0.000 | 0.000 |
| n+6 | 0.000 | 0.000 | 0.000 | 0.000 | 0.000 | 0.000 | 0.000 | 0.000 | 0.000 | 0.000 | 0.000 | 0.000 | 0.000 | ~ | 0.000 | 0.000 | 0.000 |
| n+7 | 0.000 | 0.000 | 0.000 | 0.000 | 0.000 | 0.000 | 0.000 | 0.000 | 0.000 | 0.000 | 0.000 | 0.000 | 0.000 | ~ | 0.000 | 0.000 | 0.000 |

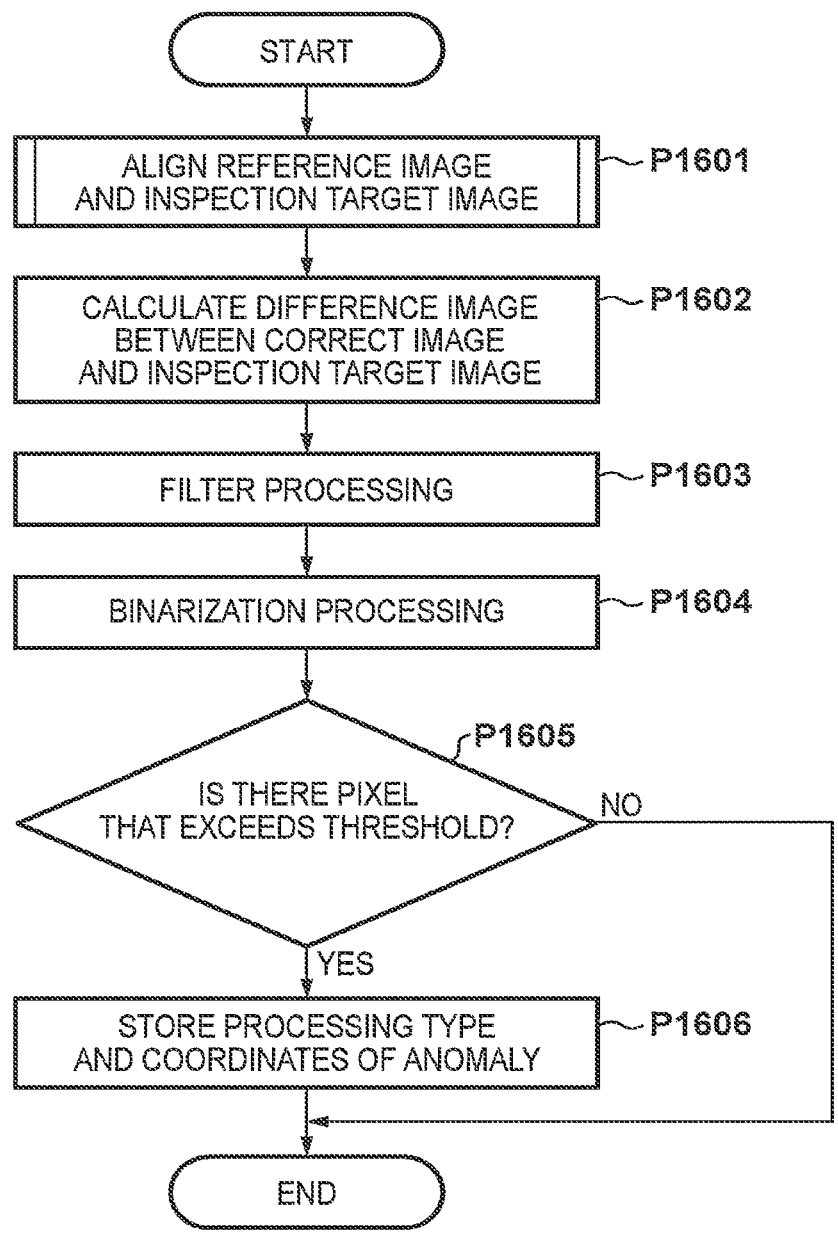

INSPECTION APPARATUS, METHOD, AND STORAGE MEDIUM, THAT CORRECT REFERENCE IMAGE AND INSPECT PRINTED MATERIAL BASED ON THE CORRECTED REFERENCE IMAGE

BACKGROUND OF THE INVENTION

Field of the Invention

The present disclosure relates to an inspection apparatus, method, and a storage medium, that correct a reference image and an inspect printed material based on the corrected reference image.

Description of the Related Art

Printed material output from an image-forming apparatus may be soiled by coloring agent such as ink, toner, or the like adhering to unintended areas. Alternatively, an insufficient amount of coloring agent may adhere to areas where an image should be formed, resulting in color loss, where the color is lighter than intended. Such printing anomalies, such as soiling and color loss, cause a drop in the quality of the printed material. Visual inspection, in which an inspector visually inspects for anomalies, requires significant time and incurs significant costs.

Thus far, an inspection apparatus has been known which inspects the quality of a printed image formed on a sheet by an image-forming apparatus by comparing input image data (also called a "reference image") with read image data of an image optically read from a sheet (also called an "inspection image"). The quality of the printed image can be quantitatively evaluated according to, for example, the degree to which the input image data and the read image data match.

When inspecting the quality in this manner, the input image data is digital data expressing an ideal image, whereas the read image data contains error caused by a variety of mechanical and optical factors in the scanner. Japanese Patent Laid-Open No. 2019-087792 discloses a technique for correcting an image using a predefined chart in order to prevent a drop in inspection accuracy caused by, for example, sheet misalignment and magnification error. With the technique disclosed in Japanese Patent Laid-Open No. 2019-087792, parameters for compensating for misalignment and magnification variation are calculated based on read image data generated by using a scanner to read a chart image formed on a sheet. The input image data is then corrected using the calculated parameters. Japanese Patent Laid-Open No. 2021-43032 proposes a method of converting the color space of input image data from the CMYK color space to the RGB color space and using the post-conversion data for quality inspection.

SUMMARY OF THE INVENTION

However, error arising when reading an image using a scanner contains not only misalignment and magnification error components, but also what is known as a "flare" component. "Flare" is a phenomenon in which light reflected from neighboring pixel positions on the sheet enters respective reading pixels of the scanner. Generally, the brighter the image is in the neighboring pixel positions, the greater the amount of flare becomes, and the effect of flare therefore differs from pixel position to pixel position in the sheet. Past quality inspection techniques have not been capable of sufficiently suppressing a drop in inspection accuracy caused by this effect of flare.

In view of the above-described circumstances, the present disclosure attempts to provide a technique for improving inspection accuracy for printed images by reducing the effect of flare appearing in read image data.

According to a first aspect, there is provided an image-forming system comprising: an image-forming unit configured to form a referential image expressing a predetermined pattern on a first sheet; a reading unit configured to optically read the referential image formed on the first sheet to generate referential read image data; and a calibration unit configured to calibrate input image data using a calibration parameter derived based on the referential read image data. The image-forming unit is configured to form a target image on a second sheet based on the input image data calibrated by the calibration unit. The reading unit is configured to optically read the target image formed on the second sheet to generate read image data for inspection. The image-forming system further comprises an inspection unit configured to inspect quality of the target image formed on the second sheet based on comparison between the input image data and the read image data for inspection. The calibration parameter is derived based on the referential read image data to which flare correction for removing an effect of flare in the reading unit has been applied. The inspection unit is configured to compare the input image data with the read image data for inspection to which the flare correction has been applied.

According to a second aspect, there is provided an inspection apparatus comprising: a first obtaining unit configured to obtain an inspection target image by irradiating with light a printed material to be inspected and receiving reflected light from the printed material; a second obtaining unit configured to obtain a reference image based on printing data used for printing the printed material; a correction unit configured to correct the reference image using predetermined weighting coefficients such that the reference image reflects an effect of flare on a pixel of interest in the printed material from neighboring pixels that occurs when the inspection target image is obtained by the first obtaining unit; and an inspection unit configured to compare the reference image corrected by the correction unit with the inspection target image to inspect the printed material for anomalies.

According to a third aspect there is provided an inspection apparatus comprising: a first obtaining unit configured to obtain an inspection target image by irradiating with light a printed material to be inspected and receiving reflected light from the printed material; a second obtaining unit configured to obtain a reference image based on printing data used for printing the printed material; a correction unit configured to correct the inspection target image using predetermined weighting coefficients so as to remove, from the inspection target image, an effect of flare on a pixel of interest in the printed material from neighboring pixels that occurs when the inspection target image is obtained by the first obtaining unit; and an inspection unit configured to compare the inspection target image corrected by the correction unit with the reference image to inspect the printed material for anomalies.

According to a fourth aspect, there is provided an inspection apparatus comprising: an obtaining unit configured to obtain a reference image based on printing data used for printing printed material to be inspected; a correction unit configured to correct the reference image using correction values expressing an effect of reflected light produced when reading the printed material; and an inspection unit configured to inspect the printed material for anomalies based on the reference image corrected by the correction unit and an inspection target image obtained by reading the printed material.

Further features of the present invention will become apparent from the following description of exemplary embodiments (with reference to the attached drawings).

BRIEF DESCRIPTION OF THE DRAWINGS

FIG. 1B is a schematic diagram illustrating a second part of the configuration of the image-forming system according to the first embodiment.

FIG. 7 is a descriptive diagram illustrating an example of weighting data defining a set of weights used in flare correction.

FIG. 10 is a descriptive diagram illustrating an example of the configuration of a lookup table for calibration.

FIG. 13 is a descriptive diagram illustrating another example of weighting data defining a set of weights used in flare correction.

FIG. 28 is a flowchart illustrating a processing sequence for anomaly detection processing according to the second embodiment.

DESCRIPTION OF THE EMBODIMENTS

Figure 1A:
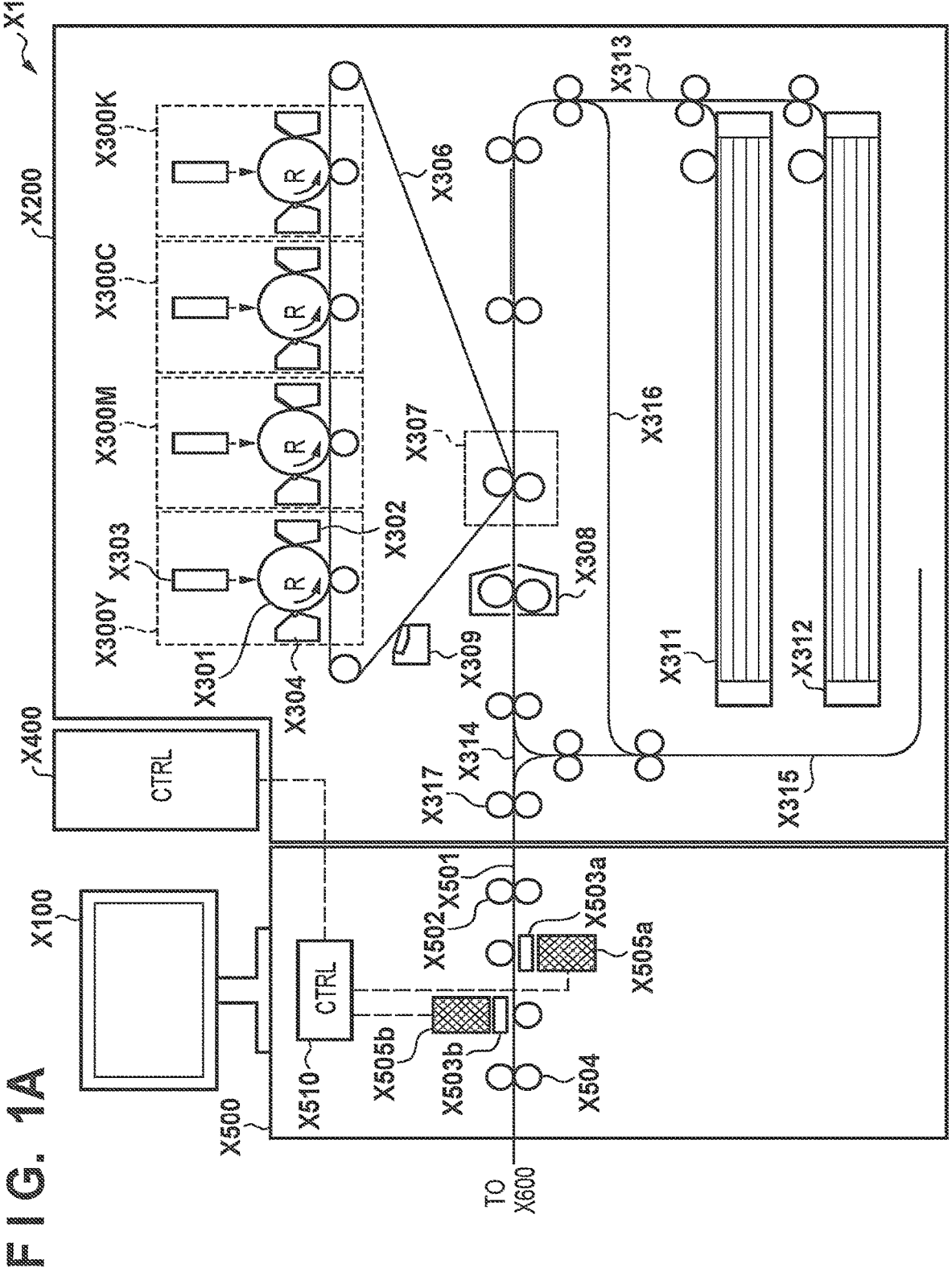
FIG. 1A is a schematic diagram illustrating a first part of the configuration of an image-forming system according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. First Embodiment 1-1. System Overview

FIGS. 1A and 1B are schematic diagrams illustrating the configuration of an image-forming system X1 according to a first embodiment. Referring to FIG. 1A, the image-forming system X1 includes an operation unit X100, an image-forming apparatus X200, a control apparatus X400, and an inspection apparatus X500. Referring to FIG. 1B, the image-forming system X1 further includes a stacker X600 and a finisher X700.

(1) Operation Unit

The operation unit X100 is an apparatus that provides a user with a user interface constituted by an input interface and an output interface. The input interface may include at least one of, for example, input keys, a touch panel, buttons, and switches. The output interface may include at least one of, for example, a display, a speaker, and a lamp. The operation unit X100 accepts user inputs made through the input interface and transmits instruction signals or data corresponding to the accepted user inputs to the control apparatus X400. The operation unit X100 also outputs information from the output interface (e.g., causes a display to display images or causes a speaker to output audio) based on commands received from the control apparatus X400.

(2) Image-Forming Apparatus

The image-forming apparatus X200 is an apparatus that forms an image on a sheet (also called a "printer"). In the present embodiment, the image-forming apparatus X200 is a color printer capable of forming color images. In another embodiment, however, the image-forming apparatus X200 may be a black-and-white printer. The image-forming apparatus X200 includes image-forming units X300Y, X300M, X300C, and X300K; an intermediate transfer member X306; a transfer unit X307; a fixing unit X308, a cleaner X309; paper feed cassettes X311 and X312; and a feeding mechanism.

The image-forming unit X300Y forms a yellow (Y) toner image on the intermediate transfer member X306. The image-forming unit X300M forms a magenta (M) toner image on the intermediate transfer member X306. The image-forming unit X300C forms a cyan (C) toner image on the intermediate transfer member X306. The image-forming unit X300K forms a black (K) toner image on the intermediate transfer member X306. The image-forming units X300Y, X300M, X300C, and X300K have the same configurations as each other, and thus the configuration of the image-forming unit X300Y will be described here as an example. The image-forming unit X300Y includes a photosensitive drum X301, a charger X302, an exposure unit X303, and a developer X304. The photosensitive drum X301 is a drum-shaped photosensitive member having a photosensitive layer on the surface thereof. The photosensitive drum X301 rotates about a drum shaft in the direction of an arrow R in the drawings. The charger X302 uniformly charges the surface of the rotating photosensitive drum X301. The exposure unit X303 irradiates the photosensitive drum X301 with a laser beam according to image data (here, expressing a yellow image) input from the control apparatus X400. The laser beam output from the exposure unit X303 scans the surface of the charged photosensitive drum X301 in the drum axis direction and forms an electrostatic latent image on the surface of the photosensitive drum X301. The developer X304 develops the electrostatic latent image on the photosensitive drum X301 by supplying (yellow, in this case) toner to the surface of the photosensitive drum X301. A toner image is formed on the surface of the photosensitive drum X301 as a result. The yellow toner image formed on the surface of the photosensitive drum X301 in the image-forming unit X300Y is transferred to the intermediate transfer member X306. Furthermore, the magenta, cyan, and black toner images formed on the surface of the respective photosensitive drums X301 in the image-forming units X300M, X300C, and X300K are superimposed onto the yellow toner image in order and transferred to the intermediate transfer member X306. A full-color toner image is formed on the intermediate transfer member X306 as a result. The intermediate transfer member X306 is an endless belt member which rotates in what is the clockwise direction in the drawings. The intermediate transfer member X306 transports the full-color toner image to the position of the transfer unit X307 (a transfer position).

The paper feed cassettes X311 and X312 hold bundles of sheets. A sheet is picked up from the paper cassette X311 or X312 by the feeding mechanism and transported along a transport path X313. The sheet is transported to the transfer position under the control of the control apparatus X400, so as to coincide with the timing at which the toner image on the intermediate transfer member X306 reaches the transfer position.

The transfer unit X307 transfers the toner image carried by the intermediate transfer member X306 to the sheet at the transfer position. The fixing unit X308 includes a heater and a pressure roller. The fixing unit X308 heats the toner image transferred onto the sheet using the heater, and pressurizes the toner image using the pressure roller. This melts the toner on the sheet and fixes the toner image onto the sheet. The cleaner X309 is disposed downstream from the transfer position on the path of the intermediate transfer member X306, and removes toner remaining on the intermediate transfer member X306 after the toner image has been transferred.

The transport path X313 branches into transport paths X314 and X315 downstream from the fixing unit X308. After passing through the fixing unit X308, the sheet is first transported from the transport path X313 to the transport path X315. When a following end of the sheet enters the transport path X315, the transport direction reverses and the sheet is discharged from discharge rollers X317 to the inspection apparatus X500. As a result of this transport, the sheet is discharged with the surface on which the image is formed facing down (called "face-down"). When performing double-sided printing, the sheet which has entered the transport path X315 is transported to the transport path X316, and then returns from the transport path X316 back to the transport path X313, passing through the transfer position again having been flipped front to back. At the transfer position, a toner image is formed on the back surface of the sheet by the transfer unit X307, and the toner image is fixed to the sheet in the fixing unit X308. The sheet having images formed on both sides is discharged from the discharge rollers X317 to the inspection apparatus X500.

(3) Control Apparatus

The control apparatus X400 controls the operations of the image-forming apparatus X200, the inspection apparatus X500, the stacker X600, and the finisher X700 based on instruction signals received from the operation unit X100 or an external network. For example, when the user has made an instruction to execute a print job, the control apparatus X400 controls the image-forming apparatus X200 to form an image based on designated input image data onto the sheet. The configuration of the control apparatus X400 will be described in detail later.

(4) Inspection Apparatus

The inspection apparatus X500 includes a transport path X501, transport rollers X502, a flowing reading glass X503a, a flowing reading glass X503b, transport rollers X504, a first reading unit X505a, a second reading unit X505b, and an inspection control unit X510. The transport rollers X502 accept the sheet discharged from the image-forming apparatus X200, and transport the sheet along the transport path X501. The first reading unit X505a generates read image data by optically reading the image formed on the lower surface of the sheet passing above the flowing reading glass X503a, and outputs the generated read image data to the inspection control unit X510. The first reading unit X505a irradiates the sheet with white light from at least one white light emitting diode (LED), for example. The first reading unit X505a can read the image on the sheet by using an array of pixels in a Complementary Metal Oxide Semiconductor (CMOS) sensor, for example, to detect reflected light reflected by the lower surface of the sheet. Typically, the first reading unit X505a receives the reflected light from the sheet having been divided into three color components by RGB color filters. Accordingly, the read image data output from the first reading unit X505a is data expressing a three-dimensional vector having three RGB color component values, for each pixel. The second reading unit X505b generates read image data by optically reading the image formed on the upper surface of the sheet passing below the flowing reading glass X503b, and outputs the generated read image data to the inspection control unit X510. The second reading unit X505b may have a configuration similar to that of the first reading unit X505a, and thus the read image data output from the second reading unit X505b is also data expressing a three-dimensional vector having three RGB color component values, for each pixel. The transport rollers X504 discharge the sheet which has passed the flowing reading glasses X503a and X503b to the stacker X600. The inspection control unit X510 controls such operations of the inspection apparatus X500 in cooperation with the control apparatus X400. The configuration of the inspection control unit X510 will be described in detail later.

(5) Stacker

Referring to FIG. 1B, the stacker X600 includes transport paths X601, X602, X603, and X604, a high-capacity tray X610, and a purge tray X620. The stacker X600 accepts sheets passed from the inspection apparatus X500 into the transport path X601. The transport path X601 branches into the transport path X602, which leads to the high-capacity tray X610; the transport path X603, which leads to the purge tray X620; and the transport path X604, which leads to the finisher X700. For example, a sheet on which an image has been formed and which has been determined to be defective by the inspection apparatus X500 can be discharged to the purge tray X620 through the transport path X603 under the control of the control apparatus X400. A sheet which requires post-processing by the finisher X700 can be discharged to the finisher X700, and other sheets can be discharged to the high-capacity tray X610.

(6) Finisher

The finisher X700 is a post-processing apparatus including a transport path X701 and discharge trays X711, X712, and X713. The finisher X700 accepts the sheet passed from the stacker X600 into the transport path X701, and discharges the sheet to one of the discharge trays X711, X712, and X713 under the control of the control apparatus X400. Although not illustrated here, the finisher X700 may include mechanisms for performing various types of post-processing, such as stapling processing, binding processing, or cutting processing for multiple sheets.

1-2. Example of Configuration of Control Apparatus

Figure 2:
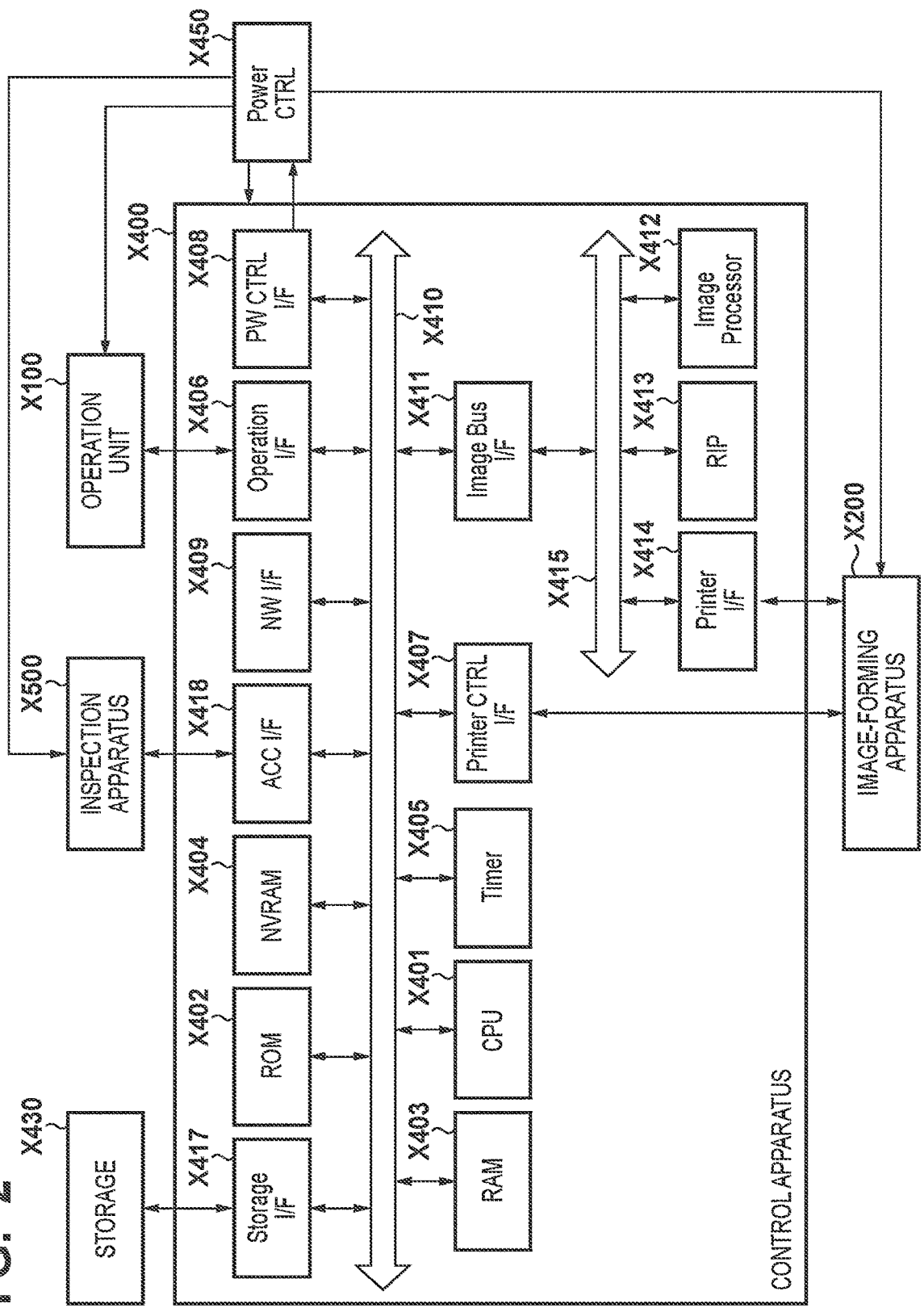
FIG. 2 is a block diagram illustrating an example of the configuration of a control apparatus according to the first embodiment.

FIG. 2 is a block diagram illustrating an example of the configuration of the control apparatus X400. The above-described operation unit X100, image-forming apparatus X200, inspection apparatus X500, stacker X600, and finisher X700 are connected to the control apparatus X400, but FIG. 2 does not show the connection relationships between the control apparatus X400 and the stacker X600 and finisher X700. Storage X430 and a power control unit X450 are further connected to the control apparatus X400.

The control apparatus X400 includes a CPU X401, a ROM X402, a RAM X403, an NVRAM X404, and a timer X405. The Central Processing Unit (CPU) X401 is a processor that controls the overall operation of the image-forming system X1 by executing computer programs including software instructions. The Read-Only Memory (ROM) X402 is a non-volatile memory (also called a "non-transitory computer-readable storage medium") storing at least one computer program executed by the CPU X401. The Random Access Memory (RAM) X403 is a volatile memory that provides a temporary storage area for processing by the CPU X401. The RAM X403 may be used as an image memory for temporarily storing image data. The Non-Volatile RAM (NVRAM) X404 is a small-scale non-volatile memory that stores the values of various parameters needed to control the operation of the image-forming system X1. The timer X405 is used to obtain the current time and monitor the passage of a set length of time. The CPU X401, the ROM X402, the RAM X403, the NVRAM X404, and the timer X405 are connected to each other over a system bus X410.

The control apparatus X400 further includes interfaces (I/F) such as an operation I/F X406, a printer control I/F X407, a power control I/F X408, a network I/F X409, an image bus I/F X411, a storage I/F X417, and an ACC I/F X418. These interfaces are also connected to each other over the system bus X410. The operation I/F X406 connects the control apparatus X400 to the operation unit X100. The printer control I/F X407 is an interface that mediates control communication between the control apparatus X400 and the image-forming apparatus X200. The power control I/F X408 connects the control apparatus X400 to the power control unit X450. The power control unit X450 causes power to be supplied as needed to each apparatus constituting the image-forming system X1 from a power source (not shown) according to commands input from the CPU X401 via the power control I/F X408. The network I/F X409 connects the control apparatus X400 to an external network (not shown). The control apparatus X400 can communicate with external apparatuses (e.g., a host computer) via the network I/F X409. The network I/F X409 may be, for example, a wired Local Area Network (LAN) interface or a wireless LAN interface. For example, input image data required to execute a print job (e.g., Page Description Language (PDL) data) can be received from an external apparatus via the network I/F X409. The network I/F X409 may include a memory that stores parameters for communication control, such as address information of the control apparatus X400 (e.g., a MAC address and an IP address). The image bus I/F X411 is a bridge that mediates a connection between the system bus X410 and an image bus X415. The storage I/F X417 connects the control apparatus X400 to the storage X430. The storage X430 is a high-capacity storage apparatus. The storage X430 may be, for example, a Hard Disk Drive (HDD) or a Solid State Drive (SSD). The ACC I/F X418 connects the control apparatus X400 to the inspection apparatus X500.

The control apparatus X400 further includes an image processing unit X412, a RIP X413, and a printer I/F X414. The image bus I/F X411, the image processing unit X412, the RIP X413, and the printer I/F X414 are connected to each other over the image bus X415. The image processing unit X412 performs image processing on the image data, such as for example, compressing or decompressing image data according to an image compression method, rotating images to correct skew, correcting pixel values, converting color spaces, or converting resolutions. In the present embodiment, the image processing unit X412 also has a function for calibrating the input image data using calibration parameters, which will be described in detail later. The image processing unit X412 is therefore also called a "calibration unit X412". The Raster Image Processor (RIP) X413 expands the PDL data into raster image data in bitmap format. The printer I/F X414 is an interface that mediates the communication of image data between the control apparatus X400 and the image-forming apparatus X200. The input image data of a print job is processed by the image processing unit X412, and is output to the image-forming apparatus X200 via the printer I/F X414 after having been converted into data in bitmap format (also called "raster format") by the RIP X413.

1-3. Example of Configuration of Inspection Control Unit

Figure 3:
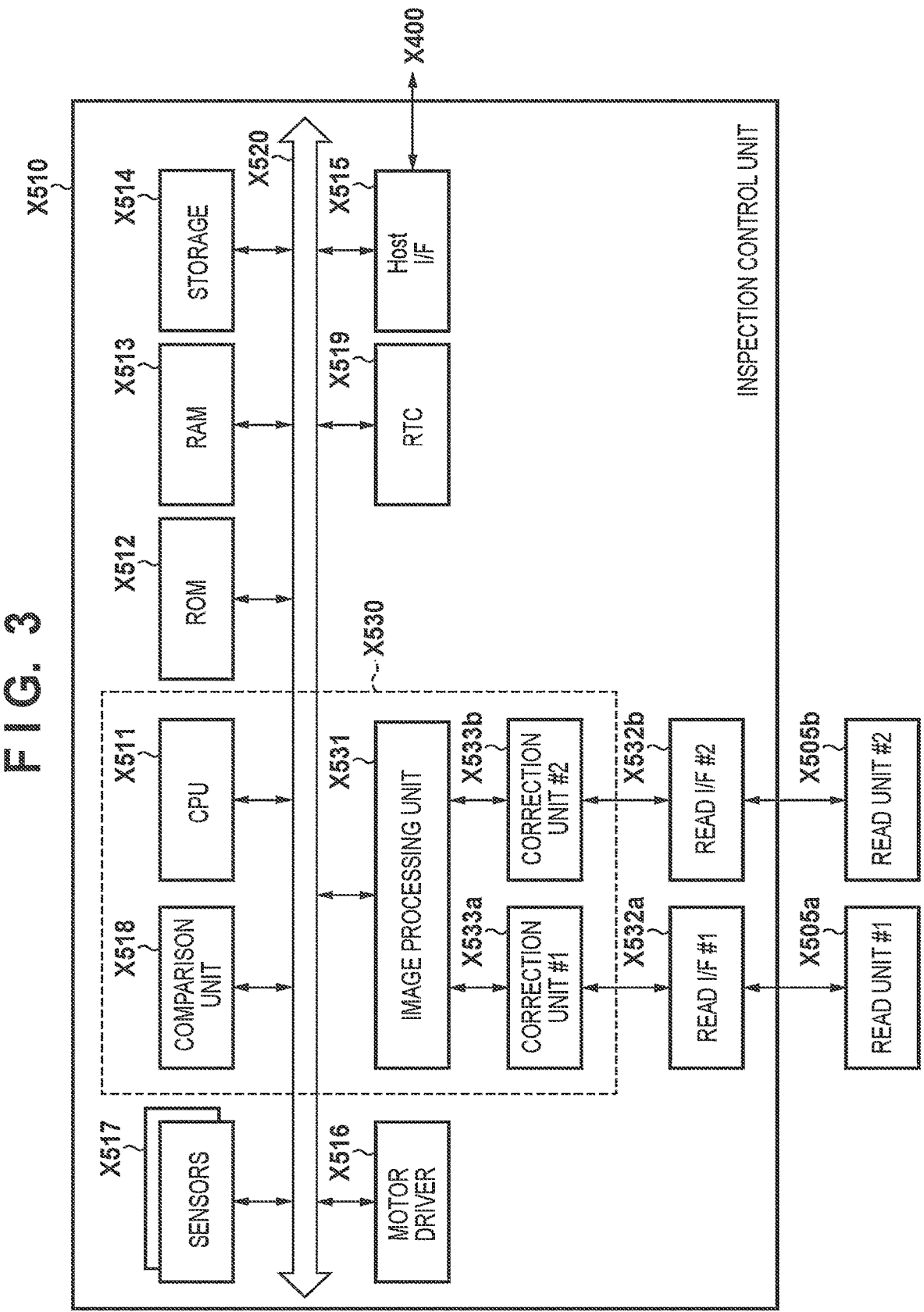
FIG. 3 is a block diagram illustrating an example of the configuration of an inspection control unit according to the first embodiment.

FIG. 3 is a block diagram illustrating an example of the configuration of the inspection control unit X510. The inspection control unit X510 includes a CPU X511, a ROM X512, a RAM X513, storage X514, a host I/F X515, a motor driver X516, sensors X517, a comparison unit X518, an RTC X519, and an image processing unit X531.

The CPU X511 is a processor that controls the operation of the inspection apparatus X500 by executing computer programs including software instructions. The ROM X512 is a non-volatile memory that stores at least one computer program executed by the CPU X511. The RAM X513 is a volatile memory that provides a temporary storage area for processing by the CPU X511. The RAM X513 may be used as an image memory for temporarily storing image data. The storage X514 may be, for example, a storage apparatus such as an HDD or an SSD, and can store various data such as weighting data for flare correction (described later). The host I/F X515 connects the inspection control unit X510 to the ACC I/F X418 of the control apparatus X400. For example, when the image-forming apparatus X200 has formed an image requiring inspection on a sheet, the host I/F X515 receives raster format input image data corresponding to that image from the control apparatus X400. The received input image data is stored in the storage X514, for example.

Under the control of the CPU X511, the motor driver X516 drives a motor (not shown) for rotating the plurality of rollers in the inspection apparatus X500 such that the sheet is transported along the transport path within the inspection apparatus X500 at the appropriate timing. The sensors X517 represent a plurality of sensors including a sensor for detecting the position of the sheet passing through the transport path in the inspection apparatus X500. The sensors X517 outputs respective detection results to the CPU X511. The comparison unit X518 compares the input image data with read image data for inspection (described later) to inspect the quality of a target image formed on the sheet. Inspection based on the image comparison performed in the comparison unit X518 will be described further later. The Real Time Clock (RTC) X519 is a clock that measures real time with high precision. Synchronization between the sheet transport and image reading in the inspection apparatus X500 can be maintained based on measurements by the RTC X519. The CPU X511, the ROM X512, the RAM X513, the storage X514, the host I/F X515, the motor driver X516, the sensors X517, the comparison unit X518, the RTC X519, and the image processing unit X531 are connected to each other over a system bus X520.

The inspection control unit X510 further includes a first reading I/F X532a, a second reading I/F X532b, a first correction unit X533a, and a second correction unit X533b. The first reading I/F X532a is an interface that connects the inspection control unit X510 to the first reading unit X505a illustrated in FIG. 1A. The first reading I/F X532a obtains the read image data of a first surface (the lower surface, in FIG. 1A) of the sheet from the first reading unit X505a, and outputs the obtained read image data to the first correction unit X533a. The first correction unit X533a applies flare correction for removing the effect of flare to the read image data input from the first reading I/F X532a. The second reading I/F X532b is an interface that connects the inspection control unit X510 to the second reading unit X505b illustrated in FIG. 1A. The second reading I/F X532b obtains the read image data of a second surface (the upper surface, in FIG. 1A) of the sheet from the second reading unit X505b, and outputs the obtained read image data to the second correction unit X533b. The second correction unit X533b applies flare correction for removing the effect of flare to the read image data input from the second reading I/F X532b. The flare correction performed by the first correction unit X533a and the second correction unit X533b will be described in detail later. The image processing unit X531 obtains the post-flare correction read image data from the first correction unit X533a and the second correction unit X533b. The image processing unit X531 performs image processing such as, for example, magnification and gamma correction on the obtained read image data, and outputs the processed read image data to the RAM X513 for comparison with the input image data by the comparison unit X518, for example. Note that in the following descriptions, the CPU X511, the comparison unit X518, the image processing unit X531, the first correction unit X533a, and the second correction unit X533b may be collectively called an "inspection unit X530".

1-4. Details of Inspection Processing

1-4-1. Settings Related to Inspection

Figure 4:
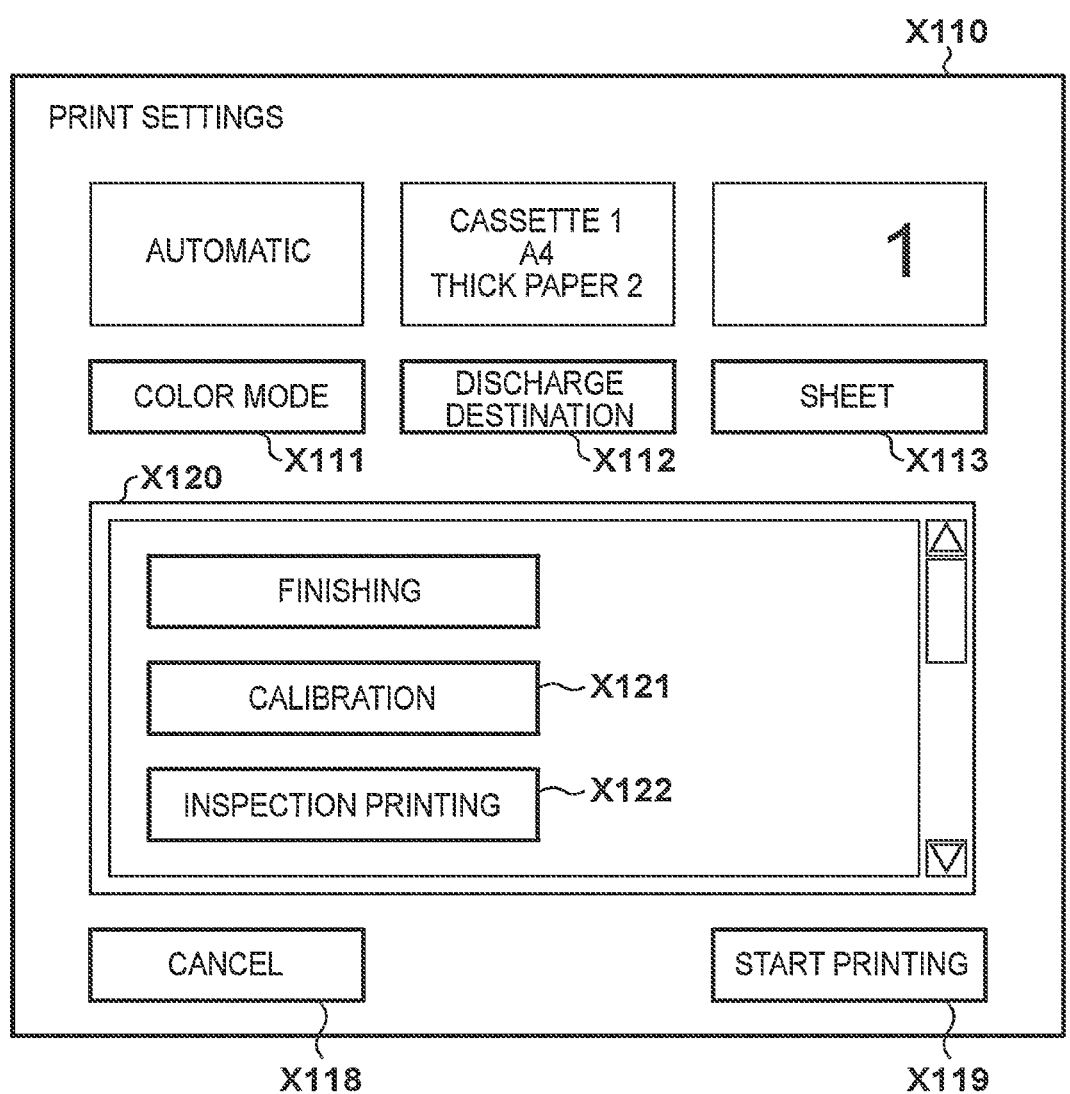
FIG. 4 is a descriptive diagram illustrating an example of a print settings screen according to the first embodiment.

FIG. 4 is a descriptive diagram illustrating an example of a print settings screen according to the first embodiment. A print settings screen X110 illustrated in FIG. 4 can be displayed in the display of the operation unit X100 or a host computer when, for example, the user instructs the image-forming system X1 to execute a print job. The print settings screen X110 includes a first setting button X111, a second setting button X112, a third setting button X113, a cancel button X118, a print start button X119, and an advanced menu section X120.

The first setting button X111 is a button for setting a color mode (color or black-and-white). The second setting button X112 is a button for setting to which discharge tray sheets are to be discharged. The third setting button X113 is a button for setting the type of sheet to be used for printing. It may be made possible to display information such as the size and basis weight of the sheets held in each cassette, and to change the cassette to be used, in response to the third setting button X113 being operated. The cancel button X118 is a button for canceling the execution of the print job and closing the print settings screen X110. The print start button X119 is a button for instructing a print job which does not involve inspection to be executed.

A user interface for calling detailed setting items or advanced functions is provided in the advanced menu section X120. In the example in FIG. 4, the advanced menu section X120 includes a calibration button X121 and an inspection print button X122. The calibration button X121 is a button for instructing the execution of a calibration function (described later) to be started. The inspection print button X122 is a button for calling a user interface related to inspection printing (printing for quality inspection). When the user operates the inspection print button X122, the print settings screen X110 transitions to an inspection print screen X140, illustrated in FIG. 5.

Figure 5:
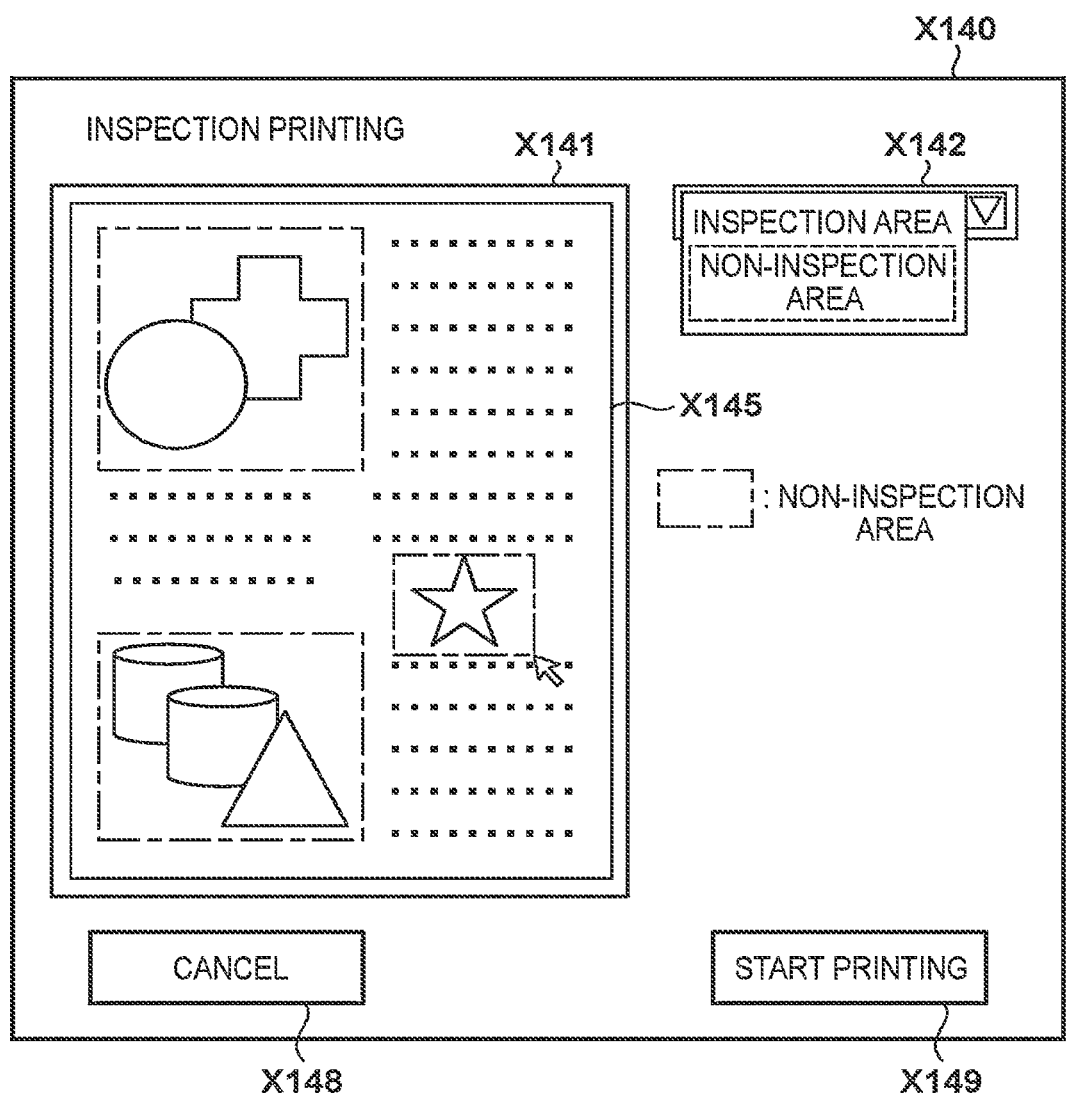
FIG. 5 is a descriptive diagram illustrating an example of an inspection print screen according to the first embodiment.

FIG. 5 is a descriptive diagram illustrating an example of an inspection print screen according to the first embodiment. Referring to FIG. 5, the inspection print screen X140 includes an area designation section X141, a pull-down menu X142, a cancel button X148, and a print start button X149. A preview of a target image to be inspected (an input image for the print job) is displayed in the area designation section X141. The pull-down menu X142 has two options, namely "inspection area" and "non-inspection area", and accepts the selection of one of these options. For example, when the user selects "inspection area" in the pull-down menu X142 and designates a target area in the area designation section X141 (using, for example, a dragging operation), the designated area is registered as the inspection area. In this case, the part of the target image outside the inspection area is excluded from the inspection of the quality of the printed image. On the other hand, when the user selects "non-inspection area" in the pull-down menu X142 and designates a target area in the area designation section X141, the designated area is registered as a non-inspection area. In this case, the part of the target image outside the non-inspection area is subject to inspection of the quality of the printed image. Although not illustrated in FIG. 5, the inspection print screen X140 may include additional buttons for transitioning the preview in the area designation section X141 among a plurality of pages. The cancel button X148 is a button for canceling the inspection printing settings and returning to the print settings screen X110. The print start button X149 is a button for instructing an inspection printing job to be executed.

1-4-2. Principles of Flare Correction

When a printed image is read from a sheet using a scanner such as the first reading unit X505a and the second reading unit X505b of the inspection apparatus X500, the read image data often contains error caused by the above-described flare. Flare affects both calibration and inspections performed using the scanner. To effectively remove or reduce this effect of flare, a flare model such as that described hereinafter is incorporated in the present embodiment.

Figure 6A:
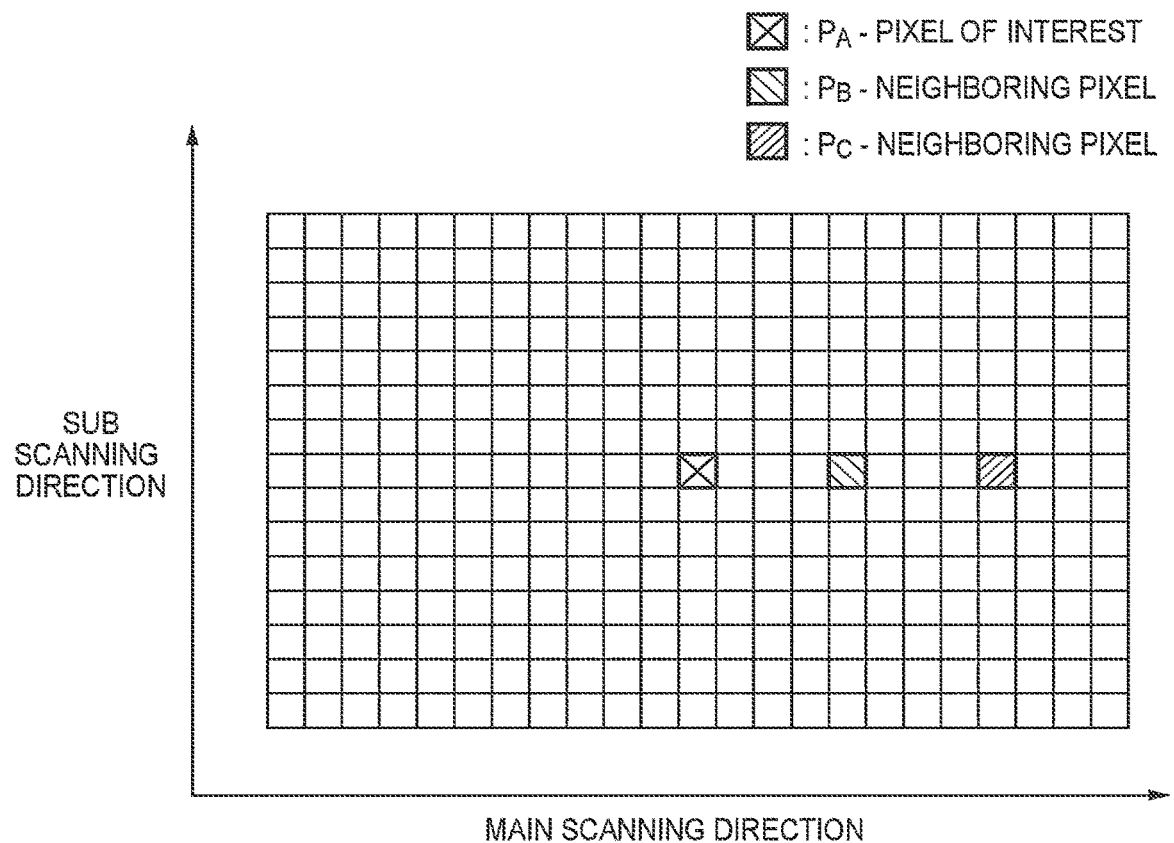
FIG. 6A is a descriptive diagram illustrating an example of positional relationships between a pixel of interest and neighboring pixels.

FIG. 6A is a descriptive diagram illustrating an example of positional relationships between a pixel of interest and neighboring pixels. In FIG. 6A, the horizontal axis represents a main scanning direction (a direction following the pixel array in the scanner), the vertical axis represents a sub scanning direction (a direction orthogonal to the main scanning direction), and the grid represents a given part of pixels in the read image data. A pixel of interest $P_A$ is assumed to be located in the center of the grid. Many neighboring pixels are present around the pixel of interest $P_A$, and neighboring pixels $P_B$ and $P_C$ are examples thereof. A distance between the pixel of interest $P_A$ and the neighboring pixel $P_B$ is shorter than a distance between the pixel of interest $P_A$ and the neighboring pixel $P_C$.

Figure 6B:
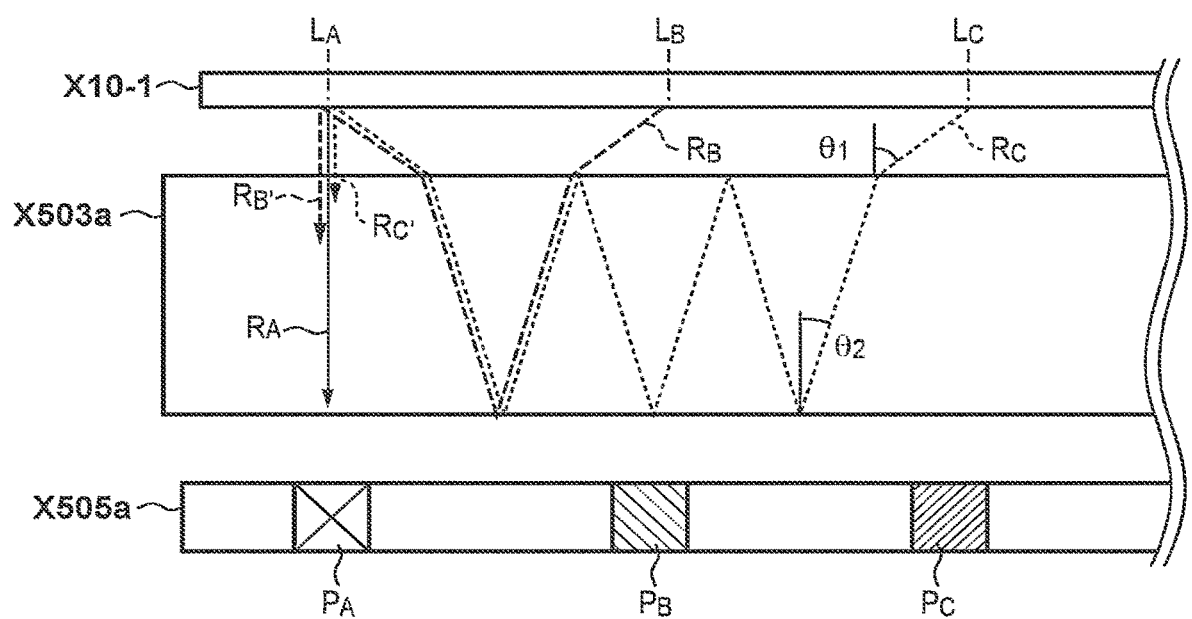
FIG. 6B is a descriptive diagram illustrating flare from neighboring pixels with respect to a pixel of interest when a sheet is blank.

FIG. 6B schematically illustrates the state of flare from neighboring pixels on the pixel of interest $P_A$ when the inspection apparatus X500 has accepted a white sheet. A white sheet X10-1 is partially indicated in the upper section of FIG. 6B, and positions $L_A$, $L_B$, and $L_C$ on the sheet X10-1 correspond to the positions of the pixel of interest $P_A$, the neighboring pixel $P_B$, and the neighboring pixel $P_C$, respectively. However, the relative positional relationships among these pixels are the issue here, and thus the absolute positions of the pixels have no special significance.

The flowing reading glass X503a is partially indicated in the middle section of FIG. 6B, and the pixel array of the first reading unit X505a is partially indicated in the lower section. When the first reading unit X505a irradiates the sheet X10-1 with light, the light is reflected by the lower surface of the sheet X10-1. Reflected light $R_A$ is the main component of light reflected at the position $L_A$, and is incident on the pixel of interest $P_A$. Reflected light $R_B$ is a secondary component of the light reflected at the position $L_B$, which is attenuated by being refracted and reflected at a boundary surface of the flowing reading glass X503a, and is incident on the pixel of interest $P_A$ as reflected light $R_B'$. Reflected light $R_C$ is a secondary component of the light reflected at the position $L_C$, which is attenuated by being refracted and reflected at the boundary surface of the flowing reading glass X503a, and is incident on the pixel of interest $P_A$ as reflected light $R_C'$. Refraction conditions of the flowing reading glass X503a can be expressed by the following Formula (A1):

$$N_1 \times \sin \theta_1 = N_2 \times \sin \theta_2 \qquad (A1)$$

Here, $N_1$ represents the refractive index of air, $N_2$ represents the refractive index of the flowing reading glass, $\theta_1$ represents the incident angle from the air to the glass, and $\theta_2$ represents the incident angle from the glass to the air. The greater $\theta_1$ is, the greater the component reflected at the boundary surface of the glass becomes. Although the drawings illustrate only one optical path from each of the positions $L_B$ and $L_C$ to the pixel of interest $P_A$, reflection can actually occur various numbers of times at the glass and the sheet, and thus there can be a plurality of optical paths from each position to the pixel of interest. The intensity of the reflected light $R_B'$ is lower than the intensity of the reflected light $R_A$. Because the distance between the position $L_A$ and the position $L_C$ is longer than the distance between the position $L_A$ and the position $L_B$, the reflected light $R_C'$ is attenuated more than the reflected light $R_B'$, and as such, the intensity of the reflected light $R_C'$ is lower than the intensity of the reflected light $R_B'$. In other words, the reflected light RA, $R_B'$, and $R_C'$, which are in the relationship $R_A > R_B' > R_C'$, are all incident on the pixel of interest $P_A$. In reality, the sum of reflected light from a range of N rows and M columns of neighboring pixels extending in the main scanning direction and the sub scanning direction from the pixel of interest $P_A$ at the center is incident on the pixel of interest $P_A$ as flare, not just the two neighboring pixels $P_B$ and $P_C$.

Assuming a position of a pixel of interest $P_A$ is (n,m) and positions of neighboring pixels are (i,j), where i=n−7, . . . , n+7 and j=m−11, m−11, an example of the ratio of a flare component from each position of the neighboring pixels to a desired component incident on the pixel of interest $P_A$ is indicated in FIG. 7 in matrix format. According to the example in FIG. 7, the magnitude of a flare component from a neighboring pixel that is eleven pixels away in the main scanning direction or seven pixels away in the sub scanning direction is substantially zero even if the sheet is white (i.e., when the effect of flare is the greatest). This ratio depends primarily on the structural properties of the scanner (e.g., the intensity of irradiated light, the image sensor configuration, the glass thickness, and the like) and are known through testing during the product development phase.

Figure 8:
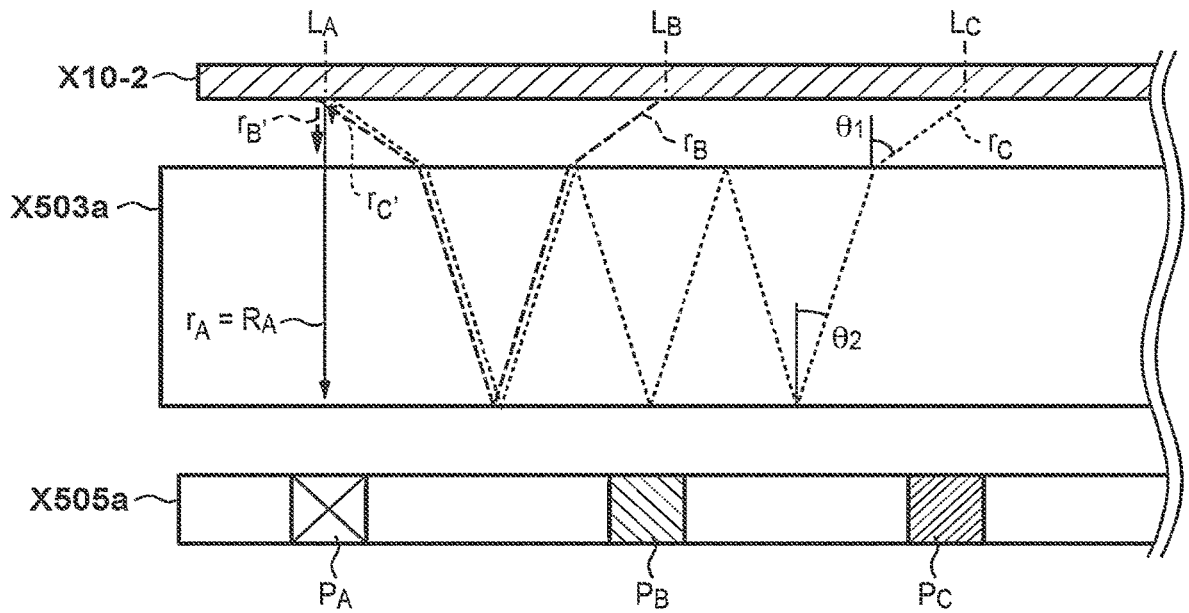
FIG. 8 is a descriptive diagram illustrating flare from neighboring pixels with respect to a pixel of interest when a sheet is solid black.

FIG. 8 schematically illustrates the state of flare for a sheet X10-2 on which a solid black image is formed at all positions aside from the position $L_A$ of the pixel of interest $P_A$, which is white, assuming the same positional relationships among pixels as in FIG. 6A. When the first reading unit X505a irradiates the sheet X10-2 with light, the light is reflected by the lower surface of the sheet X10-2. Reflected light rA is the main component of light reflected at the position $L_A$, and is incident on the pixel of interest $P_A$. Because the position $L_A$ on the sheet X10-2 is white, $r_A = R_A$. Reflected light $r_B$ is a secondary component of the light reflected at the position $L_B$, which is attenuated by being refracted and reflected at a boundary surface of the flowing reading glass X503a, and is incident on the pixel of interest $P_A$ as reflected light $r_B'$. Reflected light $r_C$ is a secondary component of the light reflected at the position Lc, which is attenuated by being refracted and reflected at the boundary surface of the flowing reading glass X503a, and is incident on the pixel of interest $P_A$ as reflected light $r_C'$. The positions $L_B$ and $L_C$ on the sheet X10-2 are black (i.e., the effect of flare is the smallest), and thus the intensities of the reflected light $r_B'$ and $r_C'$ are small enough to be substantially negligible. In this case, the incident light on the pixel of interest $P_A$ is effectively only the reflected light $r_A$, which is the desired component. Based on this, a ratio Z of the total amount of flare from the neighboring pixels to the desired component of the read signal value of the pixel of interest in the case of the white sheet X10-1 can be expressed by the following Formula (A2):

$$Z=((R_A+R_B'+R_C')-r_A)/RA=(R_B'+R_C')/R_A \qquad (A2)$$

For example, when $R_B'+R_C'=10$ and $R_A=250$, $Z=0.040$.

Using the ratio of the flare component for each neighboring pixel as a weight and calculating the weighted sum of the signal values of the neighboring pixels as illustrated in FIG. 7 makes it possible to quantitatively ascertain the magnitude of an error component to be removed from the signal value of the pixel of interest. For example, when all the signal values of the neighboring pixels are 10, multiplying the values of the weights in FIG. 7 by 10 and finding the total across all the neighboring pixels results in a weighted sum of 725 being calculated. When all the signal values of the neighboring pixels are 250, multiplying the values of the weights in FIG. 7 by 250 and finding the total across all the neighboring pixels results in a weighted sum of 18,128 being calculated. The magnitude of the error component to be removed from the signal value of the pixel of interest can take on any value between these minimum and maximum values, depending on the content of the printed image.

Here, assume the value of the weighted sum when all the neighboring pixels are white (solid white) is represented by $S_{max}$, the value of the weighted sum when all the neighboring pixels are black (solid black) is represented by $S_{min}$, and the value of the weighted sum calculated for the pixel of interest in a given read image is represented by S. In this case, a correction coefficient Q for removing the error component of flare error, which is to be multiplied with the read signal value of the pixel of interest, can be expressed by the following Formula (A3), as a function of S:

$$Q(s) = \frac{1}{Z \times \frac{S - S_{min}}{S_{max} - S_{min}} + 1} \qquad (A3)$$

The values of Z, $S_{max}$, and $S_{min}$, which are determined in advance, as well as the weighting data, are stored in the storage (also called the "storage unit") X514 of the inspection apparatus X500. The weighting data expresses a set of weights $w_{i,j}$ for each pixel position (i,j) of the neighboring pixels, which depends on the positional relationships between the pixel of interest and the neighboring pixels neighboring that pixel of interest. The first correction unit X533a and the second correction unit X533b read these data from the storage X514 when performing the flare correction. The first correction unit X533a and the second correction unit X533b dynamically calculate the weighted sum S of the signal values of the neighboring pixels using the weights $w_{i,j}$ expressed by the weighting data, taking each pixel in the read image data as the pixel of interest in sequence, and further calculate the correction coefficient Q based on Formula (A3). Then, the first correction unit X533a and the second correction unit X533b correct the read signal value of each pixel of interest in the read image data by multiplying that value by the correction coefficient Q.

According to Formula (A3), the correction coefficient Q decreases as the weighted sum of the signal values of the neighboring pixel increases. This means that as the error component of the flare error increases, the signal value of the pixel of interest is reduced more as a result of the correction. It is therefore possible to avoid excessively reducing the signal value of the pixel of interest in relatively dark areas of the printed image, where the total amount of flare is low, while sufficiently reducing the signal value of the pixel of interest in relatively bright areas of the printed image, where the total amount of flare is high.

In Formula (A3), when $S=S_{max}$, $Q=1/(Z+1)$. When $Z=(R_B'+R_C')/R_A$ as in Formula (A2), $Q=R_A/(R_A+R_B'+R_C')$. This is the minimum value for the correction coefficient Q, and the ratio of the error component removed from the signal value of the pixel of interest is the highest. On the other hand, when $S=S_{min}$, $Q=1$. This means that the correction coefficient Q is at the maximum value, and that there is no error component to be removed from the signal value of the pixel of interest. Formula (A3) normalizes the correction coefficient Q between such minimum and maximum values. This makes it possible to remove the error component of flare error for printed images having various types of content while maintaining the proper tone in the image.

1-4-3. Calibration of Image Data

When forming an image on a sheet in the image-forming system X1, the image quality may drop, e.g., the colors may vary, depending on the properties of the printer. The image-forming system X1 provides a calibration function for compensating for such drops in image quality.

The calibration is started, for example, in response to the user operating the calibration button X121 in the print settings screen X110 illustrated in FIG. 4. Having detected the calibration button X121 being operated, the CPU $X40_1$ of the control apparatus X400 controls the image-forming apparatus X200 to form a referential image on a calibration sheet based on referential image data expressing a predetermined chart pattern. The sheet on which the referential image is formed is passed from the image-forming apparatus X200 to the inspection apparatus X500. The first reading unit X505a (and, if necessary, the second reading unit X505b) of the inspection apparatus X500 reads the referential image formed on the sheet and generates referential read image data. The CPU X511 of the inspection apparatus X500 outputs the referential read image data to the control apparatus X400 via the host I/F X515. The calibration unit X412 of the control apparatus X400 derives calibration parameters based on a comparison between the referential image data and the referential read image data, and stores the derived calibration parameters in the storage X430. Then, when the image-forming apparatus X200 forms an image based on new input image data, the calibration unit X412 calibrates the input image data using the calibration parameters stored in the storage X430.

Figure 9:
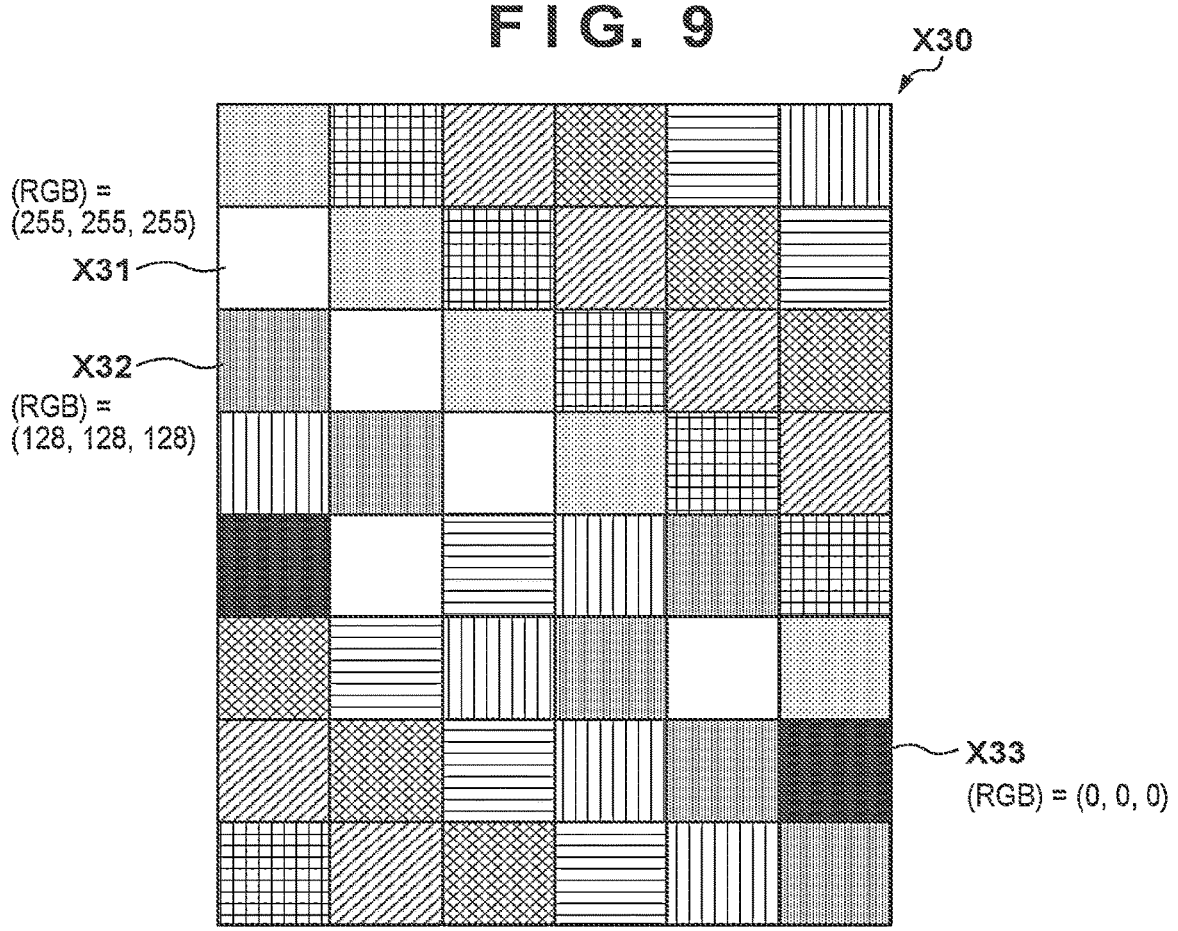
FIG. 9 is a descriptive diagram illustrating an example of a chart pattern used in calibration.

FIG. 9 is a descriptive diagram illustrating an example of the chart pattern used in the calibration. In the example in FIG. 9, a chart pattern X30 is constituted by six patches (small areas) in the main scanning direction and eight patches in the sub scanning direction, for a total of 48 patches. A single patch has a uniform color internally, and different patches have different colors (colors which differ in terms of luminance, hue, and/or saturation). For example, the RGB values of a patch X31 are (255,255,255), the RGB values of a patch X32 are (128,128,128), and the RGB values of a patch X33 are (0,0,0). Note that the chart pattern is not limited to the example illustrated in FIG. 9, and any chart pattern may be used. Although more accurate calibration is possible with a greater number of patches in the chart pattern and a greater number of colors, the improvement in accuracy is limited by the printing capabilities of the printer and the optical properties of the scanner. Because the design of the chart pattern does not relate to the essence of the technique according to the present disclosure, further descriptions thereof will not be given here.

The calibration parameters can be derived, for example, in the form of a lookup table which associates three-dimensional pixel values of the input image data (RIP signal values after expansion into the bitmap format) with post-calibration values in a nonlinear manner. FIG. 10 illustrates an example of the configuration of such a three-dimensional lookup table (LUT). In the example in FIG. 10, a table X40, which is an LUT, contains records in which pre-calibration RGB values and post-calibration RGB values are associated with each other for each of 16,777,216 candidates for RIP signal values (256×256×256=16,777,216). The combinations of pre-calibration RGB values (RIP signal values) on the left side of the drawing are the key items for lookup. On the other hand, the post-calibration RGB values (calibrated values) on the right side of the drawing are determined in a variable manner based on the aforementioned comparison between the referential image data and the referential read image data. For example, the calibrated values in a record having a key which matches the RGB values defined in any one of the patches can be determined directly from the read signal values of that patch. The calibrated values in other records can be determined through linear or nonlinear interpolation based on the read signal values of at least two patches. In the example in FIG. 10, RIP signal values of (255,255,255) are converted to calibrated values of (250, 250,250) as a result of the calibration. Likewise, RIP signal values of (128,128,128) are converted to calibrated values of (126,126,126), and RIP signal values of (0,0,0) are converted to calibrated values of (8,8,8).

Here, the referential read image data generated by the inspection apparatus X500 when reading the referential image for the above-described calibration also contains error caused by flare. Accordingly, in the present embodiment, the CPU X511 causes the first correction unit X533a to apply flare correction to the referential read image data in response to the first reading unit X505a reading the referential image. Likewise, the CPU X511 causes the second correction unit X533b to apply flare correction to the referential read image data when the second reading unit X505b reads the referential image. The flare correction used here may be the same processing as that described with reference to Formulas (A1) to (A3) above. The referential read image data output from the inspection apparatus X500 to the control apparatus X400 is, as described here, data after applying flare correction for removing the effect of flare in the inspection apparatus X500.

Although an example in which the calibration unit X412 of the control apparatus X400 derives the calibration parameters based on a comparison of the referential image data with the referential read image data has been described here, the calibration parameters may instead be derived by the inspection apparatus X500 (e.g., the comparison unit X518). In this case, the calibration parameters derived by the inspection apparatus X500 can be output to the control apparatus X400 and then used for calibration when executing a print job.

1-5. Example of Flow of Processing

Figure 11:
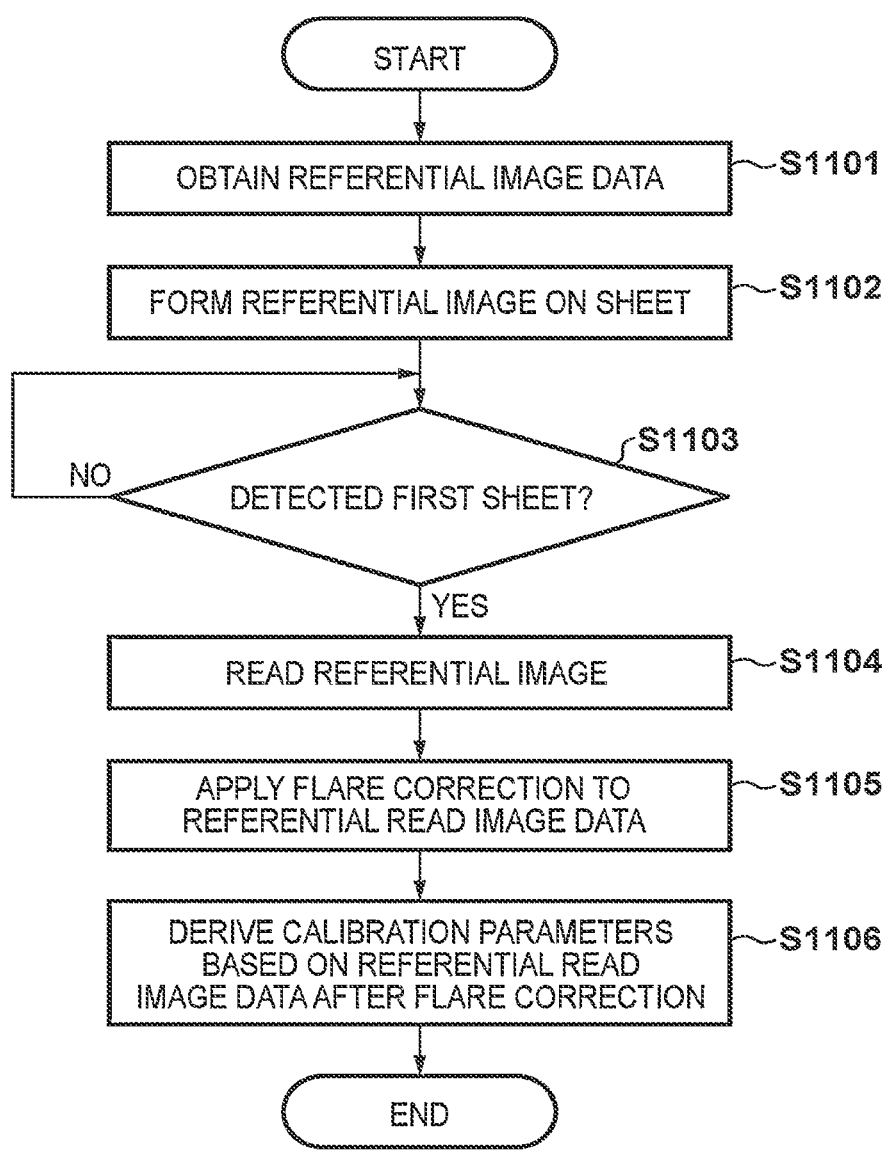
FIG. 11 is a flowchart illustrating an example of the flow of calibration processing according to the first embodiment.
Figure 12:
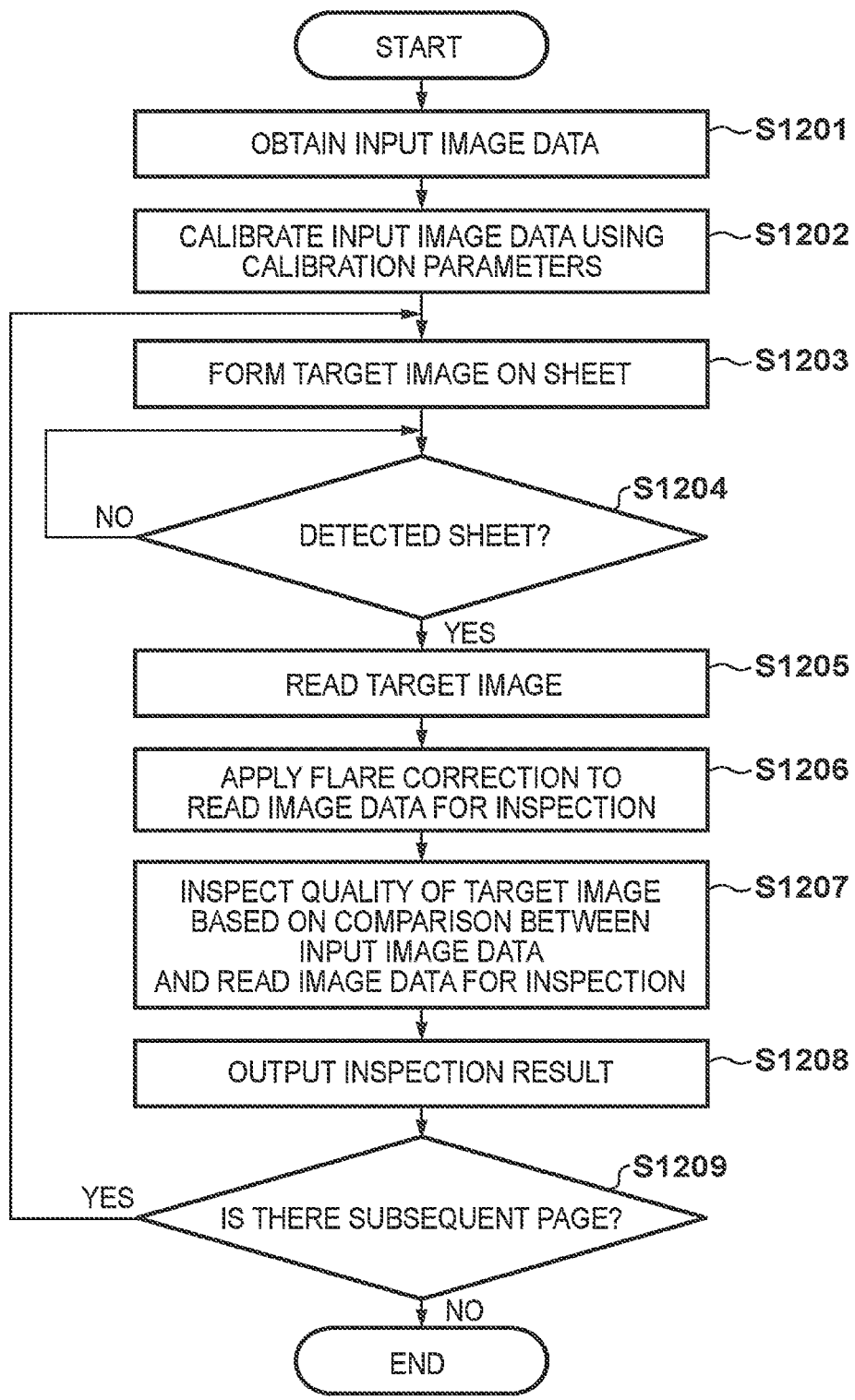
FIG. 12 is a flowchart illustrating an example of the flow of inspection processing according to the first embodiment.

This section will describe an example of the flow of the main processing which can be performed in the image-forming system X1 according to the foregoing embodiment, with reference to the flowcharts in FIGS. 11 and 12. Note that in the following descriptions, the processing steps are indicated by an S, indicating "step".

(1) Calibration Processing

FIG. 11 is a flowchart illustrating an example of the flow of the calibration processing performed cooperatively by the image-forming apparatus X200, the control apparatus X400, and the inspection apparatus X500.

First, when the user operates the calibration button X121 in the print settings screen X110, in step S1101, the CPU X401 of the control apparatus X400 obtains, from the storage X430, the referential image data expressing a predetermined chart pattern. Next, in step S1102, the image-forming apparatus X200 forms the referential image on the first sheet based on the referential image data input from the control apparatus X400. It is assumed here that the referential image is formed only on the first surface of the first sheet. In step S1103, the CPU X511 of the inspection apparatus X500 stands by for the first sheet on which the referential image is formed. The sequence moves to step S1104 when, for example, a sensor disposed in the transport path X501 detects the first sheet. In step S1104, the first reading unit X505a of the inspection apparatus X500 optically reads the referential image formed on the first sheet and generates the referential read image data. Next, in step S1105, the first correction unit X533a applies flare correction to the referential read image data generated by the first reading unit X505a. The referential read image data to which the flare correction is applied is output from the inspection apparatus X500 to the control apparatus X400. Next, in step S1106, based on the referential read image data after the flare correction, the calibration unit X412 of the control apparatus X400 derives the calibration parameters to be used to calibrate subsequent input image data. The calibration unit X412 stores the derived calibration parameters in the storage X430. Note that in step S1106, the calibration unit X412 may skip the deriving of the calibration parameters if the referential read image data indicates an anomalous value (e.g., a value in which a difference from the pixel value corresponding to the chart pattern exceeds an anomaly detection threshold). In this case, the existing calibration parameters stored in the storage X430 need not be updated. Additionally, default calibration parameters may be stored in the storage X430.

(2) Inspection Processing

FIG. 12 is a flowchart illustrating an example of the flow of the inspection processing performed cooperatively by the image-forming apparatus X200, the control apparatus X400, and the inspection apparatus X500.

First, when the user operates the print start button X149 in the inspection print screen X140, in step S1201, the CPU X401 of the control apparatus X400 obtains the input image data designated in the print job. Next, in step S1202, the calibration unit X412 reads out the calibration parameters from the storage X430 and calibrates the input image data using the read-out calibration parameters. Then, in step S1203, the image-forming apparatus X200 forms the target image on the second sheet based on the post-calibration input image data input from the control apparatus X400. It is assumed here that the target image is formed only on the first surface of the second sheet. The post-calibration input image data is output from the control apparatus X400 to the inspection apparatus X500. In step S1204, the CPU X511 of the inspection apparatus X500 stands by for the second sheet on which the target image is formed. The sequence moves to step S1205 when, for example, a sensor disposed in the transport path X501 detects the second sheet. In step S1205, the first reading unit X505a of the inspection apparatus X500 optically reads the target image formed on the second sheet and generates the read image data for inspection. Next, in step S1206, the first correction unit X533a applies flare correction to the read image data for inspection generated by the first reading unit X505a. Next, in step S1207, the inspection unit X530 inspects the quality of the target image formed on the second sheet based on a comparison of the post-calibration input image data with the read image data for inspection to which the flare correction has been applied. For example, the inspection unit X530 may determine that the quality of the target image is poor when the number of pixels for which a difference in the pixel values between the two instances of image data exceeds a defect detection threshold is at least K pixels (where K is an integer). This determination may be performed only for pixels belonging to the inspection area registered through the inspection print screen X140, or only for pixels not belonging to the non-inspection area registered through the inspection print screen X140. Next, in step S1208, the inspection unit X530 outputs the inspection result to the control apparatus X400. The CPU X401 of the control apparatus X400 notifies the user, via the operation unit X100, of the inspection result input from the inspection apparatus X500. The CPU X401 may display, in the display, information indicating whether the quality of the target image is good or poor. The CPU X401 may also light the lamp or output a warning sound from the speaker when the quality of the target image is determined to be poor. The CPU X401 may further control the stacker X600 such that a sheet on which a defective image is printed is discharged to the purge tray X620. Next, in step S1209, the CPU X401 determines whether there is a subsequent page to be printed in the inspection printing job. If there is a subsequent page to be printed, the sequence returns to step S1203, where the target image for the next page is formed on another sheet based on the post-calibration input image data. If there is no subsequent page, the inspection processing illustrated in FIG. 12 ends.

1-6. Variation

Although the ratio of the flare component from the neighboring pixels to the desired component of light incident on the pixel of interest has been described, with reference to FIGS. 6A and 6B, as depending mainly on the scanner design, the ratio of the flare component also depends on the surface properties of the sheet. Accordingly, in the variation described in this section, individual weighting data is determined in advance for a plurality of types of sheets which may be used in the image-forming apparatus X200, and the weighting data is stored in a storage unit (e.g., the storage X514). For example, first weighting data is associated with a first type of sheet and expresses a set of weights to be used for that first type. Second weighting data is associated with a second type different from the first type and expresses a set of weights to be used for that second type.

The "type" of sheet in the present variation typically classifies the sheet from the perspective of the surface properties of the sheet (or properties related to the reflection of light). For example, the first type may be plain paper, and the second type may be glossy paper. The surface of glossy paper is flatter than that of plain paper, and thus the ratio of a diffusely-reflected component of light with which glossy paper is irradiated is lower. As such, compared to plain paper, the range of the effect of flare measured for glossy paper is narrower, and the total amount of flare is lower. An example of the ratio of the flare component from each position of neighboring pixels to the desired component incident on the pixel of interest, measured for glossy paper, is illustrated in FIG. 13, in the same matrix format as that in FIG. 7. In the example in FIG. 13, the magnitude of the flare component from neighboring pixels eight pixels away in the main scanning direction or six pixels away in the sub scanning direction is substantially zero. In FIGS. 7 and 13, the range of the effect of flare is indicated by a bold frame on the inner side, and it can be seen that the range of the effect of flare is narrower in the example in FIG. 13.

In the present variation, the storage X514 stores the first weighting data, which corresponds to the example in FIG. 7, and the second weighting data, which corresponds to the example in FIG. 13, in advance. The operation unit X100 displays a user interface such as the print settings screen X110 described with reference to FIG. 4 in the display, and accepts a designation of the type of sheet from the user. The inspection unit X530 then reads out, from the storage X514, the weighting data corresponding to the type designated by the user through the operation unit X100, and uses the set of weights expressed by the read-out weighting data to calculate the correction coefficient for each pixel of interest in the flare correction.

Although two types, namely plain paper and glossy paper, are mainly described here, the image-forming system X1 may handle a greater number of types of sheets, or different types of sheets. Additionally, instead of the user designating the type of sheet through a user interface, the type of sheet may be determined automatically using any publicly-known sheet determination technique.

Figure 14:
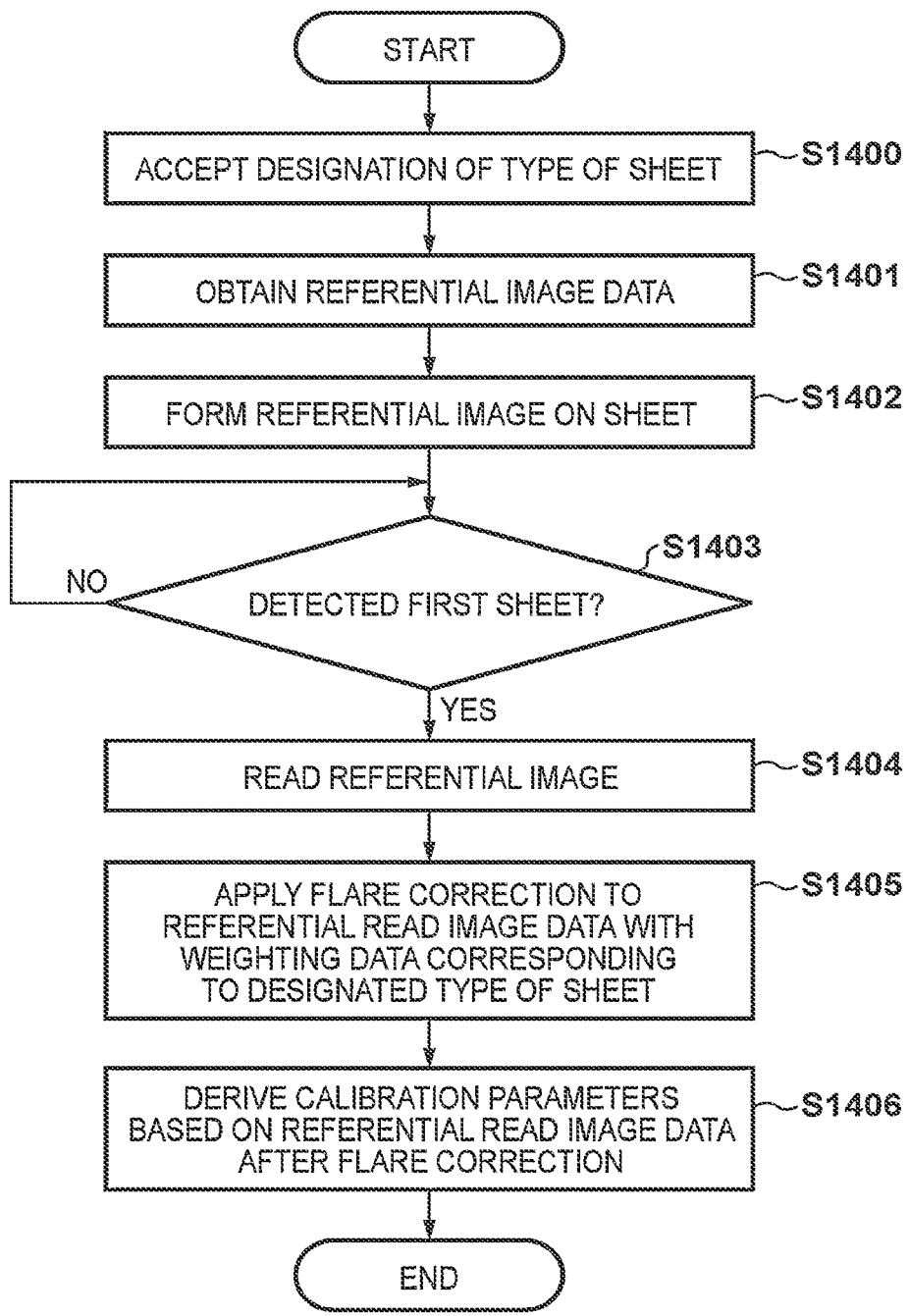
FIG. 14 is a flowchart illustrating an example of the flow of calibration processing according to a variation.

FIG. 14 is a flowchart illustrating an example of the flow of calibration processing according to the present variation. First, in step S1400, the operation unit X100 accepts the designation of the type of sheet in the print settings screen X110. Next, when the user operates the calibration button X121 in the print settings screen X110, in step S1401, the CPU X401 of the control apparatus X400 obtains the referential image data from the storage X430. Then, in step S1402, the image-forming apparatus X200 forms the referential image on the first sheet based on the referential image data input from the control apparatus X400. It is assumed here that the referential image is formed only on the first surface of the first sheet. In step S1403, the CPU X511 of the inspection apparatus X500 stands by for the first sheet on which the referential image is formed. The sequence moves to step S1404 when, for example, a sensor disposed in the transport path X501 detects the first sheet. In step S1404, the first reading unit X505a of the inspection apparatus X500 optically reads the referential image formed on the first sheet and generates the referential read image data. Next, in step S1405, the first correction unit X533a applies flare correction to the referential read image data generated by the first reading unit X505a using the weighting data corresponding to the type of sheet designated by the user in step S1400. Then, in step S1406, based on the referential read image data after the flare correction, the calibration unit X412 of the control apparatus X400 derives the calibration parameters to be used to calibrate subsequent input image data. The calibration unit X412 stores the derived calibration parameters in the storage X430. Note that in the present variation, the calibration parameters may be stored in association with the type of the sheet designated by the user.

Figure 15:
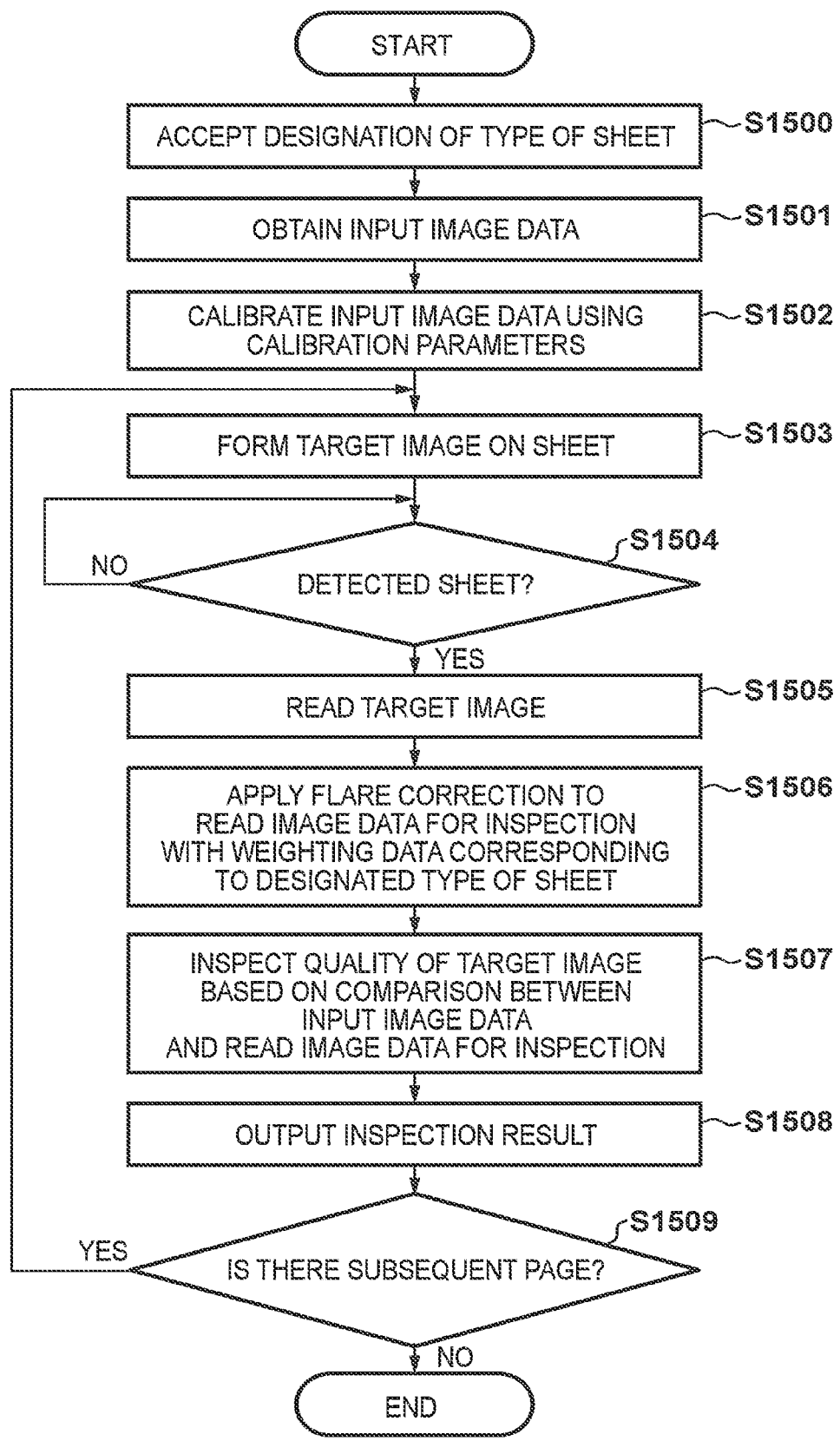
FIG. 15 is a flowchart illustrating an example of the flow of inspection processing according to a variation.

FIG. 15 is a flowchart illustrating an example of the flow of inspection processing according to the present variation. First, in step S1500, the operation unit X100 accepts the designation of the type of sheet in the print settings screen X110. Next, when the user operates the print start button X149 in the inspection print screen X140, in step S1501, the CPU X401 of the control apparatus X400 obtains the input image data designated in the print job. Then, in step S1502, the calibration unit X412 reads out the calibration parameters from the storage X430 and calibrates the input image data using the read-out calibration parameters. The calibration parameters used here may be the parameters stored in association with the type of sheet designated by the user in step S1500. Next, in step S1503, the image-forming apparatus X200 forms the target image on the second sheet based on the post-calibration input image data input from the control apparatus X400. It is assumed here that the target image is formed only on the first surface of the second sheet. The post-calibration input image data is output from the control apparatus X400 to the inspection apparatus X500. In step S1504, the CPU X511 of the inspection apparatus X500 stands by for the second sheet on which the target image is formed. The sequence moves to step S1505 when, for example, a sensor disposed in the transport path X501 detects the second sheet. In step S1505, the first reading unit X505a of the inspection apparatus X500 optically reads the target image formed on the second sheet and generates the read image data for inspection. Next, in step S1506, the first correction unit X533a applies flare correction to the read image data for inspection generated by the first reading unit X505a using the weighting data corresponding to the type of sheet designated by the user in step S1500. Then, in step S1507, the inspection unit X530 inspects the quality of the target image formed on the second sheet based on a comparison of the post-calibration input image data with the read image data for inspection to which the flare correction has been applied. Next, in step S1508, the inspection unit X530 outputs the inspection result to the control apparatus X400. The CPU X401 of the control apparatus X400 notifies the user, via the operation unit X100, of the inspection result input from the inspection apparatus X500. Next, in step S1509, the CPU X401 determines whether there is a subsequent page to be printed. If there is a subsequent page to be printed, the sequence returns to step S1503, where the target image for the next page is formed on another sheet based on the post-calibration input image data. If there is no subsequent page, the inspection processing illustrated in FIG. 15 ends.

1-7. Summary of First Embodiment

According to the first embodiment described in this section, in the image-forming system, the image-forming apparatus forms a referential image expressing a predetermined pattern on a first sheet, and referential read image data is generated by a reading unit optically reading the referential image formed on the first sheet. Additionally, flare correction for removing an effect of flare in the reading unit is applied to the referential read image data to derive calibration parameters based thereon, and the input image data is calibrated using the derived calibration parameters. Furthermore, the image-forming apparatus forms a target image on a second sheet based on the post-calibration input image data, and read image data for inspection is generated by the reading unit optically reading the target image formed on the second sheet. The quality of the target image formed on the second sheet is then inspected based on a comparison between the input image data and the read image data for inspection to which the flare correction has been applied. Applying the flare correction to the read image data when deriving calibration parameters and inspecting the quality of a printed image in this manner makes it possible to reduce the effect of flare while keeping good calibration accuracy, and improve the accuracy of the inspection of the printed image.

Additionally, in the above-described embodiment, the flare correction includes correcting a read signal value of each of pixels of interest in read image data using a correction coefficient dynamically calculated based on signal values of neighboring pixels neighboring the pixel of interest. As such, the effect of flare can be removed or reduced while adaptively varying the correction coefficient according to changes in the amount of flare, which depends on the partial brightness of the target image. Additionally, in the above-described embodiment, the correction coefficient is based on a weighted sum of the signal values of the neighboring pixels, the weighed sum being calculated using weights that depend on positional relationships between the pixel of interest and the neighboring pixels neighboring the pixel of interest. Accordingly, the degree of flare, which is affected by the positional relationships between the pixel of interest and the neighboring pixels as well as the signal values of the neighboring pixels, can be appropriately reflected in the correction coefficient. Additionally, in the above-described embodiment, the correction coefficient is lower as the weighted sum is higher, and is normalized between a value in a case where all the neighboring pixels are white and a value in a case where all the neighboring pixels are black. Multiplying the read signal value of the pixel of interest by such a correction coefficient in the above-described flare correction makes it possible to remove the error component of the flare error while appropriately maintaining the tone of the target image.

Additionally, in the above-described embodiment, the image-forming system further includes a storage unit that stores a set of the weights, determined in advance for each pixel position of the neighboring pixels. For example, by storing a set of weights determined experimentally in advance in the storage unit, effective flare correction based on the unique properties of the reading unit can be applied to the read image data.

Additionally, in the above-described variation, the storage unit stores a first set of the weights corresponding to a first type of sheet, and a second set of the weights corresponding to a second type different from the first type. The flare correction is then performed using the set of weights corresponding to the type determined for the second sheet. In this case, the weight which is optimal for the type of sheet on which the target image is formed is used in the calculation of the correction coefficient, and thus the effect of flare can be even more effectively reduced in a situation where various sheets having different surface properties may be used. When a designation for the type of the second sheet is accepted through the user interface, the type of the second sheet can be determined without the need for a complicated mechanism, which makes it possible to incorporate the above-described effective flare correction into the system at low cost.

2. Second Embodiment

This section will describe an image processing system according to the second embodiment.

2-1. Overall System Configuration

Figure 16:
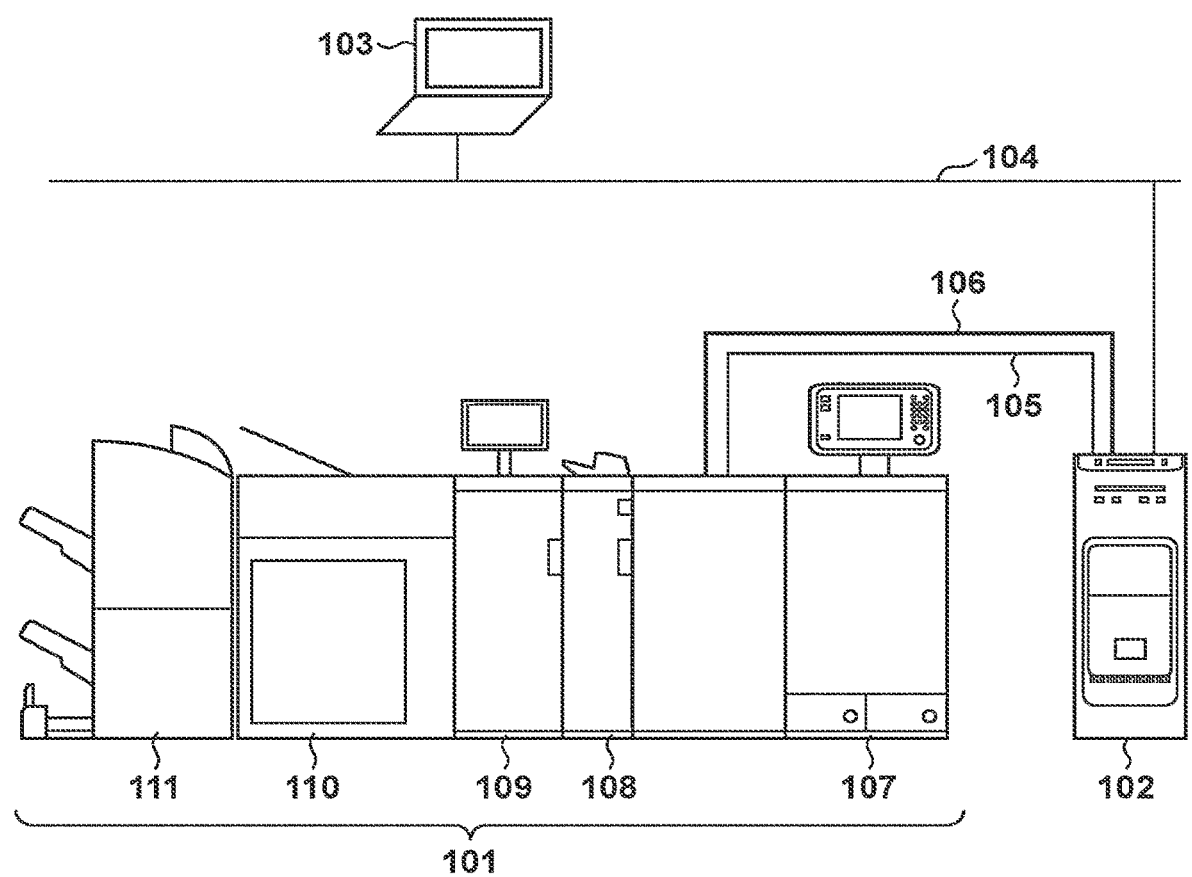
FIG. 16 is an overall view of an image processing system according to a second embodiment.

Referring to FIG. 16, the image processing system according to the second embodiment includes an image-forming apparatus 101, an external controller 102, and a client PC 103. The configuration of this system is merely an example and is not intended to limit the present invention, and may include a plurality of other image-forming apparatuses and client PCs. The image-forming apparatus 101 and the external controller 102 are communicably connected via an internal LAN 105 and a video cable 106. Note that the configuration may be such that instead of the video cable 106, the internal LAN 105 substitutes for the functionality of the video cable 106. The external controller 102 is communicably connected to the client PC 103 via an external LAN 104, and printing instructions are issued to the external controller 102 from the client PC 103.

A printer driver, which has a function for converting the data format of printing data into page description language format that can be processed by the external controller 102, is installed in the client PC 103. A user who wishes to print can issue a printing instruction through the printer driver from various types of applications. The printer driver transmits the printing data to the external controller 102 based on the printing instruction from the user. Upon receiving the printing instruction from the PC 103, the external controller 102 performs data analysis and rasterizing processing, and issues a printing instruction including the printing data to the image-forming apparatus 101.

The image-forming apparatus 101 will be described next. A plurality of devices, each having a different function, are connected to the image-forming apparatus 101, and are configured such that complex printing processing such as book binding can be performed. For example, the image-forming apparatus 101 according to the present embodiment includes an image-forming unit 107, an inserter 108, an inspection apparatus 109, a high-capacity stacker 110, and a finisher 111.

The image-forming unit 107 uses toner to form an image on paper (called a "sheet" hereinafter) transported from a paper feed unit located below the image-forming unit 107. The configuration and principles of operation of the image-forming unit 107 are as follows. Light rays, such as from a laser beam, which have been modulated in accordance with the image data, are reflected by a rotating polygonal mirror, and a photosensitive drum is irradiated with the resulting scanning light. An electrostatic latent image formed on the photosensitive drum by this laser beam is developed using toner, and the resulting toner image is transferred onto a sheet which adheres to a transfer drum. A full-color image is formed on the sheet by executing this sequence of image forming processes in order for yellow (Y), magenta (M), cyan (C), and black (K) toners. The sheet on the transfer drum, on which the full-color image has been formed in this manner, is transported to a fixing unit. The fixing unit includes rollers, belts, and the like, with heat sources such as halogen heaters built into the rollers, and the toner on the sheet onto which the toner image has been transferred is melted and fixed to the sheet using heat and pressure.

The inserter 108 is a device that inserts an insertion sheet. The inserter 108 can insert a sheet into a series of sheets printed onto and transported by the image-forming unit 107, at any position in the series of sheets. The inspection apparatus 109 is an apparatus for generating an inspection image by reading an image on a transported sheet and determining whether the printed image is normal by comparing that image with a pre-registered reference image (right image). The high-capacity stacker 110 is a stacker capable of holding a large number of sheets. The finisher 111 performs finishing processing on transported sheets. The finisher is capable of performing various types of finishing processing, such as stapling, punching, saddle-binding, and the like, and discharges the processed sheets to a discharge tray.

Although the printing system described with reference to FIG. 16 has a configuration in which the external controller 102 is connected to the image-forming apparatus 101, the present invention is not limited to a configuration in which the external controller 102 is connected. In other words, the configuration may be such that the image-forming apparatus 101 is connected to the external LAN 104 and printing data which can be processed by the image-forming apparatus 101 is transmitted from the client PC 103. In this case, printing processing is executed with the data analysis, rasterizing processing, and so on performed in the image-forming apparatus 101.

2-2. System Configuration

Figure 17:
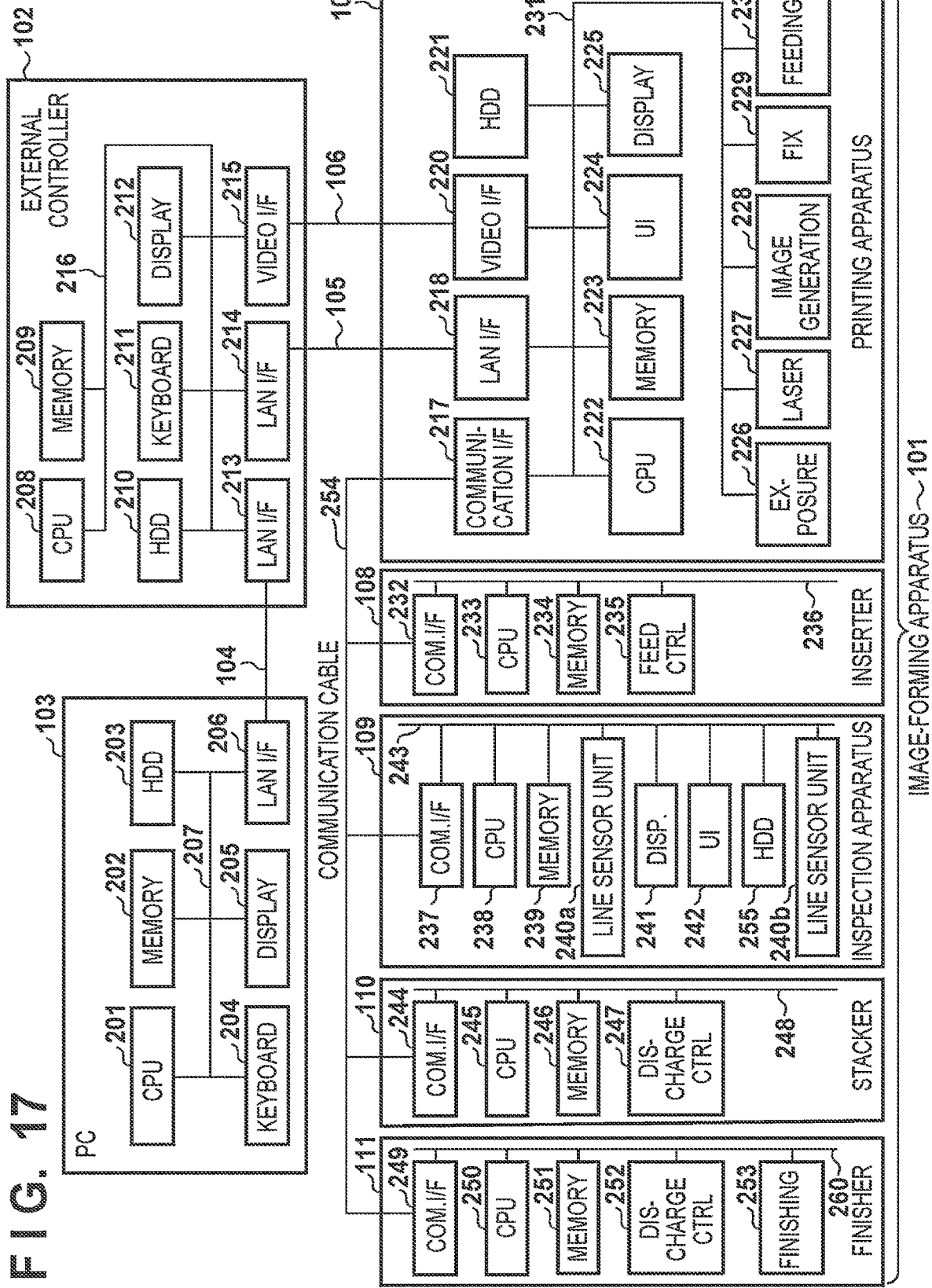
FIG. 17 is a block diagram illustrating the system configuration of the image processing system according to the second embodiment.

The configuration of the image processing system according to the present embodiment will be described in detail next with reference to FIG. 17. The configuration of the image-forming unit 107 of the image-forming apparatus 101 will be described first. The image-forming unit 107 of the image-forming apparatus 101 includes a communication I/F 217, a LAN I/F 218, a video I/F 220, an HDD 221, a CPU 222, a memory 223, an operation unit 224, and a display 225. The image-forming unit 107 further includes a document exposure unit 226, a laser exposure unit 227, an image generation unit 228, a fixing unit 229, and a paper feed unit 230. These constituent elements are connected over a system bus 231, and are capable of exchanging data with each other.

The communication I/F 217 is connected to the inserter 108, the inspection apparatus 109, the high-capacity stacker 110, and the finisher 111 over communication cables 254, and controls communication with those devices. The LAN I/F 218 is connected to the external controller 102 via the internal LAN 105, and communicates printing data and the like. The video I/F 220 is connected to the external controller 102 via the video cable 106, and communicates image data and the like.

The HDD 221 is a storage apparatus that stores programs, data, and the like. The CPU 222 performs comprehensive image processing control, printing control, and the like based on programs and the like stored in the HDD 221. The memory 223 stores programs required by the CPU 222 to perform various types of processing, image data, and the like, and functions as a work area. The operation unit 224 accepts inputs of various types of settings, operation instructions, and the like from the user. Settings information of the image processing apparatus, the processing status of print jobs, and the like are displayed in the display 225. The document exposure unit 226 performs processing for reading a document when using a copy function, a scan function, and so on. Document data is read by using an exposure lamp to illuminate a sheet placed by the user and capturing and image using a CMOS image sensor.

The laser exposure unit 227 is a device that performs primary charging, laser exposure, and so on for irradiating the photosensitive drum with a laser beam in order to transfer the toner image. The laser exposure unit 227 first performs the primary charging, which charges the surface of the photosensitive drum to a uniform negative potential. Then, using a laser driver, the photosensitive drum is irradiated with a laser beam while adjusting the reflection angle thereof using the polygonal mirror. As a result, the negative charge at the irradiated parts is neutralized, and an electrostatic latent image is formed in those parts.

The image generation unit 228 is a device for transferring toner onto a sheet, includes a developing unit, a transfer unit, a toner supply unit, and the like, and transfers the toner on the photosensitive drum to the sheet. The developing unit causes negatively-charged toner to adhere to the electrostatic latent image on the surface of the photosensitive drum from a developing cylinder, which makes the image visible. The transfer unit performs a primary transfer, in which a positive potential is applied to a primary transfer roller and the toner on the surface of the photosensitive drum is transferred to a transfer belt, and a secondary transfer, in which a positive potential is applied to a secondary transfer outer roller and the toner on the transfer belt is transferred onto a sheet. The fixing unit 229 is a device for melting and fixing the toner onto the sheet using heat and pressure, and includes a heater, a fixing belt, a pressure belt, and the like. The paper feed unit 230 is a device for transporting the sheet, and operations for feeding and transporting the sheet are controlled using rollers, sensors, and the like.

The configuration of the inserter 108 of the image-forming apparatus 101 will be described next. The inserter 108 of the image-forming apparatus 101 includes a communication I/F 232, a CPU 233, a memory 234, and a paper feed controller 235, and these constituent elements are connected over a system bus 236. The communication I/F 232 is connected to the image-forming unit 107 by the communication cable 254, and performs communication required for control. The CPU 233 performs various types of control required for feeding sheets in accordance with a control program stored in the memory 234. The memory 234 is a storage apparatus in which the control program is stored. The paper feed controller 235 controls the feeding and transport of sheets transported from the paper feed unit of the inserter, the image-forming unit 107, and so on while controlling rollers and sensors based on instructions from the CPU 233.

The configuration of the inspection apparatus 109 of the image-forming apparatus 101 will be described next. The inspection apparatus 109 of the image-forming apparatus 101 includes a communication I/F 237, a CPU 238, a memory 239, a line sensor unit 240, a display unit 241, an operation unit 242, and an HDD 255, and these constituent elements are connected over a system bus 243. The communication I/F 237 is connected to the image-forming unit 107 by the communication cable 254, and performs communication required for control. The CPU 238 performs various types of control required for inspection in accordance with a control program stored in the memory 239. The memory 239 is a storage apparatus in which the control program is stored. The line sensor unit 240 captures an image of a transported sheet based on instructions from the CPU 238. The CPU 238 stores the image captured by the line sensor unit 240 in the memory 239 as an inspection image. Furthermore, the CPU 238 determines whether a printed image is normal by comparing the inspection image captured by the line sensor unit 240 with a reference image stored in the memory 239. The method for obtaining the reference image will be described later. Inspection results, settings screens, and the like are displayed in the display unit 241. The operation unit 242 is operated by the user, and accepts instructions to change the settings of the inspection apparatus 109, register the reference image, and the like. The HDD 255 stores various types of settings information and images required for inspection. The various types of settings information and images which are stored can be reused.

The configuration of the high-capacity stacker 110 of the image-forming apparatus 101 will be described next. The high-capacity stacker 110 of the image-forming apparatus 101 includes a communication I/F 244, a CPU 245, a memory 246, and a discharge control unit 247, and these constituent elements are connected over a system bus 248. The communication I/F 244 is connected to the image-forming unit 107 by the communication cable 254, and controls communication required for control. The CPU 245 performs various types of control required for discharging sheets by executing a control program stored in the memory 246. The memory 239 is a storage apparatus in which the control program is stored. The discharge control unit 247 performs control for taking a sheet which has been transported and then transporting that sheet to a stack tray, an escape tray, or the finisher 111 provided thereafter, based on instructions from the CPU 245.

The configuration of the finisher 111 of the image-forming apparatus 101 will be described next. The finisher 111 of the image-forming apparatus 101 includes a communication I/F 249, a CPU 250, a memory 251, a discharge control unit 252, and a finishing processing unit 253, and these constituent elements are connected over a system bus 260. The communication I/F 249 is connected to the image-forming unit 107 by the communication cable 254, and performs communication required for control. The CPU 250 performs various types of control required for finishing, discharging sheets, and the like in accordance with a control program stored in the memory 251. The memory 251 is a storage apparatus in which the control program is stored. The discharge control unit 252 controls the transport and discharging of sheets based on instructions from the CPU 250. The finishing processing unit 253 controls finishing processing such as stapling, punching, and saddle-binding based on instructions from the CPU 250.

The configuration of the external controller 102 will be described next. The external controller 102 includes a CPU 208, a memory 209, an HDD 210, a keyboard 211, a display 212, a LAN I/F 213, a LAN I/F 214, and a video I/F 215, and these are connected over a system bus 216. The CPU 208 comprehensively executes processing such as receiving printing data from the client PC 103 based on programs, data, and the like stored in the HDD 210, Raster Image Processing (RIP), transmitting printing data to the image-forming apparatus 101, and the like. The CPU 208 also performs RIP processing on reference image data. Specifically, in the RIP processing for the reference image data, an image is generated by converting an image at a resolution of, for example, 600 dpi into 300 dpi, whereas, in the RIP processing for printing data, an image is generated without reducing the resolution. The generated reference image is stored in the memory 239 via the internal LAN 105 and the communication cable 254.

The memory 209 stores programs, data, and the like required by the CPU 208 to perform various types of processing, and functions as a work area. The HDD 210 stores programs, data, and the like required for operations such as printing processing. The keyboard 211 is a device for inputting operation instructions for the external controller 102. Information from applications executed by the external controller 102 and the like is displayed in the display 212, in accordance with image signals expressing still images, moving images, and the like. The LAN I/F 213 is connected to the client PC 103 via the external LAN 104, and communicates printing instructions and the like. The LAN I/F 214 is connected to the image-forming apparatus 101 via the internal LAN 105, and communicates printing instructions and the like. The external controller 102 can exchange various types of data with the image-forming unit 107, the inserter 108, the inspection apparatus 109, the high-capacity stacker 110, and the finisher 111 via the internal LAN 105 and the communication cables 254. The video I/F 215 is connected to the image-forming apparatus 101 via the video cable 106, and communicates printing data and the like.

The configuration of the client PC 103 will be described next. The client PC 103 includes a CPU 201, a memory 202, an HDD 203, a keyboard 204, a display 205, and a LAN I/F 206, which are connected over a system bus 207. The CPU 201 generates printing data, executes printing instructions, and the like based on a document processing program and the like stored in the HDD 203. The CPU 201 furthermore comprehensively controls the respective devices connected to the system bus. The memory 202 stores programs, data, and the like required by the CPU 201 to perform various types of processing, and functions as a work area. The HDD 203 stores programs, data, and the like required for operations such as printing processing. The keyboard 204 is a device for inputting operation instructions for the PC 103. Information from applications executed by the client PC 103 and the like is displayed in the display 205, through image signals expressing still images, moving images, and the like. The LAN I/F 206 is connected to the external LAN 104, and communicates printing instructions and the like.

Although the internal LAN 105 and the video cable 106 are connected to the external controller 102 and the image-forming apparatus 101 in the present embodiment, this is not intended to limit the present invention, and any configuration may be used as long as data necessary for printing can be transmitted and received. For example, the configuration may be such that only a video cable is connected. Furthermore, the memory 202, the memory 209, the memory 223, the memory 234, the memory 239, the memory 246, and the memory 251 may be any storage apparatuses for storing data, programs, and the like. For example, each memory may be replaced with a volatile RAM, a non-volatile ROM, a built-in HDD, an external HDD, a USB memory, or the like.

2-3. Configuration of Image-Forming Apparatus

Figure 18:
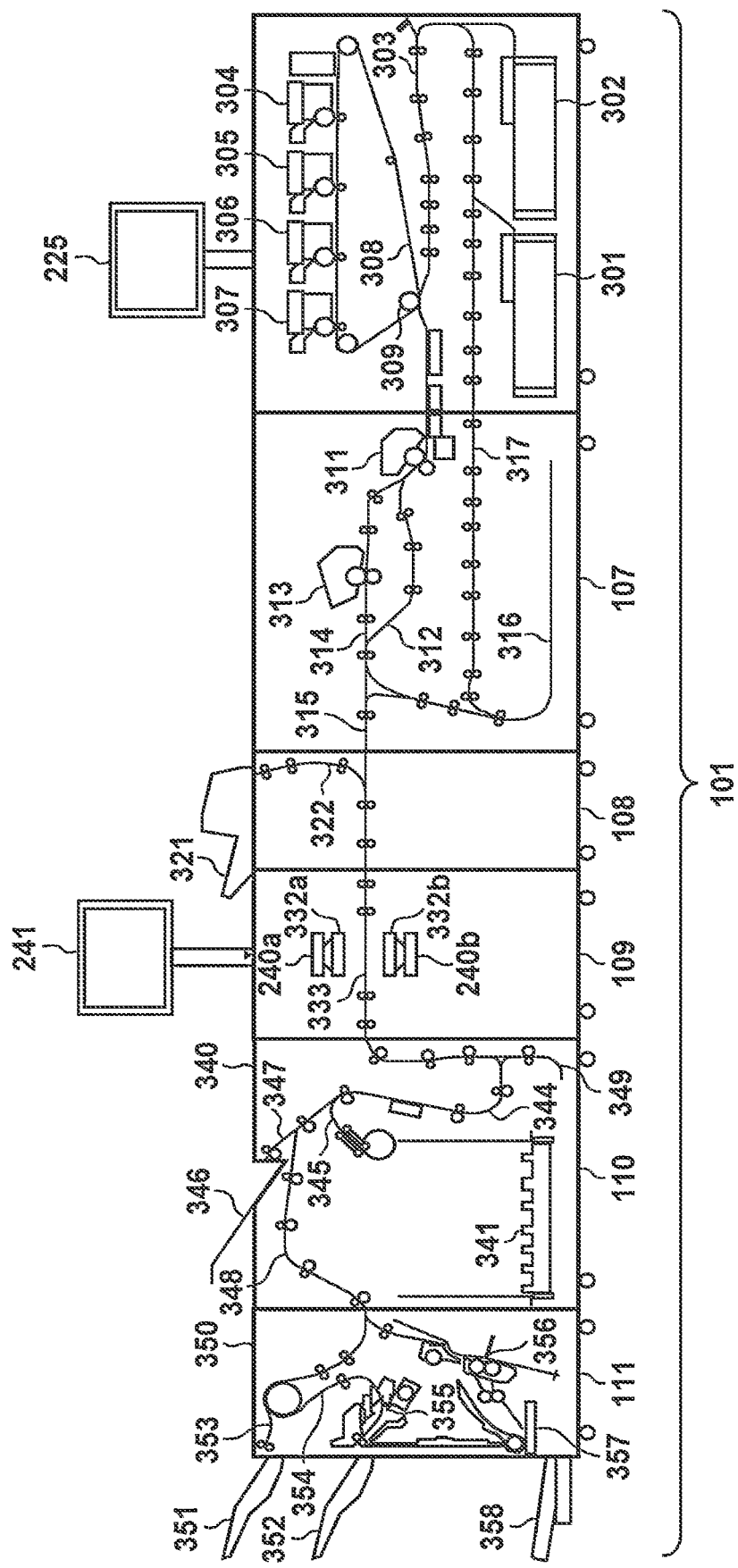
FIG. 18 is a schematic diagram illustrating a mechanical cross-sectional view of the image-forming apparatus according to the second embodiment.

The hardware configuration of the image-forming apparatus 101 according to the present embodiment will be described next with reference to FIG. 18. FIG. 18 is a mechanical cross-section illustrating the image-forming apparatus 101. As described above, the image-forming apparatus 101 includes the image-forming unit 107, the inserter 108, the inspection apparatus 109, the high-capacity stacker 110, and the finisher 111.

The image-forming unit 107 is a device that forms an image to be printed onto a sheet. The display 225 displays the printing state of the image-forming apparatus 101, information for making settings, and the like. Reference signs 301 and 302 indicate paper feed decks. Various types of sheets can be held in the paper feed decks 301 and 302. In each of the paper feed decks 301 and 302, the uppermost one sheet among the sheets held in the deck can be separated and transported to a sheet transport path 303. 304 to 307 indicate developing stations, which form toner images using Y, M, C, and K color toners, respectively, in order to form a color image. The toner images formed here undergo primary transfer onto an intermediate transfer belt 308, which rotates in what is the clockwise direction in the drawing, and at a secondary transfer position indicated by 309, the toner images are transferred onto the sheet transported from the sheet transport path 303.

311 indicates a fixing unit, which fixes the toner image onto the sheet. The fixing unit 311 includes a pressure roller and a heating roller, and fixes the toner image onto the sheet by melting and compressing the toner as the sheet passes between the rollers. The sheet which has passed through the fixing unit 311 traverses a sheet transport path 312 and is transported to a transport path 315. The transport path 315 leads to a transport path of the inserter 108, and is a path for transporting the sheet to the devices which follow the image-forming unit 107. If, due to the type of the sheet, further melting and pressure are needed for the fixing, the sheet that has passed through the fixing unit 311 is transported to a second fixing unit 313 using the above sheet transport path. Here, after additional melting and pressure have been applied, the sheet is transported to the transport path 315 through a sheet transport path 314. If the image formation mode is set to double-sided mode, the sheet is transported to a sheet inversion path indicated by 316, and after being inverted at 316, the sheet is transported to a double-sided transport path 317, where image transfer to the second surface is performed at the secondary transfer position 309.

The inserter 108 is a device for inserting an insertion sheet. The inserter 108 includes an insert tray 321, and causes a sheet which has been fed through a sheet transport path 322 to merge with a series of sheets transported through the transport path 315. This makes it possible to insert a sheet at any desired position in a sequential series of sheets transported from the image-forming unit 107, and transport the sheets to the devices that follow thereafter.

The sheet which has passed through the inserter 108 is transported to the inspection apparatus 109. Line sensor units 240a and 240b are disposed opposite each other within the inspection apparatus 109. The line sensor unit 240a is a sensor for reading an upper surface of a sheet, and the line sensor unit 240b is a sensor for reading a lower surface of the sheet. A flowing reading glass 332a is disposed between the line sensor unit 240a and a sheet transport path 333. A flowing reading glass 332b is disposed between the line sensor unit 240b and the sheet transport path 333. At the timing at which the sheet transported to the sheet transport path 333 reaches a predetermined position, the inspection apparatus 109 can read the images on the sheet using the line sensor units 240a and 240b and determine whether the image from the device is normal. A result and the like of the inspection performed by the inspection apparatus 109 are displayed in the display unit 241. Although the present embodiment describes an example in which line sensors for obtaining an inspection target image are provided in the inspection apparatus 109, this is not intended to limit the present invention. For example, the configuration may be such that a line sensor is provided in another device, such as the image-forming unit 107, and an inspection target image read thereby is received by the inspection apparatus 109. In this case, the inspection apparatus 109 need not be provided in the sheet transport path, and may instead be communicably connected to the image-forming unit 107 by a LAN or the like.

The high-capacity stacker 110 is a stacker that holds a large number of sheets. The high-capacity stacker 110 includes a stack tray 341 serving as a tray in which sheets are stacked. A sheet that has passed through the inspection apparatus 109 traverses a sheet transport path 344 and enters the high-capacity stacker 110. The sheet is stacked in a stack tray 341 after passing from the sheet transport path 344 and through a sheet transport path 345. The stacker 340 further includes an escape tray 346 serving as a discharge tray. The escape tray 346 is a discharge tray used for discharging a sheet which has been determined by the inspection apparatus 109 to be an anomalous sheet. When outputting a sheet to the escape tray 346, the sheet is transported from the sheet transport path 344 to the escape tray 346 via a sheet transport path 347. Note that when transporting a sheet to a post-processing device in a stage following the high-capacity stacker 110, the sheet is transported through a sheet transport path 348. 349 indicates a reversing unit for reversing the sheet. The reversing unit 349 is used when stacking sheets on the stack tray 341. When the sheet which has been input is to be stacked in the stack tray 341 with the same orientation when the sheet is output, the sheet is reversed once by the reversing unit 349. When transporting the sheet to the escape tray 346, a subsequent post-processing apparatus, or the like, the sheet is discharged as-is, i.e., without being flipped, during loading, and thus the inverting operation is not performed by the reversing unit 349.

The finisher 111 applies finishing processing to the transported sheet in accordance with functions designated by the user. The finisher 111 generally has finishing functions that include stapling (at one or two locations), punching (two or three holes), saddle-stitch book binding, and the like. The finisher 111 includes two discharge trays 351 and 352, and the sheet may be output to the discharge tray 351 via a sheet transport path 353. However, finishing processing such as stapling cannot be performed in the sheet transport path 353. When performing finishing processing such as stapling, finishing functions designated by the user are performed on the sheet by a processing unit 355 after the sheet traverses a sheet transport path 354, after which the sheet is output to the discharge tray 352. The discharge trays 351 and 352 can move up and down, and the discharge tray 351 can be moved down so that the sheet subjected to the finishing processing by the processing unit 355 is then stacked in the discharge tray 351. When saddle-stitch book binding is designated, processing for adding staples to the center of the sheet is performed by a saddle-stitch processing unit 356, after which the sheet it folded in half and output to a saddle-stitch book binding tray 358 through a sheet transport path 357. The saddle-stitch book binding tray 358 is configured as a conveyor belt, such that a sheaf of saddle-stitched book-bound sheets stacked on the saddle-stitch book binding tray 358 are transported to the left.

The inspection apparatus 109 inspects an image on a sheet that has been transported, in accordance with pre-set inspection items. The inspection of the sheet image is performed by comparing a pre-set reference image with the image from the sheet which has been transported. Methods for comparing the images include a method of comparing pixel values in each of image locations, comparing the positions of objects by detecting edges, extracting text data through optical character recognition (OCR), and the like. Printing position skew, image color, image darkness, streaks, blurriness, printing dropouts, and the like are examples of inspection items.

2-4. Line Sensor Unit

Figure 19:
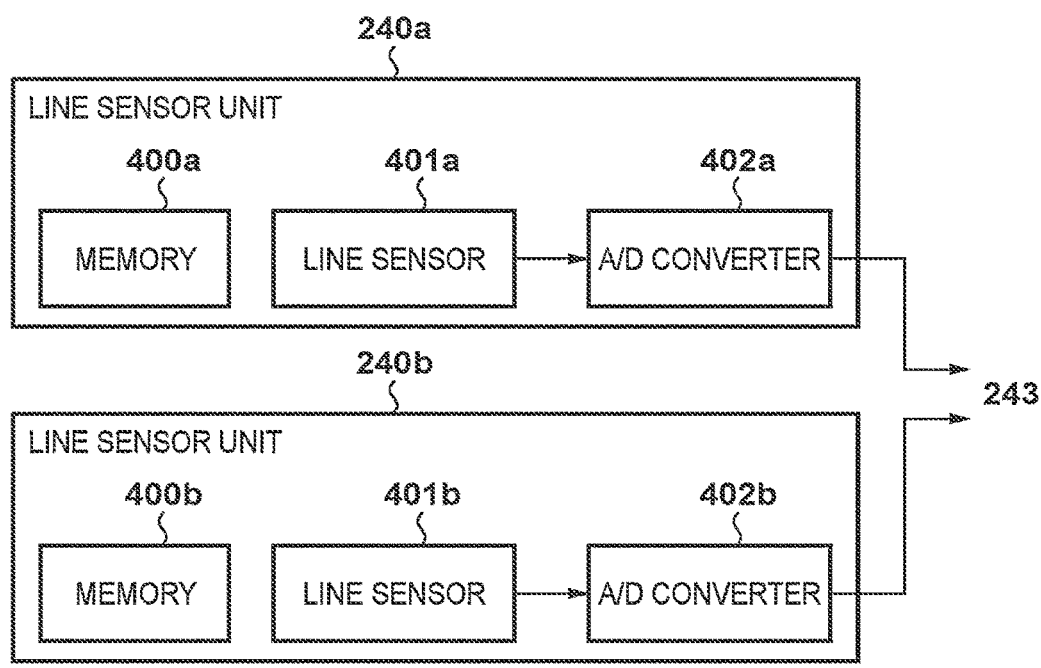
FIG. 19 is a descriptive diagram illustrating the configuration of a line sensor unit according to the second embodiment.

An example of the configuration of the line sensor unit 240 according to the present embodiment will be described next with reference to FIG. 19. The line sensor units 240a and 240b include line sensors 401a and 401b, memories 400a and 400b, and A/D converters 402a and 402b, respectively. The line sensors 401a and 401b are Contact Image Sensors (CIS), for example. Note that the image sensors performing the reading need not be CISs, and may be line scan cameras instead. The memories 400a and 400b store correction information, such as light intensity variation adjustment values and the like, for respective pixels in the corresponding line sensors 401a and 401b. The A/D converters 402a and 402b obtain analog signals that are results of the reading performed by the line sensors 401a and 401b, respectively. The A/D converters 402a and 402b convert the obtained analog signals into digital signals and transmit the digital signals to the HDD 255. Each digital signal represents R (red), G (green), and B (blue) read data.

2-5. Line Sensors

Figure 20:
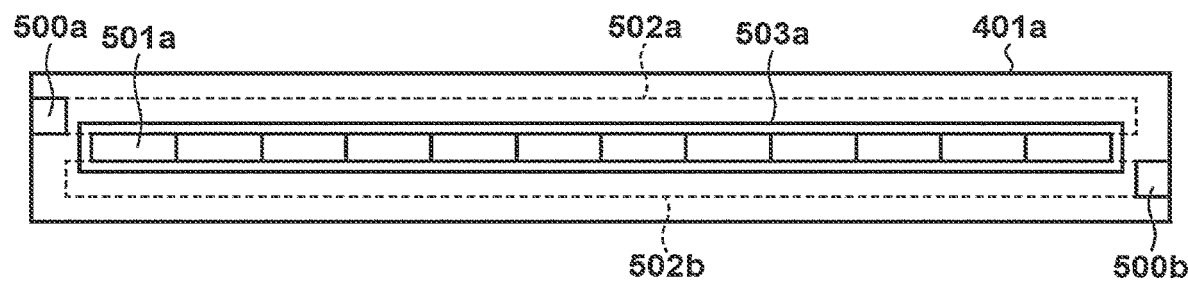
FIG. 20 is a descriptive diagram illustrating the configuration of a line sensor according to the second embodiment.

An example of the configuration of the line sensor 401a according to the present embodiment will be described next with reference to FIG. 20. The line sensor 401b has the same configuration and will therefore not be described. The line sensor 401a is an optical sensor including light emitting units 500a and 500b, light guides 502a and 502b, a lens array 503a, and sensor chips 501a. The line sensor 401a has a substantially rectangular shape, and reads an image by taking a longer direction as a main scanning direction. The line sensors 401a and 401b are attached to the inspection apparatus 109 such that the main scanning directions thereof are the same as the main scanning direction of the image-forming unit 107. As such, the transport direction of the sheet to be read (recording paper or the like) is the sub scanning direction.

The light emitting units 500a and 500b are light sources constituted by, for example, LEDs that emit white light. The light emitting unit 500a is disposed at an end part of the light guide 502a, and the light emitted by the light emitting unit 500a is emitted toward the sheet. The light emitting unit 500b is disposed at an end part of the light guide 502b, and the light emitted by the light emitting unit 500b is emitted toward the sheet. The light guides 502a and 502b are formed having straight line shapes in the main scanning direction. As such, the line sensors 401 emit light in a straight line in the main scanning direction. The main scanning direction of the line sensor unit 240 and the main scanning direction of the image-forming unit 107 are the same direction.

The lens array 503a is an optical system that directs reflected light, resulting from the sheet reflecting the light emitted from the light emitting units 500a and 500b, toward the sensor chip group 501a. The sensor chip group 501a is a light receiving unit constituted by a plurality of photoelectric conversion elements (sensor chips) arranged in a straight line in the main scanning direction. One sensor chip reads an image of one pixel. The plurality of sensor chips in the present embodiment have a three-line configuration. An R (red) color filter is applied to one of the lines, a G (green) color filter is applied to another one of the lines, and a B (blue) color filter is applied to the other one of the lines. Light guided by the lens array 503a forms an image on a light receiving surface of each sensor chip in the sensor chips 501a.

The light emitted from the light emitting units 500a and 500b diffuses within the light guides 502a and 502b and is emitted from curved locations such that the entirety of the sheet in the main scanning direction is illuminated. The light guide 502a and the light guide 502b are arranged in the sub scanning direction which is orthogonal to the main scanning direction with the lens array 503a placed in between. As such, the line sensor 401a has a bilateral illumination configuration in which light is emitted from both directions in the sub scanning direction relative to the lens array 503a (an image reading line). The sub scanning direction of the line sensor unit 240a and the sub scanning direction of the image-forming unit 107 are the same direction.

2-6. Principles of Flare

The principles of flare are the same as those described in the first embodiment. In other words, "flare" is a phenomenon in which read luminance values vary due to the effects of reflected light at a main scanning position near a position of interest. To describe again, there is a difference in a luminance value of a pixel of interest between a case where a neighboring image is dark (when there is little reflected light from the neighboring image) and a case where the neighboring image is bright (when there is a large amount of reflected light from the neighboring image). Because the amount of reflected light from the neighboring image is large when the neighboring image is bright, the read luminance values are brighter than when the neighboring image is dark.

2-7. Flare Chart

Figure 21:
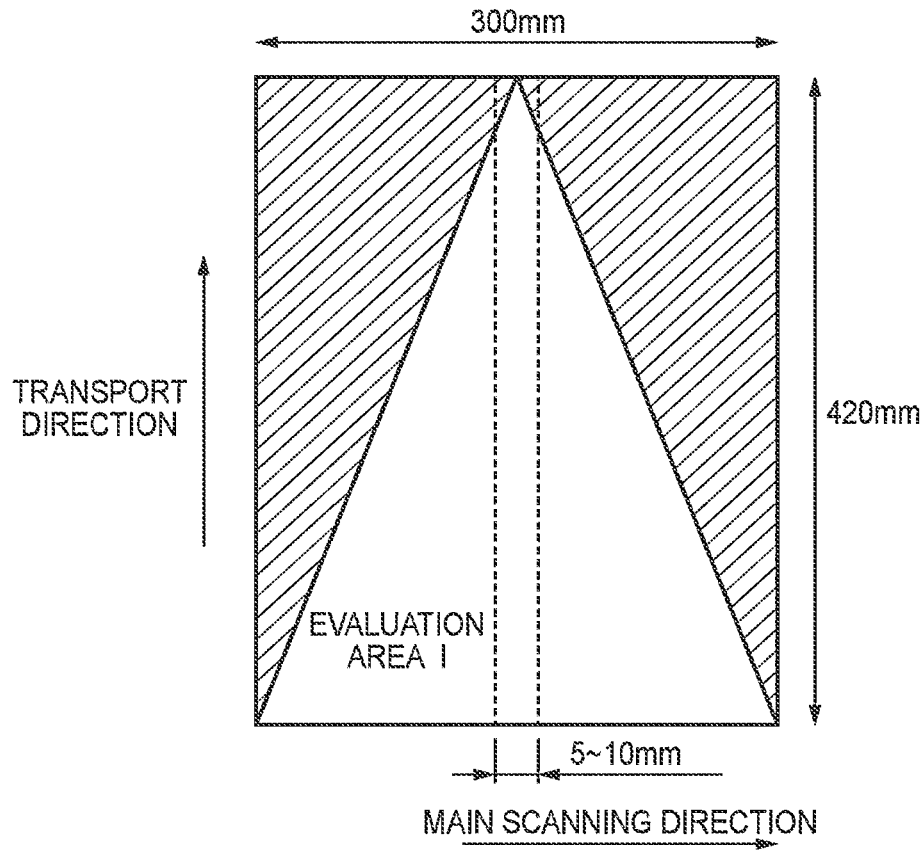
FIG. 21 is a diagram illustrating an example of a chart for measuring the properties of flare according to the second embodiment.

An example of a chart used to obtain flare data in the present embodiment will be described next with reference to FIG. 21. Note that the dimensions in the drawing indicate an example of an A3-sized image. As illustrated in FIG. 21, the flare data is a pattern representing a white triangle which is closed in the sub scanning direction. Distance properties of flare are calculated, for example, from the distance, in the main scanning direction, of a white area from an evaluation area I indicated by the area between the dotted lines.

2-8. Distance Properties of Flare

Figure 22:
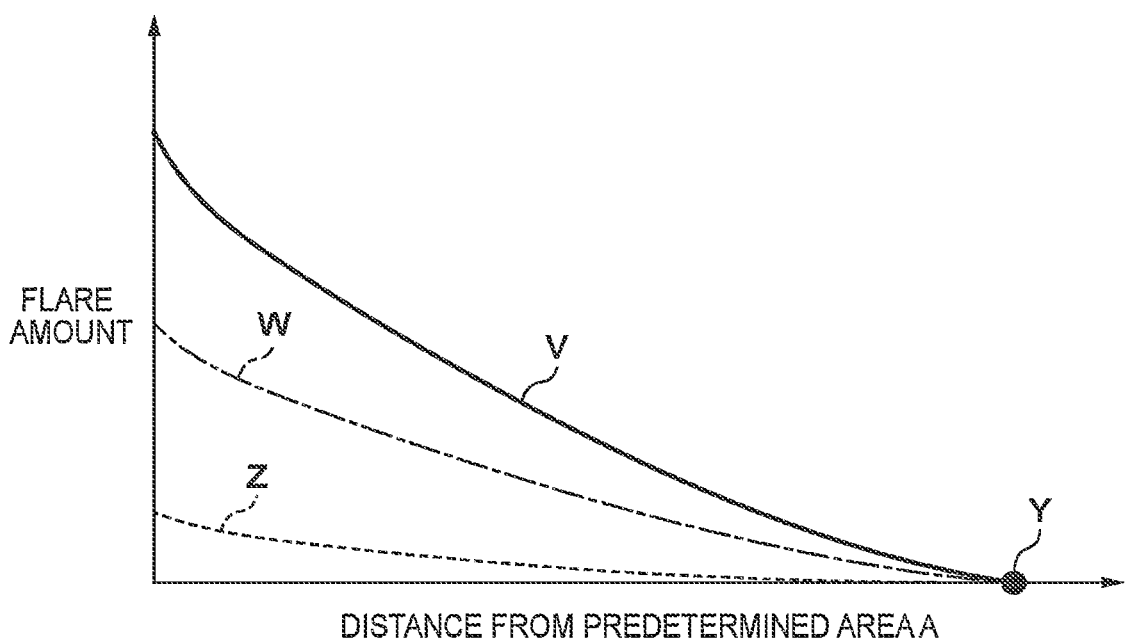
FIG. 22 is a graph illustrating distance properties of flare according to the second embodiment.

A graph representing the distance properties of flare according to the present embodiment will be described next with reference to FIG. 22. The horizontal axis represents distance from a pixel of interest (x,y) in an area A, and the vertical axis represents an amount of flare. A solid line V represents the distance properties when a neighboring area is a base color of the sheet (white), a dot-dash line W represents the distance properties when a neighboring area is a halftone, and a dotted line Z represents the distance properties when a neighboring area is a maximum density of black.

As the distance to the pixel of interest (x,y) decreases or the image density drops, the amount of flare increases (the effect of flare becomes stronger). Conversely, as the distance to the pixel of interest (x,y) increases, the amount of flare decreases, and the amount of flare reaches zero when the distance becomes a predetermined distance Y. In the present embodiment, the image which is actually printed is constituted by cyan, magenta, yellow, and black colors. Each color has different diffusion properties when incident, and thus the flare distance properties differ from color to color. The properties with respect to the amount of flare also differ depending on the paper on which the inspection image is printed.

2-9. Inspection Processing

Figure 23:
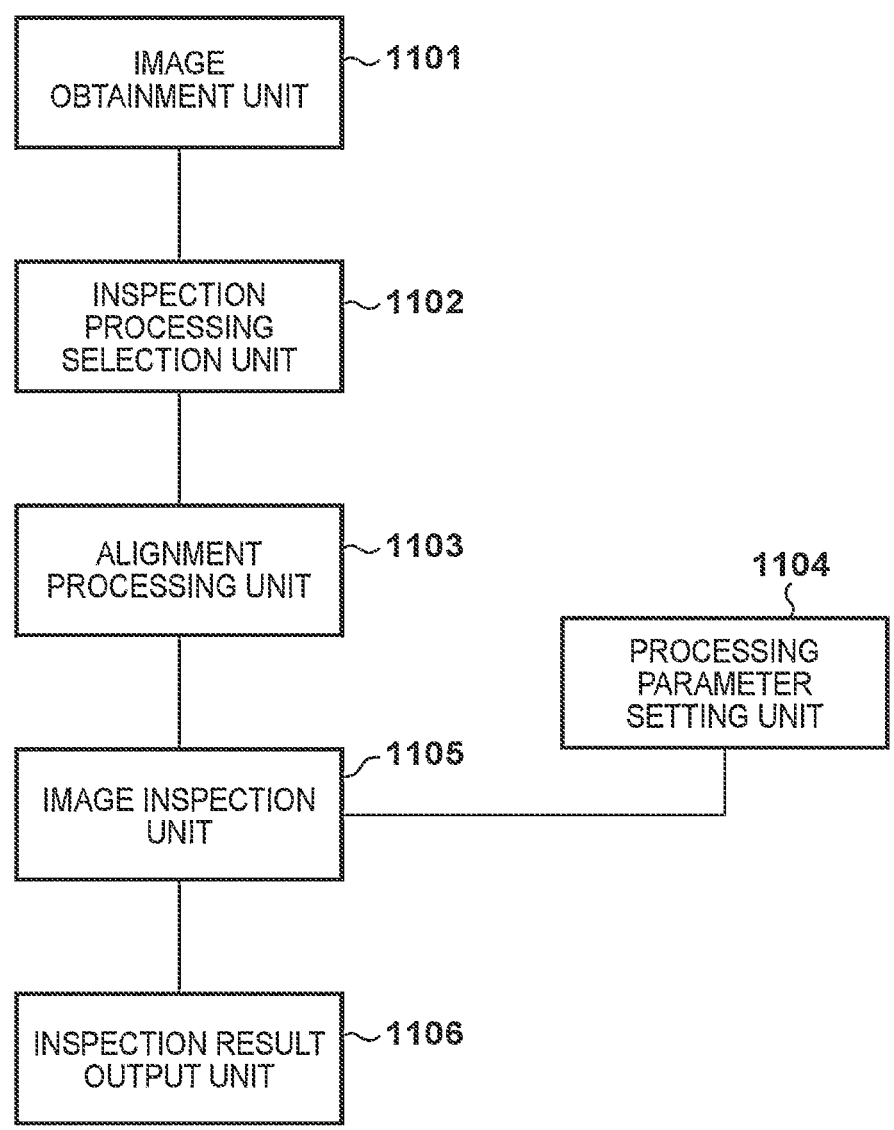
FIG. 23 is a block diagram illustrating the functional configuration of an inspection apparatus according to the second embodiment.
Figure 24:
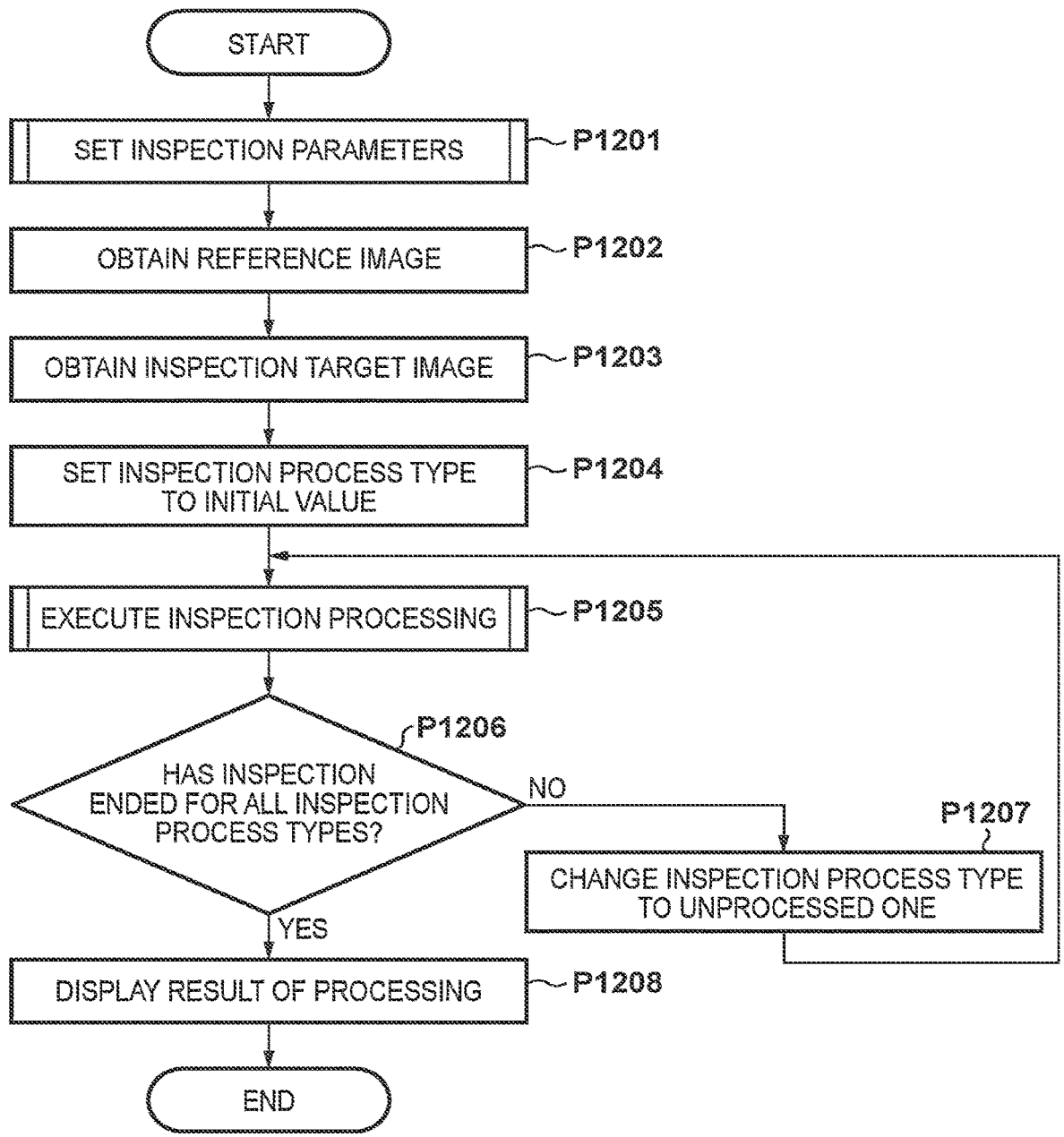
FIG. 24 is a flowchart illustrating a processing sequence for inspection processing according to the second embodiment.

A processing sequence for the inspection processing performed by the inspection apparatus 109 according to the present embodiment will be described next with reference to FIGS. 23 and 24. The processing described hereinafter is implemented, for example, by the CPU 238 reading out a program, which is stored in ROM within the memory 239, to RAM within the memory 239, and then executing the program. The step numbers of respective processes described below are indicated by the numbers following "P". FIG. 23 illustrates the functional configuration of the inspection apparatus 109. FIG. 24 is a flowchart illustrating the processing sequence of the inspection processing.

In P1201, an inspection process selection unit 1102 and a processing parameter setting unit 1104 select instances of anomaly detection processing to be performed based on user input, and set parameters for the selected instances of anomaly detection processing. Of course, it is also possible to select only one instance of anomaly detection processing. The inspection process selection unit 1102 accepts the selection of the instances of anomaly detection processing from the user through a selection screen (not shown) displayed in the display unit 241. In this selection screen, a type of anomaly can be selected, for example, and anomaly detection processing for detecting the selected anomaly is then selected. The types of anomalies may include any type of anomaly, such as image unevenness or planar defects, in addition to point-shaped anomalies and linear (streak) anomalies described in the present embodiment. If the user does not make a selection, anomaly detection processing set as a default may be selected. The processing parameter setting unit 1104 registers parameters for performing the anomaly detection selected by the inspection process selection unit 1102. The parameters include a filter corresponding to the type of anomaly and a threshold for determining whether an anomaly is present. Among these parameters, the threshold is set based on a difference value sent from the inspection apparatus 109. Processing for setting the parameters will be described in detail later.

Next, in P1202, an image obtainment unit 1101 obtains a reference image (reference image data) from the RAM within the memory 239 or the HDD 255. Note that the reference image data is assumed to be stored in the RAM within the memory 239 or the HDD 255 in advance. Image data resulting from RIP processing, which analyzes a print job and generates the image data, is registered as the reference image. Furthermore, in P1203, the image obtainment unit 1101 obtains an inspection target image by causing the line sensors 240a and 240b to read printed material transported from the image-forming unit 107. For the inspection target image, read data which has been read by the line sensors 240a and 240b in advance and stored in the HDD 255 may be obtained.

Next, in P1204, the inspection process selection unit 1102 sets the anomaly detection processing to be executed, from among the instances of anomaly detection processing stored in the RAM within the memory 239, to an initial value. The initial value indicates the anomaly detection processing to be performed first, and the processing may be performed in any order, such as the order of selection, if there is no particular order of priority for the order in which the anomaly detection processing is performed.

Next, in P1205, an alignment processing unit 1103 and an image inspection unit 1105 align the inspection target image with the reference image, and execute the anomaly detection processing. This will be described in detail later with reference to FIG. 28. Then, in P1206, the image inspection unit 1105 determines whether all the selected instances of anomaly detection processing have ended, moves to P1208 if all the instances of anomaly detection processing have ended, and moves to P1207 if anomaly detection processing remains.

In P1207, the inspection process selection unit 1102 sets the type of inspection process to one of those that remain unprocessed and returns the sequence to P1205. The processing of P1205 to P1207 is then repeated until all instances of anomaly detection processing have ended. Meanwhile, when all instances of anomaly detection processing have ended, in P1208, an inspection result output unit 1106 generates an inspection result and displays the inspection result in the display unit 241, after which the processing illustrated in the flowchart ends. The display processing will be described in detail later.

2-10. Reference Image Generation Processing

Figure 25:
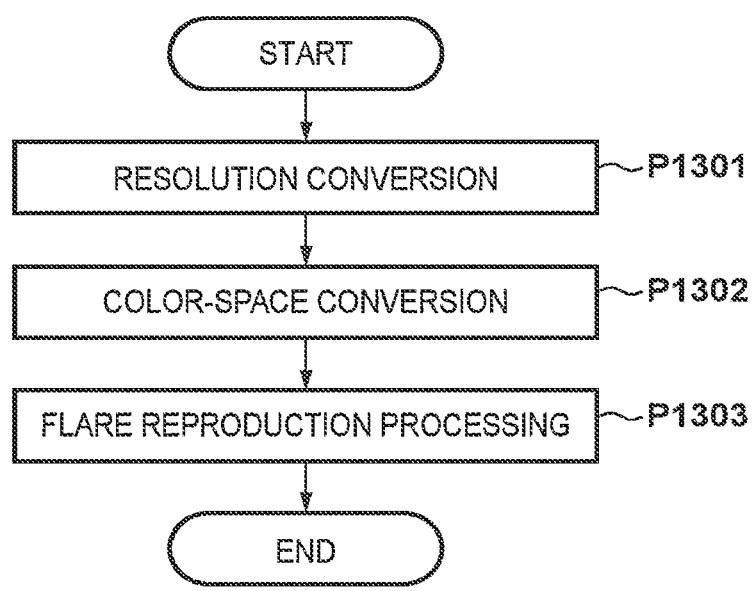
FIG. 25 is a flowchart illustrating reference image generation processing according to the second embodiment.

A processing sequence of the reference image generation processing executed by the image obtainment unit 1101 according to the present embodiment in the aforementioned P1202 will be described next with reference to FIG. 25. The processing described hereinafter is implemented, for example, by the CPU 238 reading out a program, which is stored in ROM within the memory 239, to RAM within the memory 239, and then executing the program. The step numbers of respective processes described below are indicated by the numbers following "P". Here, color conversion processing is performed using a color conversion table generated in advance and stored in the memory 239. As one example, a RIP image is assumed to be in the CMYK color space, with 8 bits per pixel and a resolution of 600 dpi, whereas the read image is assumed to be in the RGB color space, with 8 bits per pixel and a resolution of 150 dpi.

In P1301, the image obtainment unit 1101 converts the resolution of the RIP image to the same resolution as the read image, i.e., 150 dpi. Next, in P1302, the image obtainment unit 1101 converts the color space of the RIP image from the CMYK color space to the RGB color space using the color conversion table stored in the memory 239. In P1303, the image obtainment unit 1101 corrects the reference image by performing flare reproduction processing. Specifically, the amount of flare is estimated for a pixel of interest by executing weighting processing which applies weighting coefficients stored in the memory 239 to the pixel values of neighboring pixels excluding the pixel of interest, and the estimated amount of flare is added to the pixel value of the pixel of interest. This makes it possible to correct the reference image such that the effect of flare when reading the inspection target image is reflected in the reference image. Although the present embodiment describes an example of correcting the reference image such that the effect of flare is reflected therein, in another embodiment, the inspection target image may be corrected based on the estimated amount of flare such that the effect of flare is eliminated.

The corrected reference image can be obtained through the following formula.

$$p'(x, y) = f(x, y)\left\{o(x, y) + \sum_{j=0}^{lj} \sum_{i=0}^{li} Fk(i, j)p\left(x + i - \frac{li}{2}, y + j - \frac{lj}{2}\right)\right\}, \quad (B1)$$

where
p(x,y): pixel value at coordinate (x,y)
p'(x,y): pixel value after flare reproduction
Fk(i,j): weighting coefficient for reproducing flare
f(x,): reflectance of pixel of interest
o(x,y): light directly on pixel of interest
li,lj: reference pixel width $$\sum_{j=0}^{lj} \sum_{i=0}^{li} Fk(i, j)p\left(x + i - \frac{li}{2}, y + j - \frac{lj}{2}\right)$$

indicates light of flare from the neighboring area, and the reflectance of the pixel of interest is obtained through the following formula.

$$f(x,y) = (a \times p(x,y) + b) \quad (B2),$$

where a and b are predetermined values, and can be obtained experimentally.

Here, the following relational expression holds true for a pixel of interest P(x,y).

$$p(x,y) = f(x,y)\{o(x,y) + \Sigma_{j=0}^{lj}\Sigma_{i=0}^{li} Fk(i,j)p(x,y)\} \quad (B3)$$

Transforming the foregoing Formula (B3) results in the following Formula.

$$f(x,y)o(x,y) = p(x,y) - f(x,y)p(x,y)\Sigma_{j=0}^{lj}\Sigma_{i=0}^{li} Fk(i,j) \quad (B4)$$

By substituting Formula (B4) into Formula (B1), the following Formula (B5) is obtained, through which the flare for the pixel of interest can be reproduced from the pixel values of the neighboring pixels and the weighting coefficients Fk.

$$p'(x, y) = p(x, y) - f(x, y)p(x, y)\sum_{j=0}^{lj}\sum_{i=0}^{li} Fk(i, j) + f(x, y)\sum_{j=0}^{lj}\sum_{i=0}^{li} Fk(i, j)p\left(x + i - \frac{li}{2}, y + j - \frac{lj}{2}\right) \quad (B5)$$

Figure 26:
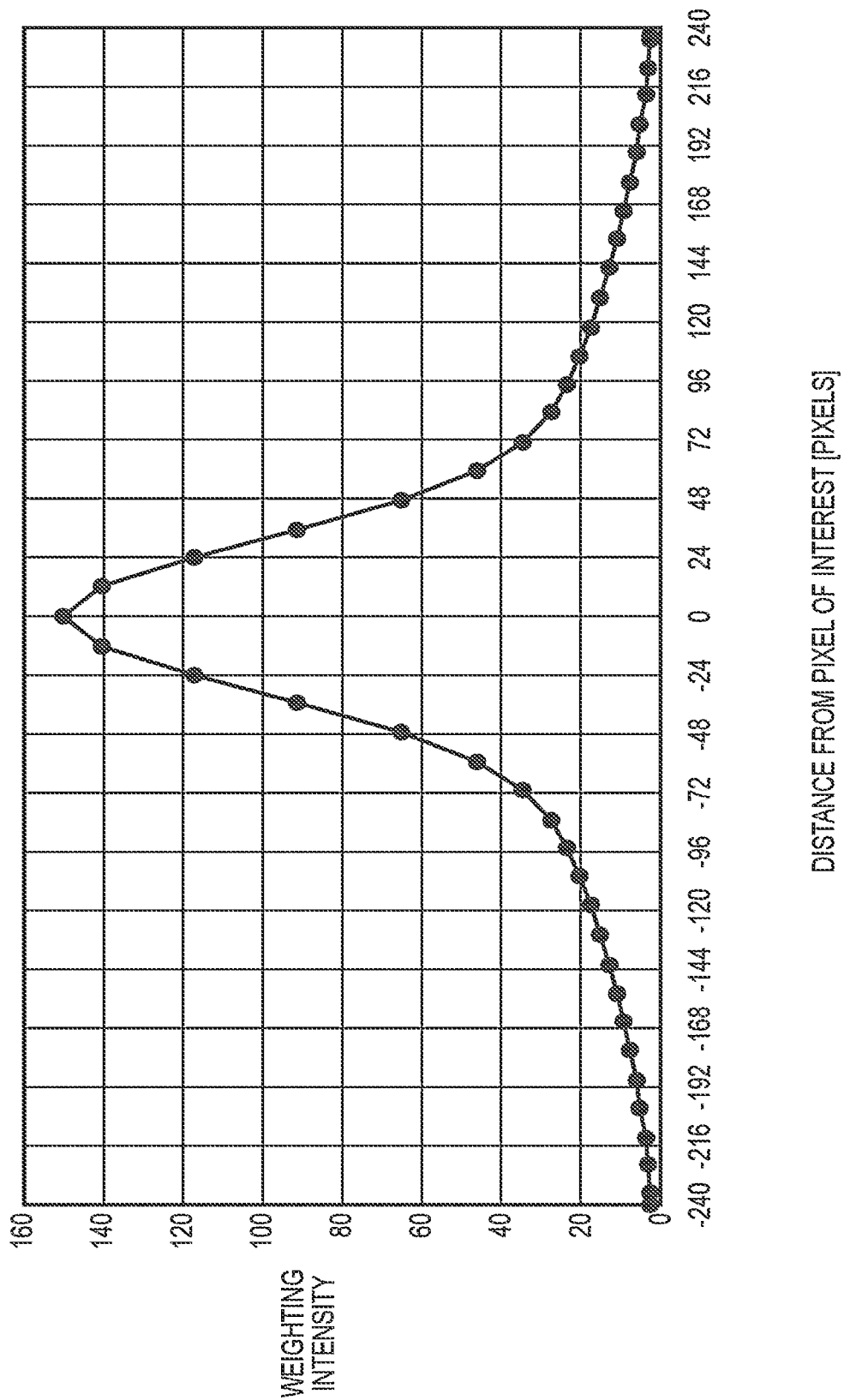
FIG. 26 is a diagram illustrating an example of weighting coefficients for reproducing flare according to the second embodiment.

FIG. 26 is a diagram illustrating an example of the weighting coefficients Fk for reproducing flare. The weighting coefficients Fk for reproducing flare are obtained by back-calculating from the distance properties illustrated in FIG. 22. Although FIG. 22 illustrates only the distance properties on one side of the position of interest, FIG. 26 expands the properties in FIG. 22 to the left and right (both sides) to show the weighting coefficients taking into account the neighboring pixels on the left and right. Additionally, the reflectance of the sheet changes when the base color of the sheet changes, and thus the distance properties indicated in FIG. 22 change depending on the sheet. It is therefore preferable to preset, and store in the memory 239, the weighting coefficients Fk for each type of sheet, and switch the weighting coefficients Fk according to the selected sheet settings.

2-11. Effects of Flare Reproduction

Figure 27:
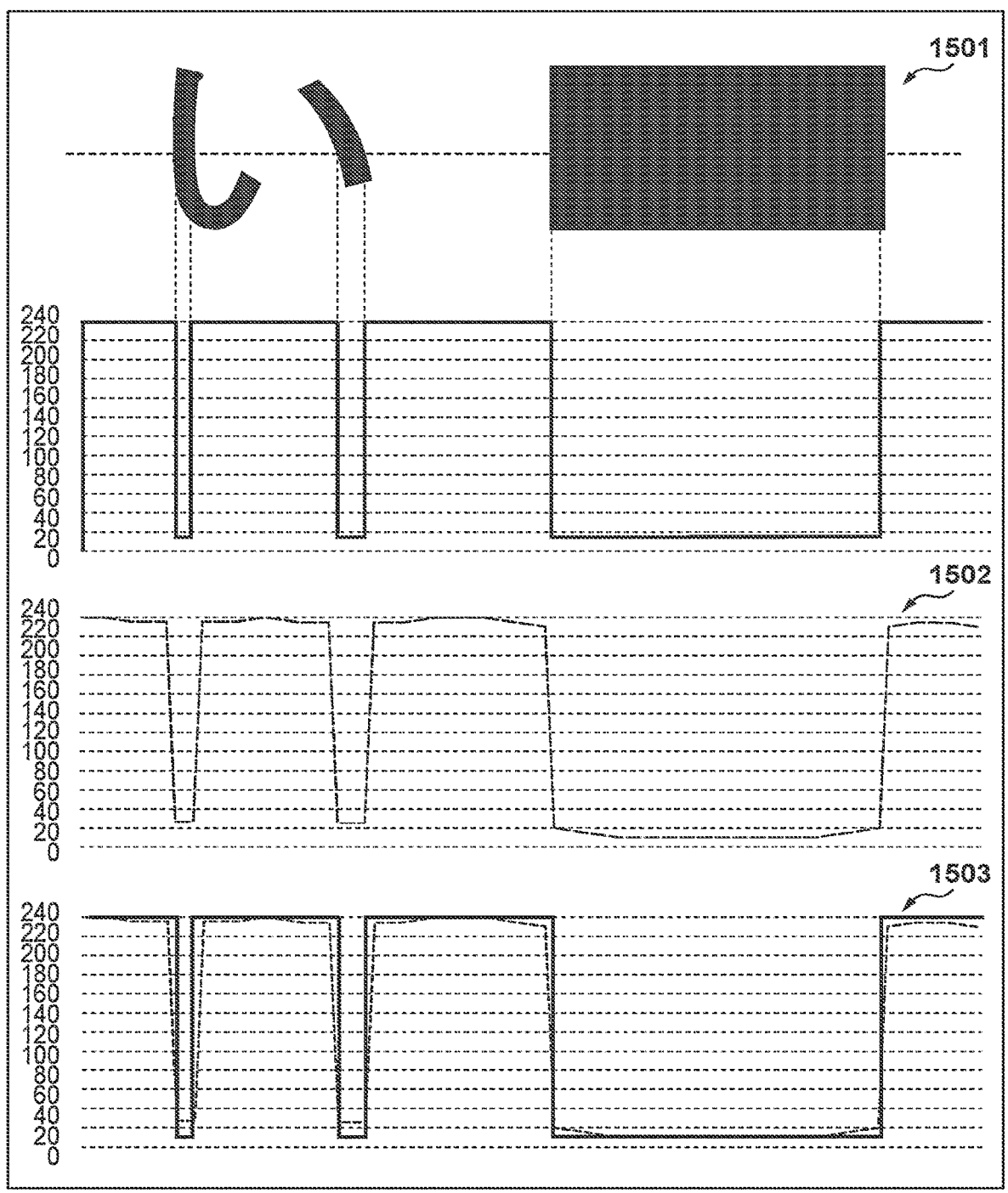
FIG. 27 is a diagram illustrating flare reproduction processing according to the second embodiment.

The flare reproduction processing will be described next with reference to FIG. 27. A graph 1501 represents the signal values at the locations in the reference image indicated by the dotted line. The signal values are signal values from before flare is reproduced.

A graph 1502 represents the signal values in the inspection image, at the same location as in the graph 1501. It can be seen that in the graph 1502, there is a difference in the signal values from the graph 1501 near the edges due to the effect of flare. The inspection apparatus obtains the differences between the reference image and the inspection image, and detects the locations where there are differences as anomalies. As such, when a difference arises due to the effect of flare, an anomaly will be detected despite there actually being no anomaly, and the inspection cannot be performed correctly.

Accordingly, the present embodiment improves the inspection accuracy by reproducing the effect of flare in the reference image and bringing the reference image closer to the inspection image. The solid line in a graph 1503 represents signal values from before flare is reproduced. The dotted line in the graph 1503 represents signal values after the flare reproduction processing according to the present embodiment is applied to the graph 1501. Comparing the graph 1502 and the graph 1503, it can be seen that the differences from the graph 1502 are smaller in the graph 1503, in which the flare is reproduced, than the graph 1501.

As described above, the inspection accuracy can be improved by reproducing the effect of flare in the reference image and bringing the reference image closer to the inspection image. Note that the present invention is not intended to be limited thereto, and instead of adding the effect of flare to the reference image, the inspection image itself may be corrected such that the effect of flare is subtracted from the inspection image.

2-12. Anomaly Detection Processing

A processing sequence of the anomaly detection processing executed by the alignment processing unit 1103 and the image inspection unit 1105 in the aforementioned P1205 according to the present embodiment will be described next with reference to FIG. 28. The processing described hereinafter is implemented, for example, by the CPU 238 reading out a program, which is stored in ROM within the memory 239, to RAM within the memory 239, and then executing the program. The step numbers of respective processes described below are indicated by the numbers following "P".

First, in P1601, the alignment processing unit 1103 aligns the reference image with the inspection target image. Any publicly-known method can be used for the alignment. For example, a method of extracting sheet contours of respective images as feature points and mapping those feature points between the images, a method of extracting images printed on the sheets as feature points and using those feature points, or the like may be applied. Next, in P1602, the image inspection unit 1105 obtains a difference image between the reference image and the inspection target image, after which the sequence moves to P1603. Here, the difference image is generated, for example, by comparing the reference image with the inspection target image on a pixel-by-pixel basis, and obtaining difference values for the pixel values (e.g., density values for each of R, G, and B) on a pixel-by-pixel basis.

Figure 29A:
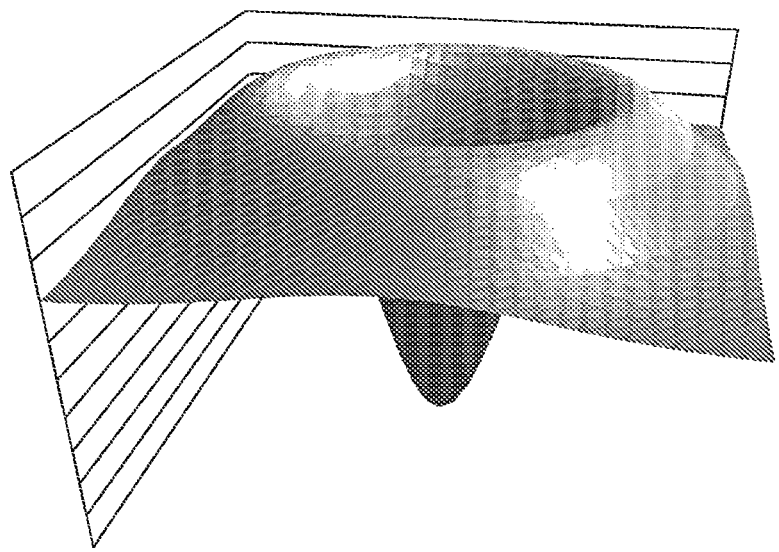
FIG. 29A is a diagram illustrating an example of the shape of an emphasizing processing filter according to the second embodiment.
Figure 29B:
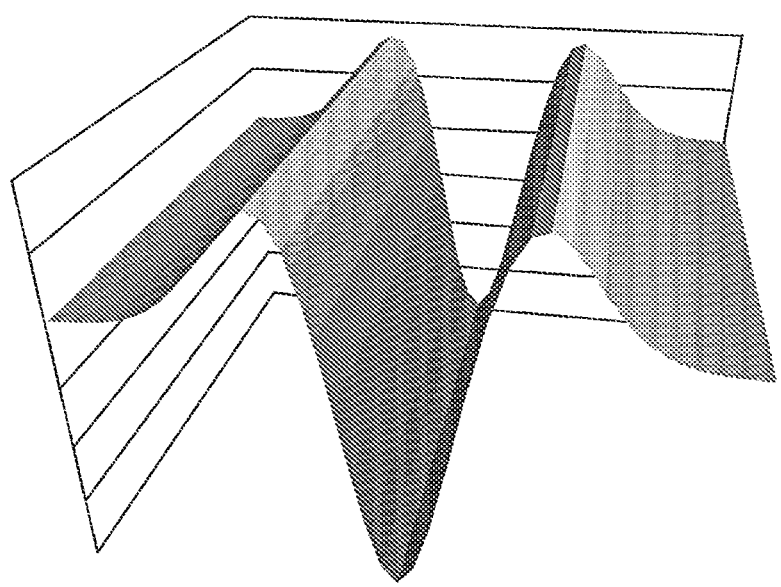
FIG. 29B is a diagram illustrating another example of the shape of an emphasizing processing filter according to the second embodiment.

Next, in P1603, the image inspection unit 1105 executes filter processing for emphasizing specific shapes on the difference image obtained in P1602. For example, FIG. 29A illustrates a filter for emphasizing point-shaped anomalies, whereas FIG. 29B illustrates a filter for emphasizing line-shaped anomalies. Which filter to be used may change according to the type of the anomaly detection processing selected in the aforementioned P1204. For example, if the detection of point-shaped anomalies has been selected for anomaly detection processing, the processing is executed using the filter illustrated in FIG. 29A. On the other hand, if the detection of line-shaped anomalies has been selected for anomaly detection processing, the processing is executed using the filter illustrated in FIG. 29B.

Next, in P1604, the image inspection unit 1105 executes binarization processing on the difference image that has undergone emphasizing processing, using a value of "1" if the difference value is larger than a threshold and "0" if the difference value is equal to or smaller than the threshold. Next, in P1605, the image inspection unit 1105 determines whether there is a pixel, in the image subjected to the binarization processing, which exceeds the threshold and has become "1". If such a pixel is present, the sequence moves to P1606, whereas if such a pixel is not present, it is considered that there are no anomalies, and the processing of this flowchart ends. In P1606, the image inspection unit 1105 considers that there is an anomaly, and stores the type of the anomaly detection processing in which the anomaly is detected in association with the coordinates of the anomaly, after which the processing of this flowchart ends.

The processing described above with reference to the flowchart in FIG. 28 is a subroutine of P1205, and illustrates the flow of a single instance of anomaly detection processing. As such, each time the subroutine of P1205 is called, the selected type of anomaly detection processing is executed, and the filter processing (P1603) corresponding to the selected type is executed. Although the present embodiment describes an example of processing for detecting point-shaped anomalies and processing for detecting line-shaped anomalies as anomaly detection processing, the processing is not limited thereto. In other words, any processing capable of detecting an anomaly desired by the user can be applied in the present invention, and the type thereof is not limited.

2-13. Processing Parameters

The processing parameters (detection parameters) set by the processing parameter setting unit 1104 in the aforementioned P1201 will be described here. As described earlier, in the present embodiment, filter processing (P1603) and binarization processing (P1604) are executed on the obtained difference image. At this time, if the shape of the filter illustrated in FIG. 29A is reduced in size, point-shaped anomalies of a smaller size will be emphasized and will therefore be easier to detect. Likewise, if the threshold for the binarization processing is lowered, smaller differences will exceed the threshold in the binarization processing and take on a value of "1", and will therefore be detected. In other words, anomalies having even lower contrast can be detected. In this manner, parameters pertaining to the size of the filter, a threshold used during detection, and the like are set as the processing parameters in P1201.

2-14. Detection Result Display Method

Figure 30:
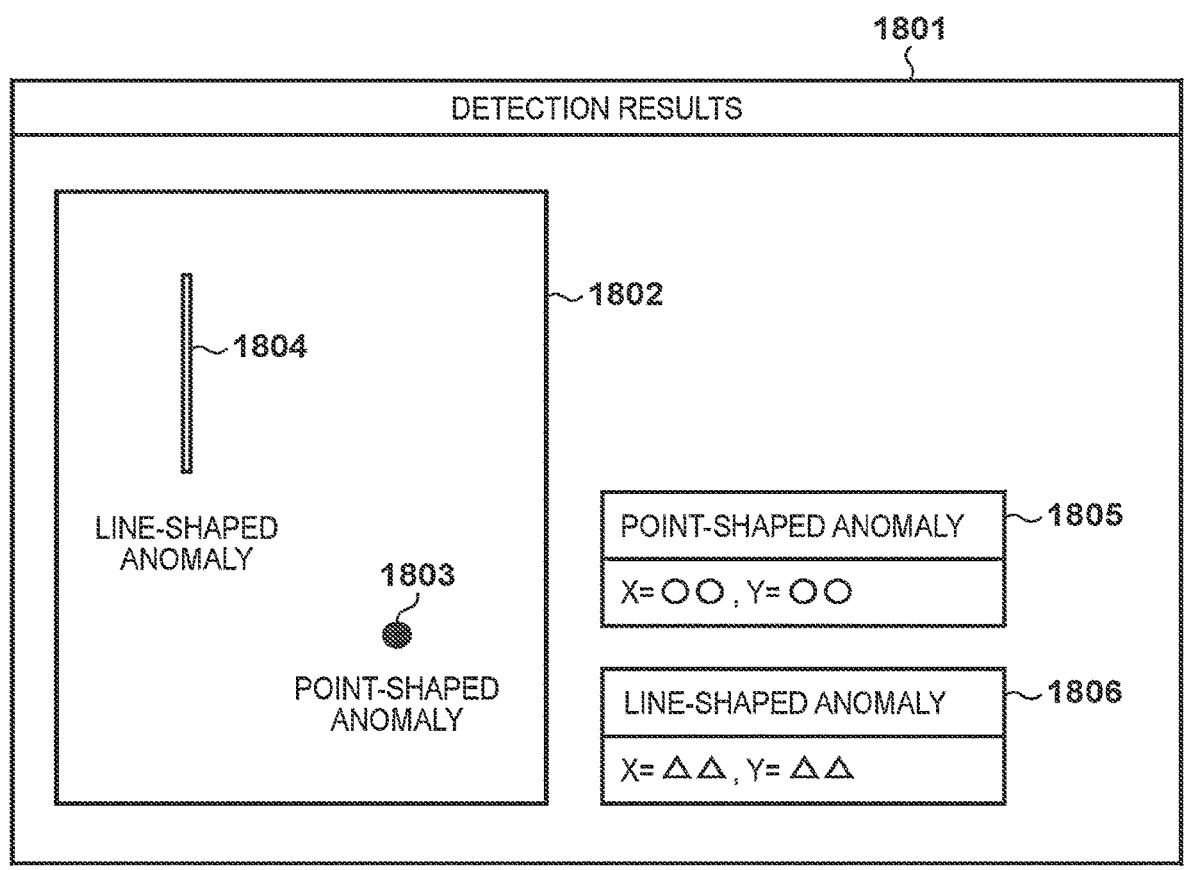
FIG. 30 is a diagram illustrating an example of a result display screen according to the second embodiment.

Detection results displayed by the inspection result output unit 1106 according to the present embodiment in P1208 will be described in detail next with reference to FIG. 30. FIG. 30 is a diagram illustrating an example of a result display screen according to the present embodiment. An overall image 1802 of the inspection target image is displayed in a UI screen 1801. Here, for example, an anomaly 1803 detected using the filter illustrated in FIG. 29A is determined to be a point-shaped anomaly, and text reading "point-shaped anomaly" is displayed near the anomaly 1803. Likewise, an anomaly 1804 detected using the filter illustrated in FIG. 29B is determined to be a line-shaped anomaly, and text reading "line-shaped anomaly" is displayed near the anomaly 1804. Furthermore, the coordinates of each anomaly may be displayed as well, as indicated by reference signs 1805 and 1806. However, the inspection result display method is not limited to the method described above, as long as the processing, among the plurality of types of detection processing, that detected the anomaly is visible, e.g., by using different colors to display respective types of detection processing.

2-15. Summary of Second Embodiment

The inspection apparatus according to the second embodiment described in this section obtains an inspection target image by irradiating a printed material to be inspected with light and receiving reflected light from the printed material, and further obtains a reference image based on printing data used to print the printed material. Additionally, the inspection apparatus corrects the reference image using predetermined weighting coefficients such that the reference image reflects an effect of flare on a pixel of interest in the printed material from neighboring pixels that occurs when the inspection target image is obtained. Furthermore, the inspection apparatus compares the reference image after correction with the inspection target image to inspect the printed material for anomalies. According to the present embodiment, reproducing the effect of flare in the reference image reduces the difference between the inspection image, which was affected by flare, and the reference image, making it possible to prevent a drop in the anomaly detection accuracy. In the present embodiment, the reference image is brought closer to the inspection image by performing flare reproduction processing on the reference image. Conversely, the inspection image may be brought closer to the reference image by performing flare correction processing on the inspection image. In these cases, the flare correction coefficient is calculated from the distance properties indicated in FIG. 22.

3. Third Embodiment

A third embodiment of the present invention will be described hereinafter. The foregoing second embodiment described a method for reproducing flare in a pixel of interest using the pixel values of a neighboring image and the weighting coefficients Fk. However, it is necessary for the weighting coefficients Fk to reference 481 neighboring pixels with the pixel of interest in the main scanning direction in the case of the resolution of 150 dpi, which increases the processing load when performing the inspection in real time. For example, in order to perform the flare reproduction processing of the second embodiment on a single pixel, it is necessary to reference 231361 (=481×481) pixels to process 481 pixels with the pixel of interest in the main scanning direction and 481 pixels with the pixel of interest in the sub scanning direction. Meanwhile, the filter processing in P1603 in the second embodiment is a filter that references 15×15 neighboring pixels with the pixel of interest in the main scanning direction and the sub scanning direction. Accordingly, the flare reproduction processing of the second embodiment takes approximately 1028 (=231361/225) times longer than the filter processing in P1603.

As such, the present embodiment will describe a method in which flare is reproduced quickly by converting the input image into a plurality of low-resolution images, dividing the weighting coefficients Fk, and then obtaining amounts of flare for respective images using the divided weighting coefficients and combining the amounts. When reproducing flare using pixel values far from the pixel of interest, obtaining the low-resolution images reduces the number of neighboring pixels referenced in the weighting, which accelerates the processing. The present embodiment will describe a method in which the resolution of the input image is converted into two types of resolutions, namely ¼ and ¹⁄₁₆, and the amounts of flare are obtained for respective resulting images using divided weighting coefficients.

Figure 33:
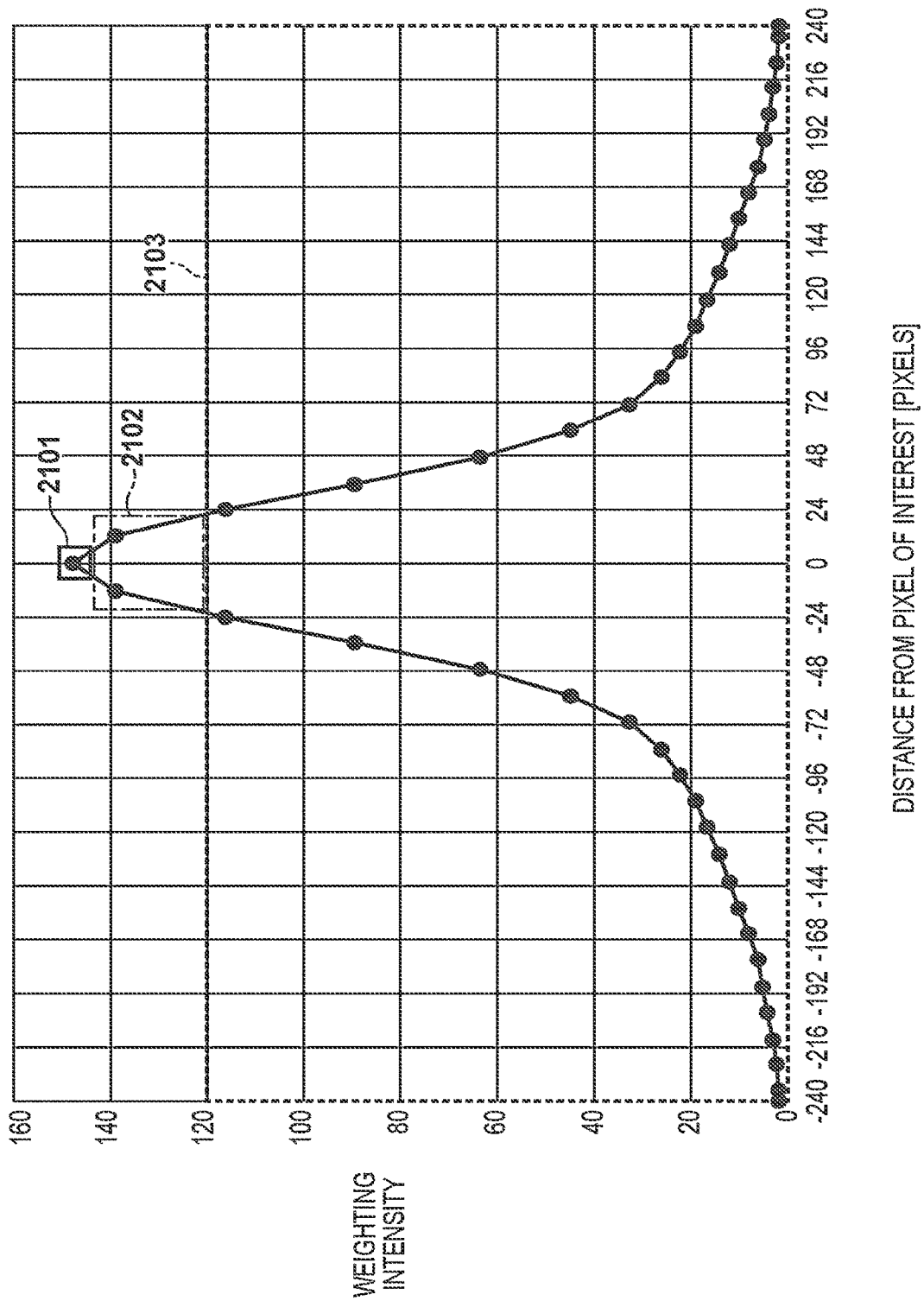
FIG. 33 is a diagram illustrating an example of weighting coefficients in the flare reproduction processing according to the second embodiment.

The weighting coefficients in FIG. 26 refer to a distance of up to 240 pixels in terms of 150 dpi, and have properties where the weight is greater near the pixel of interest and decreases as the distance increases. Here, if the processing resolution is set to ¹⁄₁₆, for 9.375 dpi, the number of pixels to be referenced can be reduced to 240/16=15 pixels. However, to prevent the loss of high-frequency information nearby, where the weights are large, the processing is performed at a resolution of 9.375 dpi for an area 2103 indicated by the dotted line, which has small weights and is far from the pixel of interest, as illustrated in FIG. 33. Then, for an area 2102 indicated by the dot-dash line, information loss is kept to a minimum by performing the processing at 37.5 dpi, which is ¼ the resolution. For an area 2101 indicated by the solid line, where the weights are the highest, processing is performed at 150 dpi. In this manner, according to the present embodiment, a plurality of low-resolution images having different resolutions are generated from the input image, and the weighting coefficients Fk are divided for respective resolutions to generate weighting coefficients corresponding to the different resolutions. The weighting coefficients corresponding to the different resolutions are then used to perform weighting processing on the respective images, and the amount of flare is obtained as a result. This enables higher processing speeds while keeping the calculations accurate. The following will mainly describe the differences between the present embodiment and the second embodiment.

Figure 31:
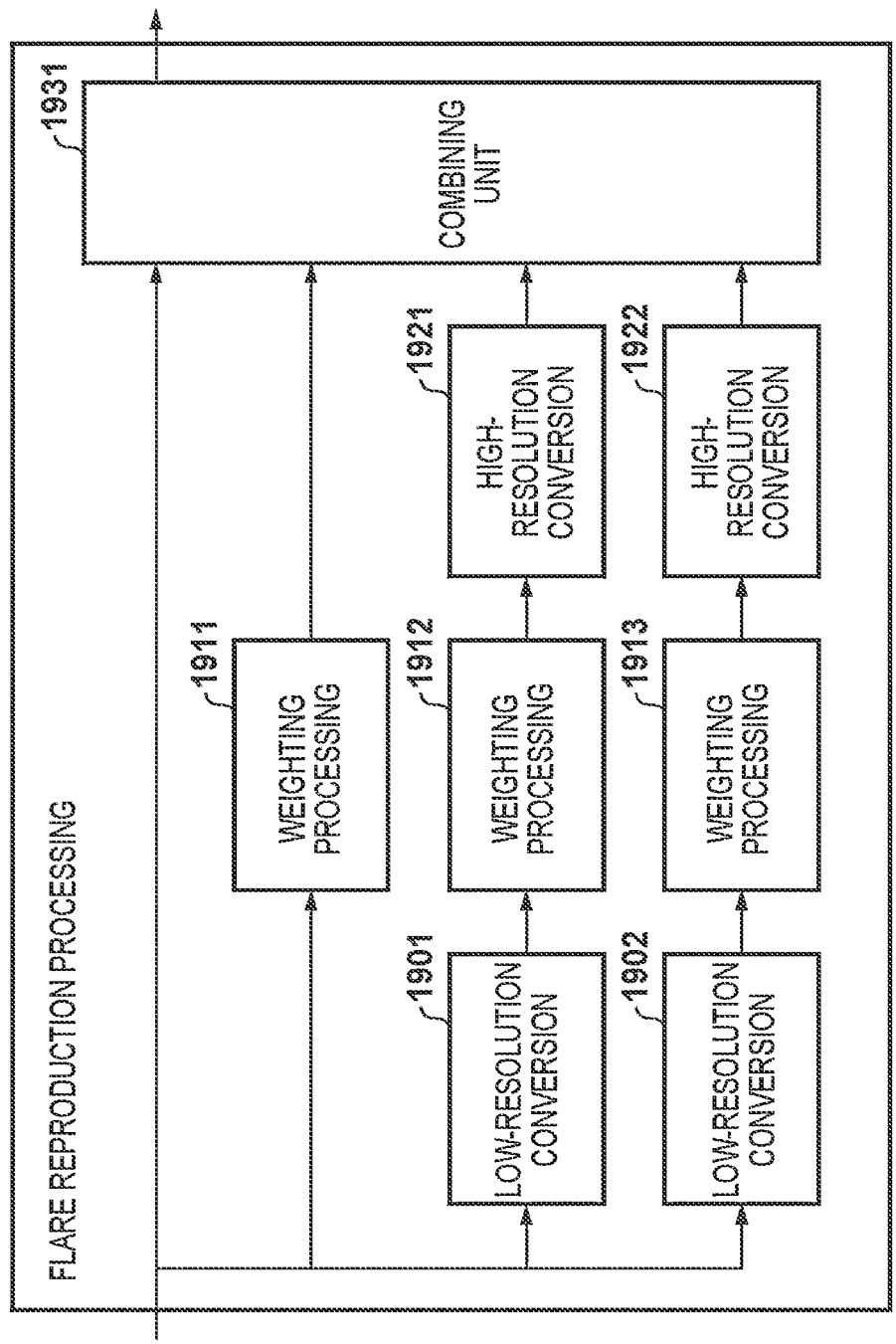
FIG. 31 is a block diagram illustrating the functional configuration of the flare reproduction processing according to the second embodiment.
Figure 32:
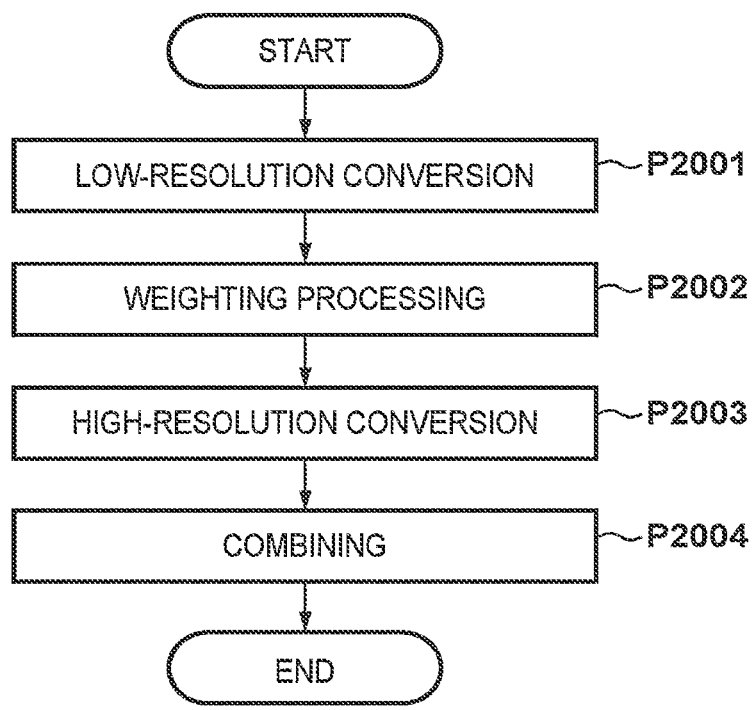
FIG. 32 is a flowchart illustrating a processing sequence for flare reproduction processing according to the second embodiment.

The flare reproduction processing performed by the image obtainment unit 1101 according to the present embodiment will be described with reference to FIGS. 31 to 33. FIG. 31 illustrates function blocks of the flare reproduction processing according to the present embodiment. FIG. 32 illustrates a processing sequence of the flare reproduction processing according to the present embodiment. FIG. 33 is a diagram for describing weighting processing handled by weighting processing units 1911, 1912, and 1913.

In P2001, low-resolution conversion units 1901 and 1902 perform low-resolution conversion processing. In the present embodiment, the resolution of the input image is 150 dpi.

The low-resolution conversion unit 1901 converts the input image, which is the reference image, to ¼ the resolution, that is, 37.5 dpi. The low-resolution conversion unit 1902 converts the input image to ¹⁄₁₆ the resolution, that is, 9.375 dpi.

In P2002, the weighting processing units 1911, 1912, and 1913 obtain the amounts of flare at the corresponding resolutions by performing weighting processing. The weighting processing unit 1911, for which the processed image has a resolution of 150 dpi, handles a high-frequency part in the area 2101 indicated by the solid line in FIG. 33. The weighting processing unit 1911 obtains an amount of flare up to 7 pixels in the periphery, in terms of 150 dpi. The weighting processing unit 1912, for which the processed image has a resolution of 37.5 dpi, handles a mid-frequency part in the area 2102 indicated by the dot-dash line in FIG. 33. The weighting processing unit 1912 obtains the amount of flare by referring to 5 pixels to the left and right at 37.5 dpi, and therefore effectively references up to 5×4=20 pixels in terms of 150 dpi. The weighting processing unit 1913, for which the processed image has a resolution of 9.375 dpi, handles a low-frequency part in the area 2103 indicated by the dotted line in FIG. 33. The weighting processing unit 1913 obtains the amount of flare by referring to 15 pixels to the left and right at 9.375 dpi, and therefore effectively references up to 15×16=240 pixels in terms of 150 dpi.

Next, in P2003, high-frequency conversion units 1921 and 1922 perform high-frequency conversion processing. The high-frequency conversion unit 1921 converts the resolution by a factor of 4 to convert the amount of flare having a resolution of 37.5 dpi, processed by the weighting processing unit 1912, back to the original resolution of 150 dpi. The high-frequency conversion unit 1922 converts the resolution by a factor of 16 to convert the amount of flare having a resolution of 9.375 dpi, processed by the weighting processing unit 1913, back to the original resolution of 150 dpi.

Next, in P2004, a combining unit 1931 performs combining processing. The amount of flare is obtained by adding the outputs from the weighting processing unit 1911, the high-frequency conversion unit 1921, and the high-frequency conversion unit 1922. The flare at the pixel of interest is then reproduced from the pixel value and the amount of flare of the pixel of interest. Once the combining processing is complete, the processing of this flowchart ends.

In the foregoing second embodiment, the amount of flare was obtained using 231361 (=481×481) neighboring pixels. Meanwhile, in the present embodiment, the amount of flare is obtained with 7×7 pixels at a resolution of 150 dpi, 11×11 pixels at a resolution of 37.5 dpi, and 31×31 pixels at a resolution of 9.375 dpi, for a total of 49+121+961=1,131 pixels. The number of calculations can therefore be reduced to roughly 0.00488 (=1131/231361). In terms of calculation accuracy, the processing is performed at the input resolution without reducing the resolution in the vicinity of the pixel of interest, where the flare weighting is high, whereas the resolution is reduced to ¹⁄₁₆ for distant pixels, where the flare weighting is low, which makes it possible to keep the calculation accuracy high. P2002 to P2005 of the above-described flare reproduction processing are repeated for all pixels.

In this manner, the present embodiment has described a method in which flare is reproduced by converting the input image into a plurality of low-resolution images, dividing the weighting coefficients Fk, and then obtaining amounts of flare for respective images using the divided weighting coefficients and combining the amounts. Nearby pixels having high weights can be weighted at a higher resolution to enable high-speed flare reproduction processing while maintaining a high level of accuracy.

The present embodiment has been described for a case where the resolution is reduced to two types, namely ¼ and ¹⁄₁₆, and the weighting coefficients are divided into three types. However, the converted resolutions and types are not limited thereto. The converted resolutions are determined according to the flare distance properties, which depend on the line sensors, and the required processing speed. Furthermore, although the present embodiment has been described with three types, the coefficients may be divided into five types to increase the calculation accuracy, if there is room in terms of processing speed.

4. Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priorities from Japanese Patent Application No. 2022-047351 filed on Mar. 23, 2022, Japanese Patent Application No. 2022-093821 filed on Jun. 9, 2022, and Japanese Patent Application No. 2022-208803 filed on Dec. 26, 2022, which are hereby incorporated by references herein in their entirety.

What is claimed is:
1. An inspection apparatus comprising:
a memory storing instructions; and
a controller, including a processor, that executes the instructions to:
obtain an inspection target image by irradiating with light a printed material to be inspected and receiving reflected light from the printed material;

obtain a reference image based on printing data used for printing the printed material;
correct the reference image using predetermined weighting coefficients so that the reference image reflects an effect of flare on a pixel of interest in the printed material from neighboring pixels that occurs when the inspection target image is obtained; and
compare the corrected reference image with the inspection target image to inspect the printed material for anomalies.

2. The inspection apparatus according to claim 1, further comprising:
a storage storing the predetermined weighting coefficients,
wherein the controller causes the reference image to reflect the effect of flare by:
obtaining an amount of flare on a pixel of interest by applying the predetermined weighting coefficients stored in the storage unit to pixel values of neighboring pixels; and
adding the obtained amount of flare to a pixel value of the pixel of interest.

3. The inspection apparatus according to claim 1, wherein the controller, in correcting the reference image:
converts a resolution of the reference image to a resolution of the inspection target image;
converts a color space of the reference image, for which the resolution has been converted, to a color space of the inspection target image; and
corrects the reference image using the predetermined weighting coefficients so that the reference image reflects the effect of flare.

4. The inspection apparatus according to claim 3, wherein the controller, in correcting the reference image:
generates a plurality of low-resolution images having a different resolution from the reference image;
generates weighting coefficients corresponding to different resolutions by dividing the predetermined weighting coefficients on a resolution-by-resolution basis;
executes weighting processing on the plurality of low-resolution images using the weighting coefficients corresponding to different resolutions;
converts the plurality of low-resolution images after the weighting processing into high-resolution images with the same resolution as the resolution of the reference image; and
obtains the corrected reference image by combining the high-resolution images.

5. The inspection apparatus according to claim 4, wherein the controller, in correcting the reference imag:
generates first weighting coefficients corresponding to a first resolution by referring to first predetermined weighting coefficients in a first range; and
generates second weighting coefficients corresponding to a second resolution that is lower than the first resolution by referring to second predetermined weighting coefficients in a second range that is broader than the first range.

6. The inspection apparatus according to claim 1, wherein the predetermined weighting coefficients differ with distance from a pixel of interest.

7. The inspection apparatus according to claim 6, wherein the predetermined weighting coefficients are set so as to contribute to the effect of flare more strongly for pixels closer to a pixel of interest.

8. The inspection apparatus according to claim 2, wherein the predetermined weighting coefficients are determined for each of types of sheets.

9. An inspection apparatus comprising:
a memory storing instructions; and
a controller, including a processor, that executes the instructions to:
obtain an inspection target image by irradiating with light a printed material to be inspected and receiving reflected light from the printed material;
obtain a reference image based on printing data used for printing the printed material;
correct the inspection target image using predetermined weighting coefficients so as to remove, from the inspection target image, an effect of flare on a pixel of interest in the printed material from neighboring pixels that occurs when the inspection target image is obtained; and
compare the corrected inspection target image with the reference image to inspect the printed material for anomalies.

10. The inspection apparatus according to claim 9, further comprising:
a storage storing the predetermined weighting coefficients,
wherein the controller removes the effect of flare from the inspection target image by:
obtaining an amount of flare on a pixel of interest by applying the predetermined weighting coefficients stored in the storage unit to pixel values of neighboring pixels; and
subtracting the amount of flare obtained from a pixel value of the pixel of interest.

11. An inspection apparatus comprising:
a memory storing instructions; and
a controller, including a processor, that executes the instructions to:
obtain a reference image based on printing data used for printing printed material to be inspected;
correct the reference image using correction values expressing an effect of reflected light produced when reading the printed material; and
inspect the printed material for anomalies based on the corrected reference image and an inspection target image obtained by reading the printed material,
wherein the controller corrects the reference image by reproducing an effect of flare, produced when reading the printed material, from neighboring pixels neighboring a pixel of interest in the printed material.

12. The inspection apparatus according to claim 11, wherein:
the correction values are weighting coefficients, and
the controller corrects the reference image by executing weighting processing using the weighting coefficients.

13. A method, executed by an inspection apparatus, of inspecting a printed material for anomalies, the method comprising:
obtaining an inspection target image by irradiating with light a printed material to be inspected and receiving reflected light from the printed material;
obtaining a reference image based on printing data used for printing the printed material;
correcting the reference image using predetermined weighting coefficients so that the reference image reflects an effect of flare on a pixel of interest in the printed material from neighboring pixels that occurs when the inspection target image is obtained; and comparing the corrected reference image with the inspection target image to inspect the printed material for anomalies.

14. A method, executed by an inspection apparatus, of inspecting a printed material for anomalies, the method comprising:
- obtaining an inspection target image by irradiating with light a printed material to be inspected and receiving reflected light from the printed material;
- obtaining a reference image based on printing data used for printing the printed material;
- correcting the inspection target image using predetermined weighting coefficients so as to remove, from the inspection target image, an effect of flare on a pixel of interest in the printed material from neighboring pixels that occurs when the inspection target image is obtained; and
- comparing the corrected inspection target image with the reference image to inspect the printed material for anomalies.

15. A non-transitory computer-readable storage medium storing a program executable by a processor of an inspection apparatus to execute a method comprising:
- obtaining an inspection target image by irradiating with light a printed material to be inspected and receiving reflected light from the printed material;
- obtaining a reference image based on printing data used for printing the printed material;
- correcting the reference image using predetermined weighting coefficients so that the reference image reflects an effect of flare on a pixel of interest in the printed material from neighboring pixels that occurs when the inspection target image is obtained; and
- comparing the corrected reference image with the inspection target image to inspect the printed material for anomalies.

16. A non-transitory computer-readable storage medium storing a program executable by a processor of an inspection apparatus to execute a method comprising:
- obtaining an inspection target image by irradiating with light a printed material to be inspected and receiving reflected light from the printed material;
- obtaining a reference image based on printing data used for printing the printed material;
- correcting the inspection target image using predetermined weighting coefficients so as to remove, from the inspection target image, an effect of flare on a pixel of interest in the printed material from neighboring pixels that occurs when the inspection target image is obtained; and
- comparing the corrected inspection target image with the reference image to inspect the printed material for anomalies.

* * * * *